(12) United States Patent
Iwamoto et al.

(10) Patent No.: US 6,843,588 B2
(45) Date of Patent: Jan. 18, 2005

(54) VEHICULAR LAMP SYSTEM FOR AUTOMOTIVE VEHICLE

(75) Inventors: Kinya Iwamoto, Yokohama (JP); Kiyotaka Ozaki, Kanagawa (JP); Kenjou Umezaki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 196 days.

(21) Appl. No.: 10/317,146

(22) Filed: Dec. 12, 2002

(65) Prior Publication Data

US 2003/0117808 A1 Jun. 26, 2003

Related U.S. Application Data

(63) Continuation of application No. 09/859,526, filed on May 18, 2001, now abandoned.

(30) Foreign Application Priority Data

May 23, 2000 (JP) ........................................ 2000-151969

(51) Int. Cl.[7] .................................................. B60Q 1/08
(52) U.S. Cl. ...................... 362/466; 362/464; 362/467; 362/469
(58) Field of Search .............................. 362/37, 39, 40, 362/41, 43, 45, 464, 466, 467, 465, 507, 512, 523, 525, 235, 239, 250, 276, 277, 285, 802, 269, 282, 283, 346

(56) References Cited

U.S. PATENT DOCUMENTS

| | | | |
|---|---|---|---|
| 1,148,942 A | 8/1915 | Wilson | |
| 4,858,080 A | 8/1989 | Oikawa | |
| 5,060,120 A | 10/1991 | Kobayashi et al. | |
| 5,588,733 A | 12/1996 | Gotou | |
| 5,711,590 A | 1/1998 | Gotoh et al. | |
| 5,988,837 A | 11/1999 | Eichhorn et al. | |
| 6,059,435 A | 5/2000 | Hamm et al. | |
| 6,193,398 B1 | 2/2001 | Okuchi et al. | |
| 6,302,553 B1 | 10/2001 | Izawa | |
| 6,305,823 B1 | 10/2001 | Toda et al. | |
| 6,478,460 B2 | 11/2002 | Furuya et al. | |
| 2001/0030870 A1 | 10/2001 | Hiramatsu et al. | |

*Primary Examiner*—Thomas M. Sember
*Assistant Examiner*—Hargobind S. Sawhney
(74) *Attorney, Agent, or Firm*—Foley & Lardner LLP

(57) ABSTRACT

In a vehicular lamp system for an automotive vehicle, a first reflector (11201) equipped with a light source, a second reflector (11202) enabled to deflect a reflection direction thereof toward a vehicular turn direction independently of the first reflector, and a driving section (2) that operatively performs a deflection drive for the first and second reflectors are provided. A controller (3) controls the driving section(s) on the basis of a vehicular velocity detected by a vehicular velocity detector (6) and a steering angle detected by a vehicular steering angle detector (5) in such a manner that the second reflector is deflected toward the vehicular turn direction according to the detected steering angle when the detected vehicular velocity falls in an extremely low vehicular velocity range and that the first reflector is deflected toward the vehicular turn direction according to the steering angle when the detected vehicular velocity falls in a high vehicular velocity range.

29 Claims, 48 Drawing Sheets

SURROUNDING LIGHT UNTURNING SIDE

CENTER LIGHT UNTURNING SIDE

SURROUNDING LIGHT TURNING SIDE

CENTER LIGHT TURNING SIDE

SURROUNDING LIGHT TURNING SIDE

CENTER LIGHT TURNING SIDE

SURROUNDING LIGHT UNTURNING SIDE

CENTER LIGHT UNTURNING SIDE

VEHICULAR LAMP SYSTEM FOR AUTOMOTIVE VEHICLE

Japan Priority Application 2000-151969, filed May 23, 2000, is incorporated herein by reference in its entirety. This application is a Continuation of U.S. application Ser. No. 09/859,526, filed May 18, 2001, incorporated herein by reference in its entirety.

BACKGROUND OF THE INVENTION a) Field of the Invention

The present invention relates to a vehicular lamp system for an automotive vehicle.

b) Description of the Related Art

A Japanese Patent Application First Publication No. Heisei 8-183385 published on Jul. 16, 1996 (which corresponds to a U.S. Pat. No. 5,711,590 issued on Jan. 27, 1998) exemplifies a previously proposed vehicular lamp system in which, during a vehicular turn (or cornering), both visibilities for a direction toward which a vehicle is turned (hereinafter, also referred to as a vehicular turn direction) and for its outside direction toward which the vehicle is un-turned are improved.

The previously proposed vehicular lamp system includes a fixed reflector and a movable (or displaceable) reflector in each of leftward and rightward headlamp apparatuses.

A light distribution pattern over which the fixed reflector distributes a light beam is a bright portion in a proximity to an optical axis and corresponds to a, so-called, center light. A light distribution pattern over which the movable reflector distributes light is a dim light radiation to a surrounding portion to the optical axis and corresponds to a, so-called, surrounding light portion.

Then, the previously proposed vehicular lamp system maintains the visibility toward the vehicular forward direction while increasing the visibility in the vehicular turn direction by pivoting the movable reflector toward the turn direction during the turn of the vehicle.

SUMMARY OF THE INVENTION

However, in the previously proposed vehicular lamp system disclosed in the above-described Japanese Patent Application First Publication No. Heisei 8-183385, a portion of the light distribution pattern which radiates the light toward the vehicular turn direction is the dim light distribution pattern portion corresponding to the surrounding light portion and the light distribution pattern corresponding to the bright center light portion lies in a forward center portion of the vehicle. Therefore, a brightness of an area of the vehicular turn direction which is needed most during the vehicular turn is not always improved.

On the other hand, it is possible to improve the visibility of the turn direction area if the whole headlamp apparatuses is pivoted toward the vehicular turn direction. However, since the brightness of each of the vehicular front center area and the outside direction area to the vehicular turn direction is largely reduced in a case where the vehicle turns a traffic intersection at a low velocity, the movable reflector cannot remarkably be pivoted through a large displacement angle toward the vehicular turn direction.

It is, hence, an object of the present invention to provide an improved vehicular lamp system which is capable of further improving the visibility during a vehicular turn.

According to one aspect of the present invention, there is provided with a vehicular lamp system, comprising: a first reflector, disposed on a head of a vehicle, equipped with a light source, and enabled to be driven to deflect a reflection direction of a light beam from the light source toward a vehicular turn direction together with the light source; a second reflector enabled to be driven to deflect the reflection direction thereof toward the vehicular turn direction independently of the first reflector; a driving section that operatively performs a deflection drive for the first and second reflectors; a vehicular velocity detector to detect a vehicular velocity of the vehicle; a steering angle detector to detect a vehicular steering angle of the vehicle; and a controller to determine whether the detected vehicular velocity falls in a predetermined middle velocity range and to control the driving section on the basis of the detected vehicular velocity and steering angle in such a manner that the second reflector is deflected toward the vehicular turn direction according to the detected steering angle when determining that the detected vehicular velocity is lower by a predetermined low velocity range than the predetermined middle velocity range and that the first reflector is deflected toward the vehicular turn direction according to the steering angle when determining that the detected vehicular velocity is higher than the predetermined middle vehicular velocity range.

According to another aspect of the present invention, there is provided A vehicular lamp system, comprising: at least a pair of rightward and leftward first reflectors, each of the first reflectors being disposed on a head of a vehicle, being equipped with a light source, and being enabled to be driven to deflect a reflection direction of a light beam from the light source toward a vehicular turn direction together with the light source; at least a pair of rightward and leftward second reflectors, each of the second reflectors being enabled to be driven to deflect the reflection direction thereof toward the vehicular turn direction independently of the pair of the rightward and leftward first reflectors; a driving section that operatively performs a deflection drive for the pairs of the rightward and leftward first reflectors and second reflectors; a vehicular velocity detector to detect a vehicular velocity of the vehicle; a steering angle detector to detect a vehicular steering angle of the vehicle; and a controller to determine whether the detected vehicular velocity falls in a predetermined middle velocity range and to control the driving section on the basis of the detected vehicular velocity and steering angle in such a manner that one of the pair of the rightward and leftward first reflectors which is placed on an inside of a vehicular turn direction with respect to a center of a circle of turn is deflected toward the vehicular turn direction according to the detected steering angle when determining that the detected vehicular velocity falls in the predetermined middle velocity range.

This summary of the invention does not necessarily describe all necessary features so that the invention may also be a sub-combination of these described features.

DETAILED DESCRIPTION OF THE PREFERRED EMBODIMENTS

Reference will hereinafter be made of the drawings in order to facilitate an understanding of the present invention.

First Embodiment

Figure 1:
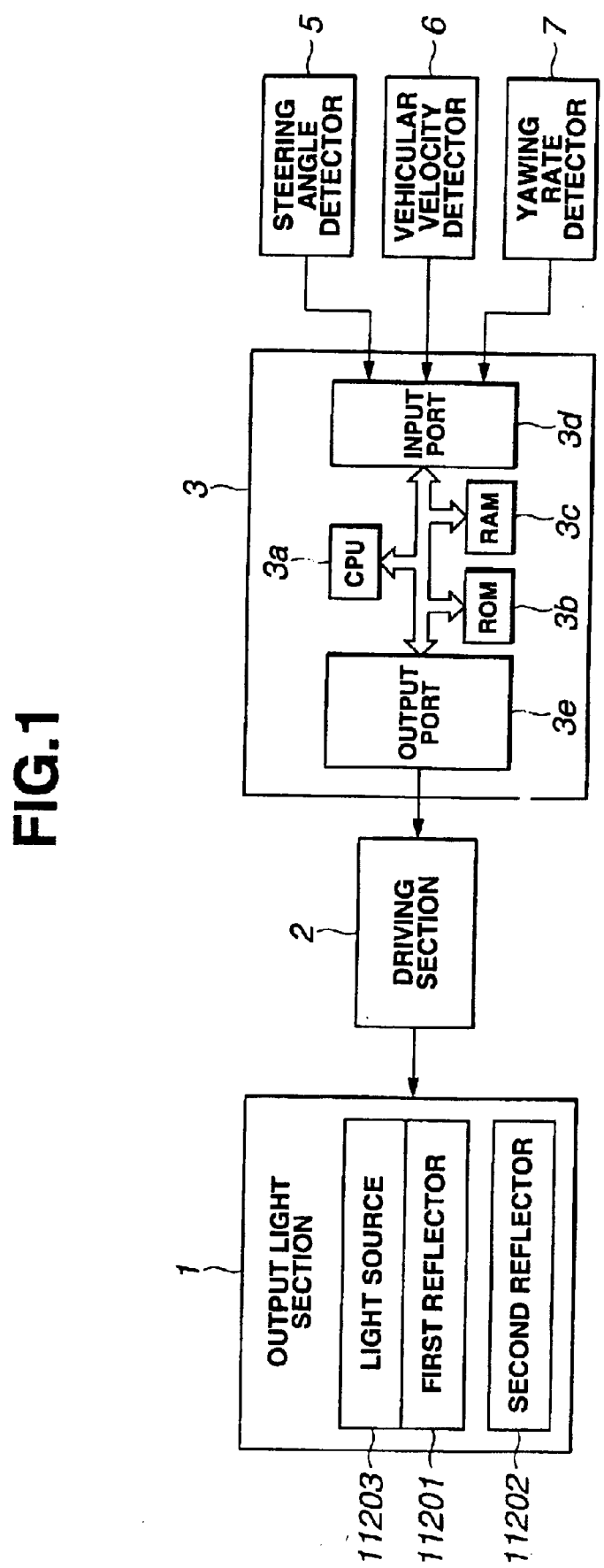
FIG. 1 is a functional-and-circuit block diagram of a vehicular lamp system in a first preferred embodiment according to the present invention.

FIG. 1 is a block diagram showing a vehicular lamp system in a first preferred embodiment according to the invention.

As shown in FIG. 1, the vehicular lamp system in the first embodiment includes an output light section 1, a driving section 2, a controller 3, a steering angle detector 5, a vehicle velocity detector 6 and a yawing rate detector 7.

Controller 3 calculates and outputs a deflection drive variable to driving section 2 on the basis of individual detected data obtained by steering angle detector 5, vehicular velocity detector 6 and yawing rate detector 7.

Controller 3 includes a microcomputer having a CPU (Central Processing Unit) 3a, a ROM (Read Only Memory) 3b, a RAM (Random Access Memory) 3c, an Input Port 3d, and an Output Port 3e.

Driving section 2 drives a first reflector 11201 and an associated light source 11203 together on the basis of a signal indicating the deflection drive variable from controller 3. Driving section 2, in addition, drives a second reflector 11202 independently of first reflector 11201 to change a light distribution state on the basis of a signal indicating the deflection drive variable inputted from controller 3.

While the vehicle is turn, therefore, a vehicular driver (hereinafter, simply referred to as a driver) is enabled to recognize the course visually with not only a brighter light, as distributed for the center light by the setting of an optical axis of first reflector 11201, but also a light, as distributed for a surrounding light by the radiation around the optical axis of second reflector 11202.

Thus, visibility on the turning side of the vehicle can be improved while retaining the visibility on the forward and un-turning sides of the vehicle.

Figure 2:
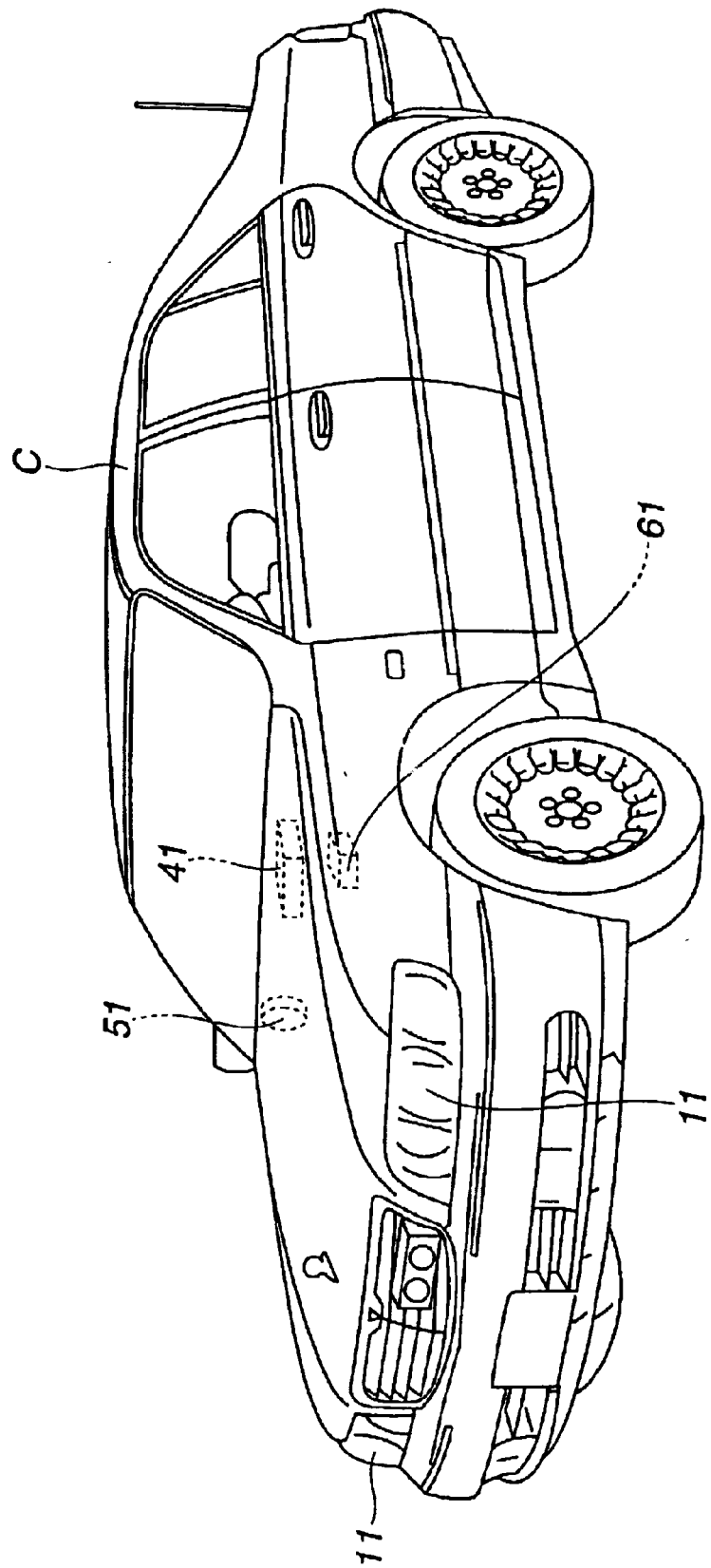
FIG. 2 is a perspective view of an automotive vehicle to which the vehicular lamp system in the first preferred embodiment is applicable.

Output light section 1 is constituted by a pair of rightward and leftward head lamps 11 disposed on the front portion of vehicle C, as shown in FIG. 2. In head lamps 11, there are housed light distribution lamps which are equipped with respective driving sections 2.

Controller 3 is arranged in an inner part 41 of an instrument panel of vehicle C.

Steering angle detector 5 is constituted by a steering angle sensor 51 of a vehicular steering wheel which is mounted on a steering shaft of the steering wheel for detecting a steering angle (steering angular displacement and a steering direction).

However, steering angle detector 5 may be constituted by a tire steering angle sensor for detecting the steering angle of steered tires so that it can detect the tire steering angle of the tire steering angle sensor as the steering angle.

Vehicle velocity detector 6 detects the vehicle velocity by fetching a vehicle velocity signal from a vehicular speedometer into controller 3.

Yawing rate detector 7 is constituted by a yawing rate sensor 61 disposed in vehicle C for detecting a yawing rate (also called, yaw velocity) directly from yawing rate sensor 61. However, yawing rate detector 7 can also be constructed to detect the yawing rate indirectly by fetching a lateral G or motion state of the vehicle to controller 3 to calculate the yawing rate.

Next, head lamp 11 will be described in more detail with reference to FIGS. 3 to 9.

Figure 3:
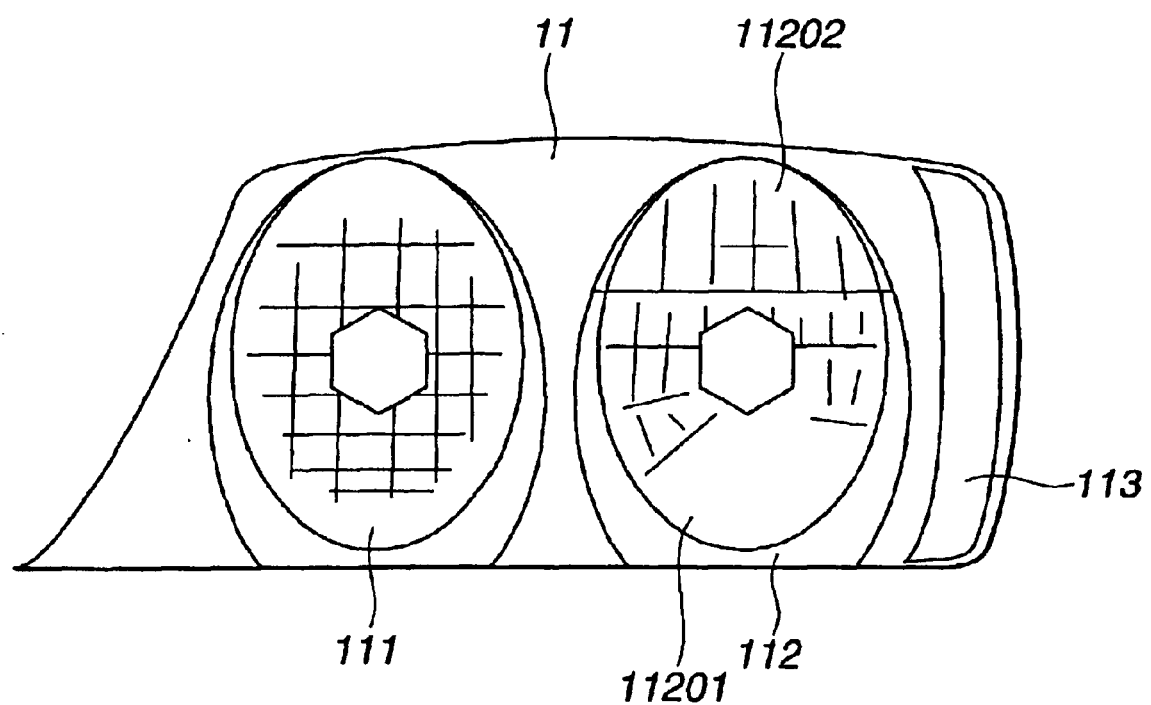
FIG. 3 is a front view of one of light distribution control lamps in the vehicular lamp system of the first preferred embodiment shown in FIG. 1.
Figure 4:
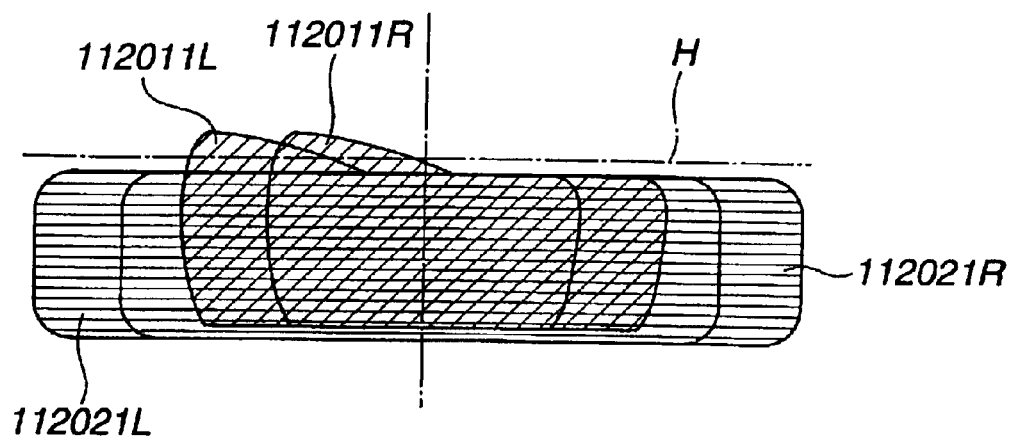
FIG. 4 is an explanatory view of a light distribution pattern of the light distribution control lamp shown in FIG. 3.
Figure 5:
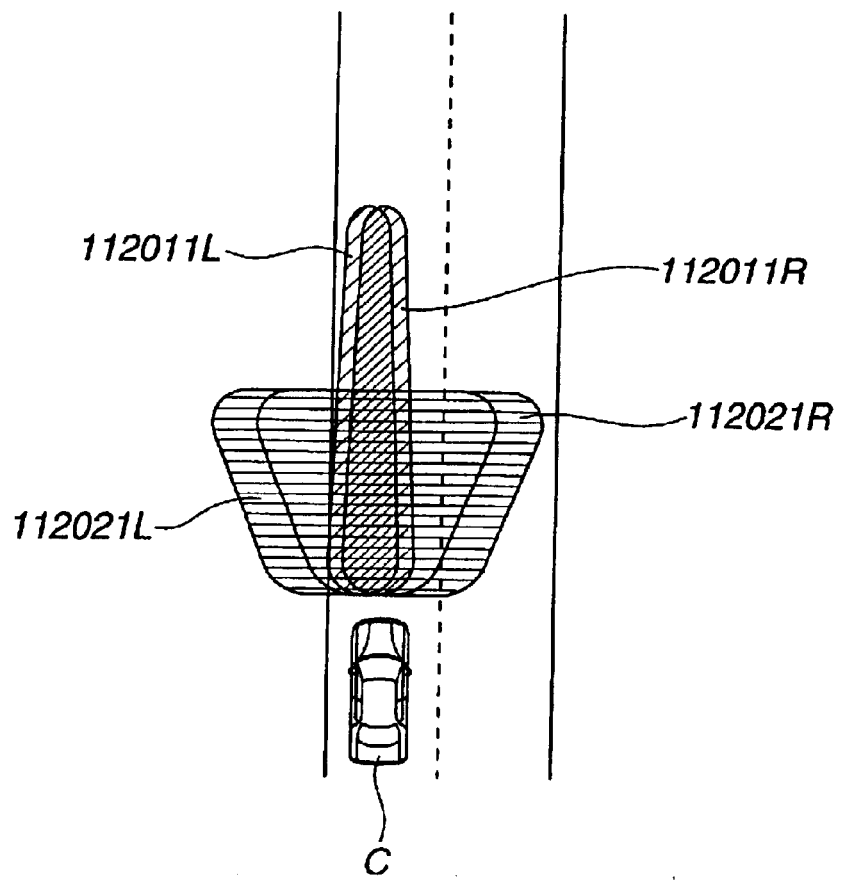
FIG. 5 is a schematic top view of the vehicle when the vehicle is running with the light distribution control lamps driven to radiate light beams over a forward radiation area.

FIG. 3 is a detailed diagram of a leftward head lamp 11 as viewed from a top of the vehicle C; FIG. 4 shows a light distribution pattern of a light distribution control; and FIG. 5 is a top plan view of the light distribution pattern at a time of a vehicular run with the light distribution control executed.

It is noted that the configuration of a rightward head lamp 11 is the same as and made symmetric with the leftward one 11 shown in FIG. 3. Hence, a detailed description of the rightward head lamp will herein be omitted.

Head lamp 11 is constructed integrally by: a high-beam lamp 111 for radiating a high-beam light; a side-marker lamp (or called, small lamp) 113 for indicating a width of a vehicular body when lighted; and a light distribution control lamp 112 for controlling a light distribution of a low-beam light.

Figure 6:
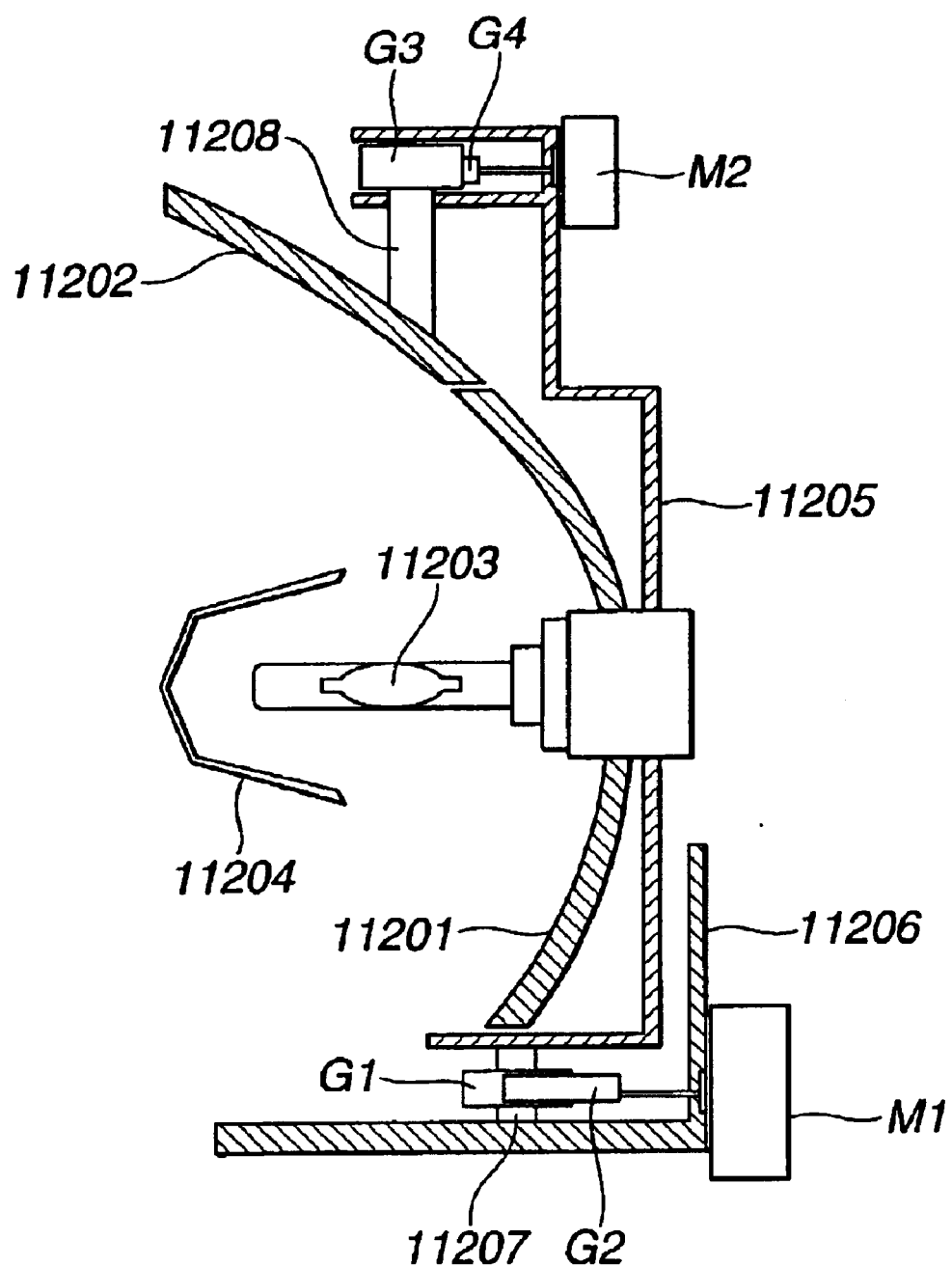
FIG. 6 is a schematic cross sectional view of the light distribution control lamp shown in FIG. 3.

The reflector in the light distribution control lamp 112 is divided into two parts; lower and upper first reflectors 11201 and 11202, as shown in FIG. 6. First reflector 11201 on the lower side forms the light distribution for the center light to set an optical axis and both of the first reflectors in the rightward and leftward light distribution control lamps 112R and 112L radiate the portions of light distribution patterns 112011R and 112011L of FIGS. 4 and 5. It is noted that the center light is a brightened area which is present on the lower side of a horizontal line H, as shown in FIG. 4, and horizontal line H contains the optical axes of rightward and leftward head lamps 11. In short, first reflector 11201 serves to set the optical axis.

Upper reflector 11202 in FIG. 3 forms the light distribution for a surrounding light, and both upper reflectors 11202 in the rightward and leftward light distribution control lamps 112 radiate the portions of light distribution patterns 112021R and 112021L of FIGS. 4 and 5. It is noted that the surrounding light is defined as a dim portion for radiating the periphery of the optical axis widely around the center light.

Thus, the reflected light by first reflector 11201 is set brighter than that by second reflector 11202. Therefore, first reflector 11201 radiates a longer distance in front of the vehicle whereas second reflector 11202 radiates a shorter range widely in front of the vehicle. Consequently, a natural light radiation state matching with a human's sense to light can be achieved.

Figure 7:
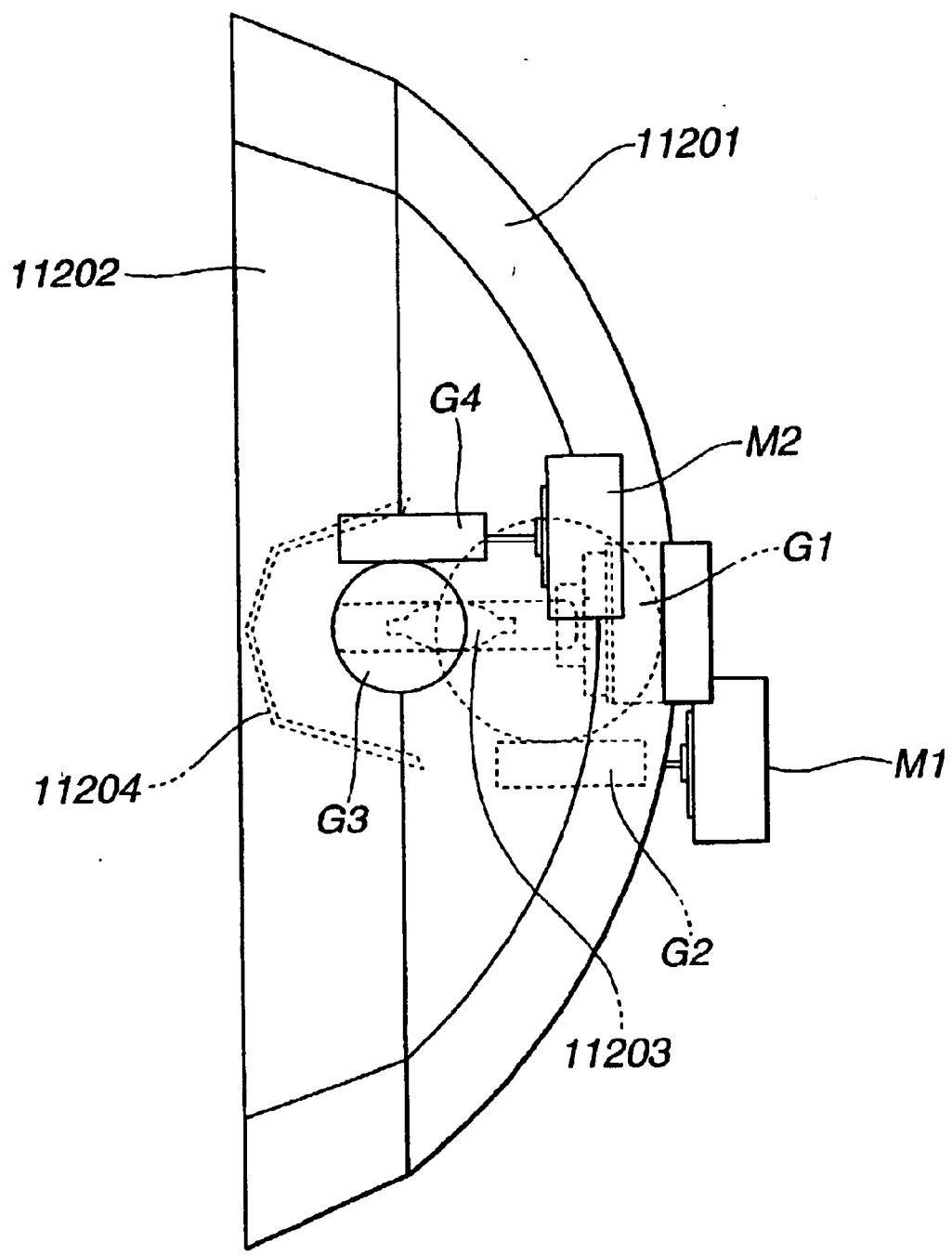
FIG. 7 is a schematic plan view of the light distribution control lamp shown in FIG. 3.
Figure 8:
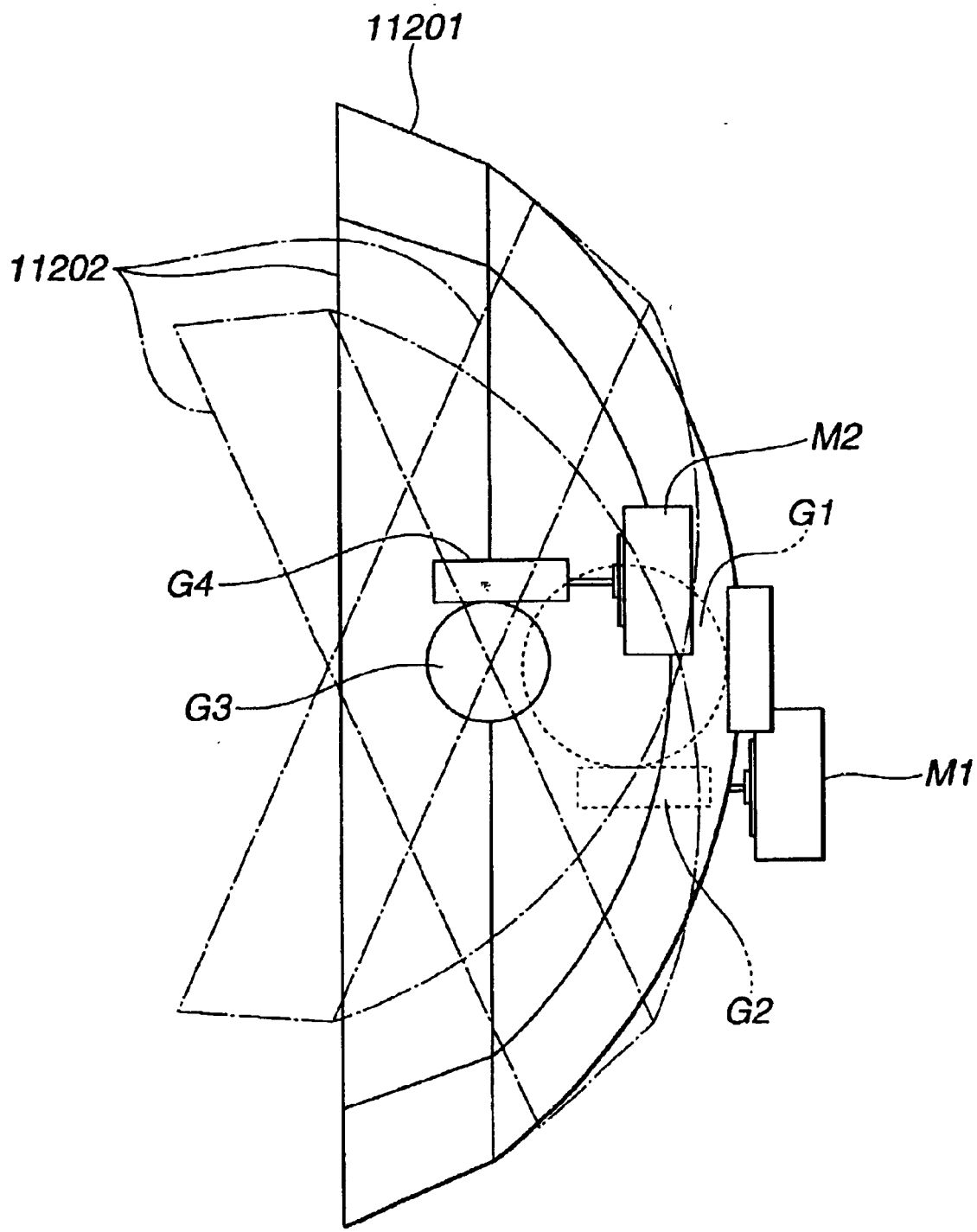
FIG. 8 is a schematic plan view of the light distribution control lamp shown in FIG. 3 when operated.
Figure 9:
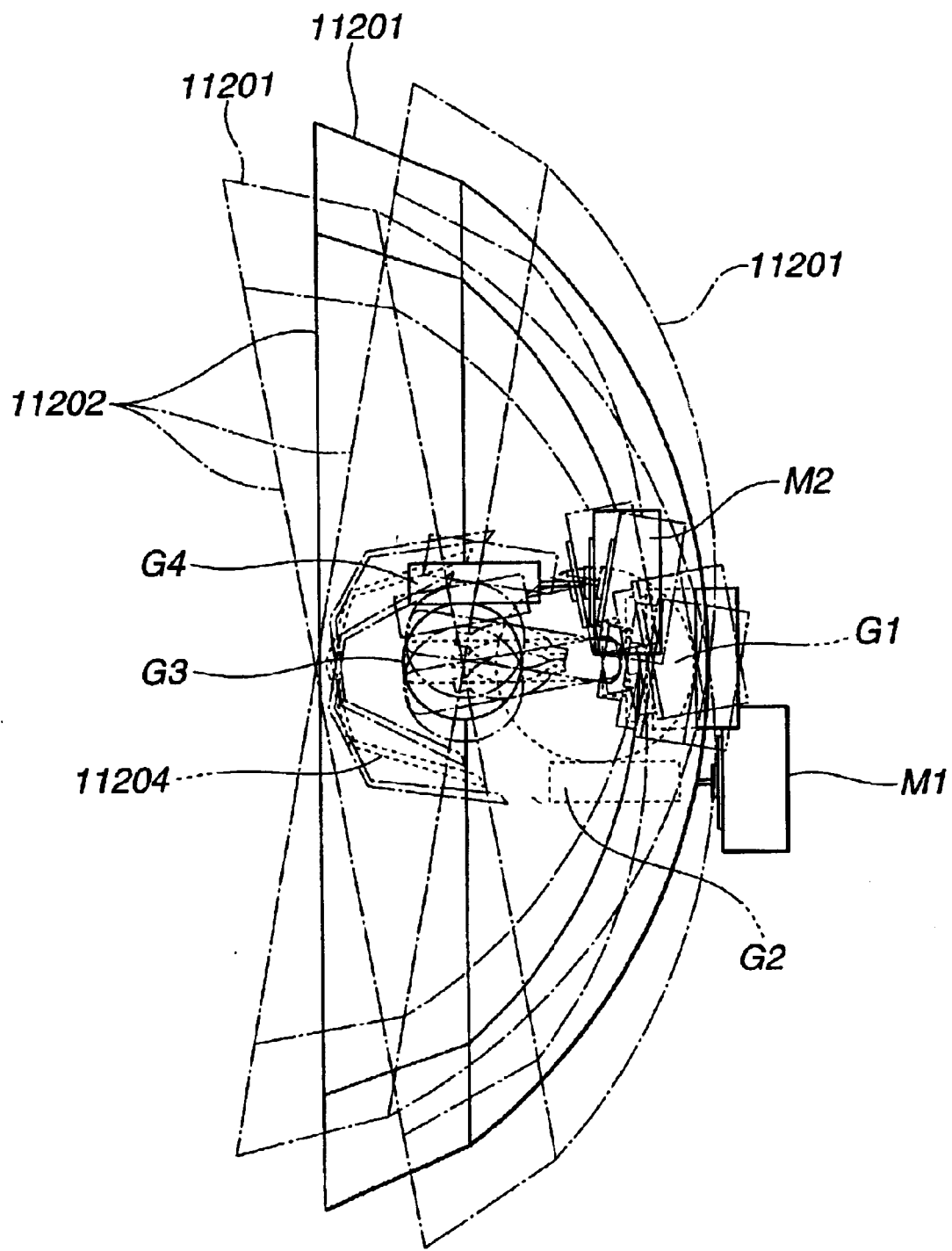
FIG. 9 is a schematic plan view of the light distribution control lamp shown in FIG. 3 when operated.

FIGS. 6 and 7 show a schematic configuration of individual light distribution control lamps 112, and FIGS. 8 and 9 show operated states of the light distribution control lamps 112. FIG. 6 is a schematic side elevation of one light distribution control lamp 112, and FIG. 7 is a schematic top plan view thereof.

As shown in FIGS. 6 and 7, light distribution control lamp 112 is provided with light source 11203 in first reflector 11201 and a shade 11204 in front of light source 11203 for shading (shielding) the direct light coming from light source 11203. Although not shown, shade 11204 is supported by a support axle extended from first reflector 11201. There are further provided two motors M1 and M2 as drive means for performing a deflection drive for first and second reflectors 11201 and 11202.

Second reflector 11202 is coupled to a base 11205 through a rotary axle 11208, on which a gear G3 is mounted and which is associatively connected through a gear G4 to motor M2 mounted on base 11205. First reflector 11201, light source 11203 and motor M2 are mounted on base 11205. Base 11205 is coupled to a base 11206 through rotary axle 11207, on which a gear G1 is mounted and which is associatively connected through a gear G2 to motor M1 mounted on base 11206. Base 11206 is fixed on the vehicular body.

As shown in FIGS. 6 and 8, therefore, second reflector 11202 is turned about rotary axle 11208 to the rightward and leftward by the driving force of motor M2. On the other hand, the whole light distribution lamp 112 shown in FIG. 9 is turned about rotary axle 11207 to the rightward and leftward by the driving force exerted by motor M1.

Specifically, first reflector 11201 is enabled to be deflectively driven to displace the reflection direction of the light coming from light source 11203 together with light source 11203 in the rightward and leftward angularly displacing directions.

Second reflector 11201 can deflectively drive a reflecting direction of the light coming from light source 11203 independently of first reflector 11201 in the rightward and leftward angularly displacing directions.

Thus, second reflector 11202 can serve to set the light beam be radiated on the periphery of the optical axis. First and second reflectors 11201 and 11202 can be housed in a common lamp housing so that the whole lamp system can easily be small-sized.

Figure 10A:
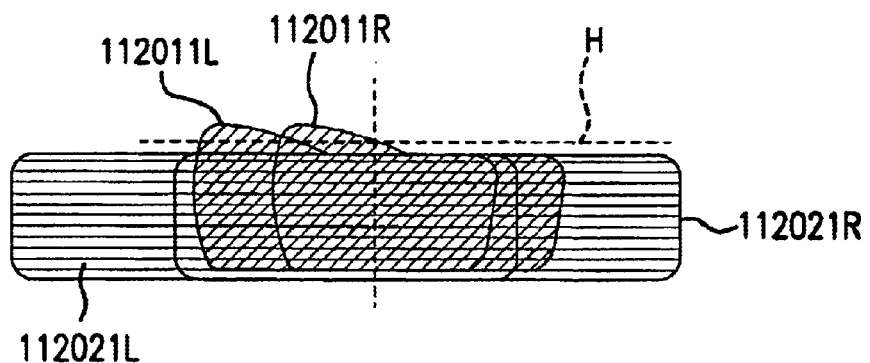
FIGS. 10A, 10B, and 10C are, in the case of the first preferred embodiment, a schematic front view representing a variation of the light distribution pattern, a schematic top view of the vehicle when the vehicle is running radiating light beams from the light distribution control lamps, a schematic top view for explaining an operation state of both leftward and rightward light distribution control lamps, respectively.
Figure 10B:
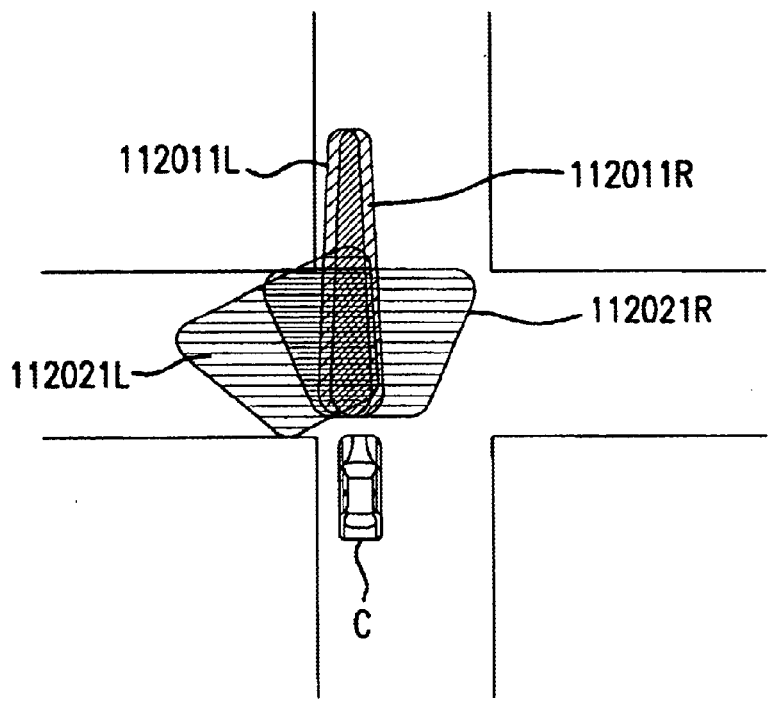
Figure 10C:
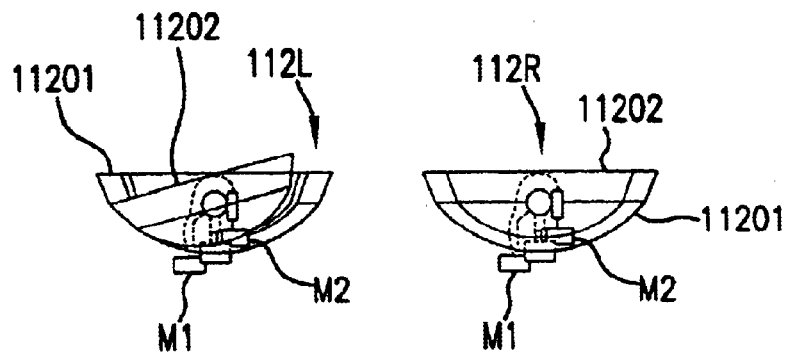

FIGS. 10A to 10C show a first situation in which second reflector 11202 of leftward light distribution control lamp 112L independently turns to the leftward. FIG. 10A shows a variation in the light distribution pattern when the vehicle C is turned to the leftward; FIG. 10B is a top plan view showing a state in which the vehicle runs with its rightward and leftward light distribution control lamps 112R and 112L activated; and FIG. 10C shows an operation situation of rightward and leftward light distribution control lamps 112R and 112L when the vehicle is turned to the leftward as shown in FIG. 10B.

When second reflector 11202 of leftward light distribution control lamp 112L only is, thus, turned leftward independently of second reflector of rightward light distribution control lamp 112R, only light distribution pattern 112021L for the leftward surrounding light turns leftward, but light distribution pattern 112021R for the rightward surrounding light and light distribution patterns 112011R and 112011L for the rightward and leftward center lights are leftward as they are (not displaced).

Figure 11A:
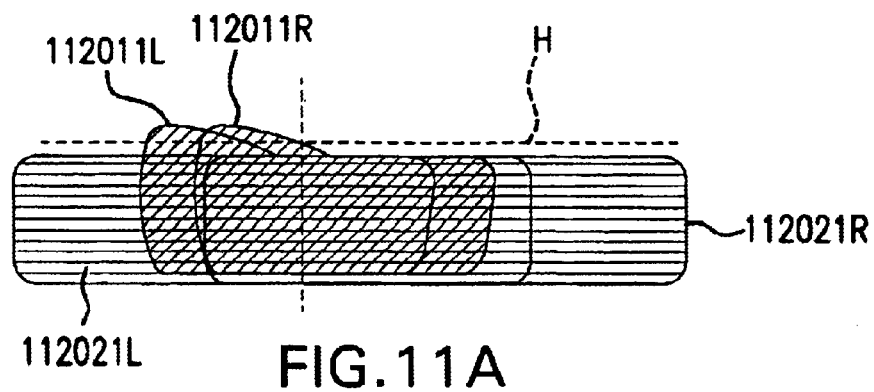
FIGS. 11A, 11B, and 11C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 11B:
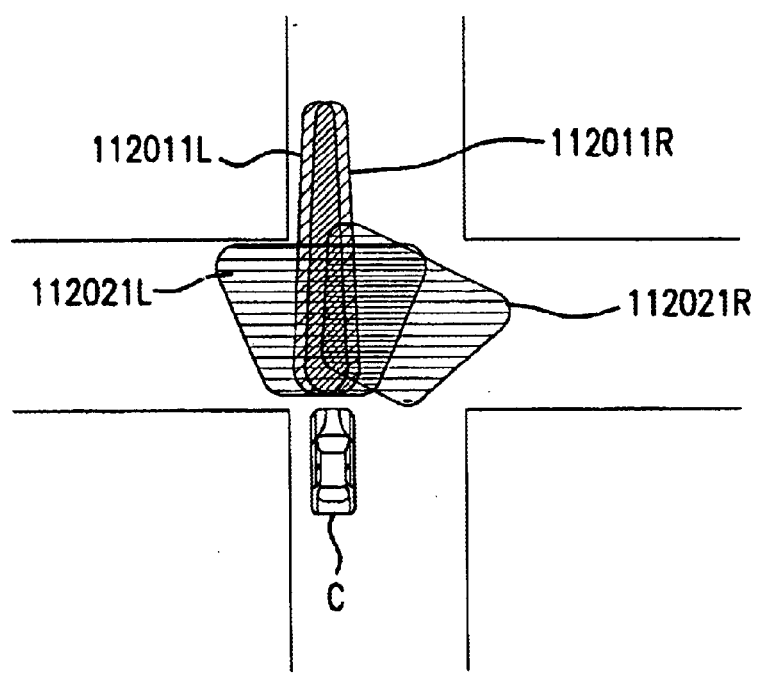
Figure 11C:
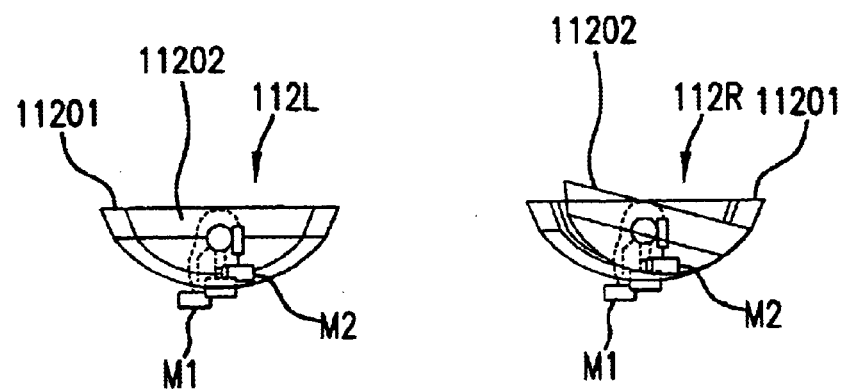

FIGS. 1A to 11C show a second situation in which second reflector 11202 of rightward light distribution control lamp 112R independently turns to the rightward. FIG. 11A shows a variation in the light distribution pattern when the vehicle C is turned to the rightward as viewed from FIG. 11B; FIG. 11B is a top plan view showing the state in which the vehicle runs with its rightward and leftward light distribution control lamps 112R and 112L activated; and FIG. 11C shows the operation situation of rightward and leftward light distribution control lamps 112R and 112L when the vehicle is turned to the rightward. When second reflector 11202 of rightward light distribution control lamp 112R only is, thus, turned rightward, only light distribution pattern 112021R for the rightward surrounding light turns rightward, but light distribution pattern 112021R for the rightward surrounding light and light distribution patterns 112011R and 112011L for the rightward and leftward center lights are leftward as they are (not displaced).

Figure 12A:
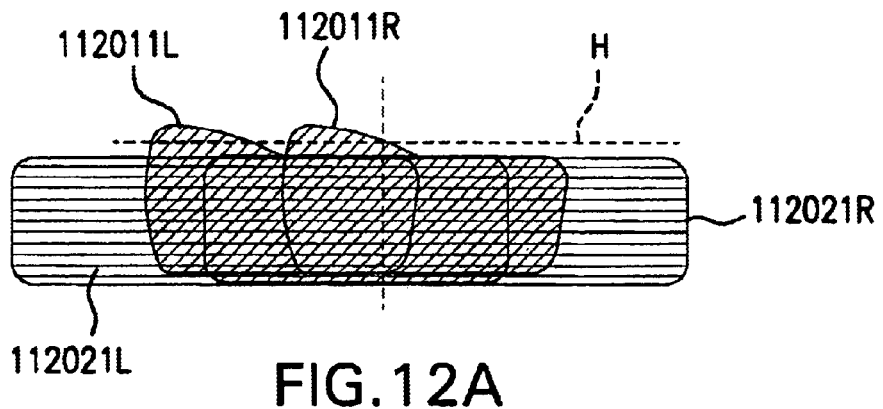
FIGS. 12A, 12B, and 12C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 12B:
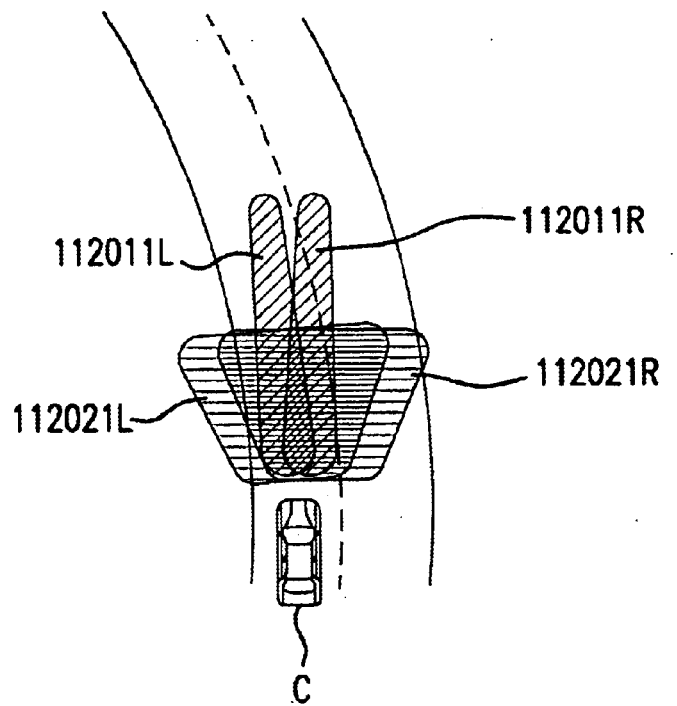
Figure 12C:
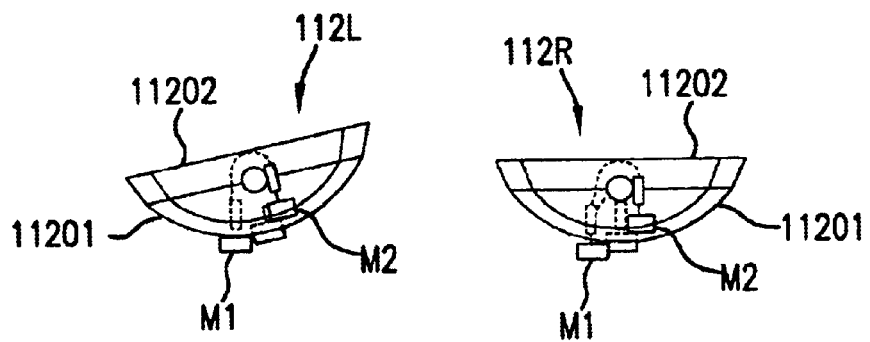

FIGS. 12A to 12C show a third situation in which whole leftward light distribution control lamp 112L independently turns to the leftward. FIG. 12A shows a variation in the light distribution pattern when whole leftward light distribution control lamp 112L is tuned to the leftward; FIG. 12B is a top plan view showing the state in which the vehicle runs with its rightward and leftward light distribution control lamps 112R and 112L activated; and FIG. 12C shows the operation operation situation of rightward and leftward light distribution control lamps 112R and 112L when whole control lamp 112L is turned to the leftward.

When whole leftward light distribution control lamp 112L is, thus, turned leftward, light distribution pattern 112011L for the leftward center light and light distribution pattern 112021L for the leftward surrounding light turn leftward, but light distribution pattern 112021R for the rightward surrounding light and light distribution pattern 112011R for the rightward center light are leftward as they are (not displaced).

Figure 13A:
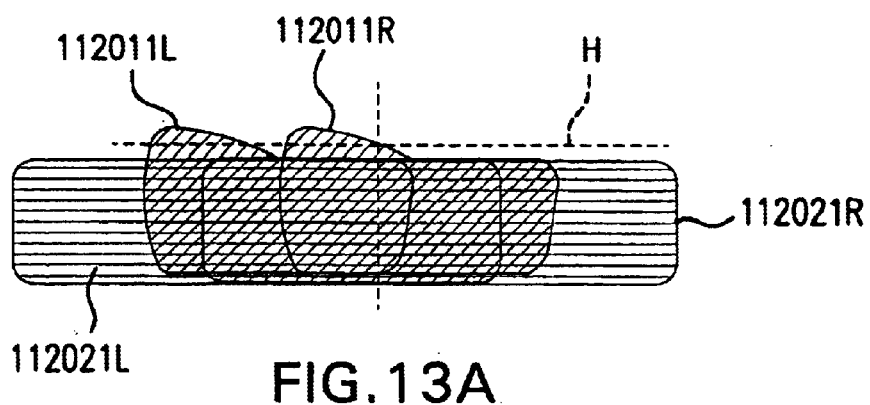
FIGS. 13A, 13B, and 13C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 13B:
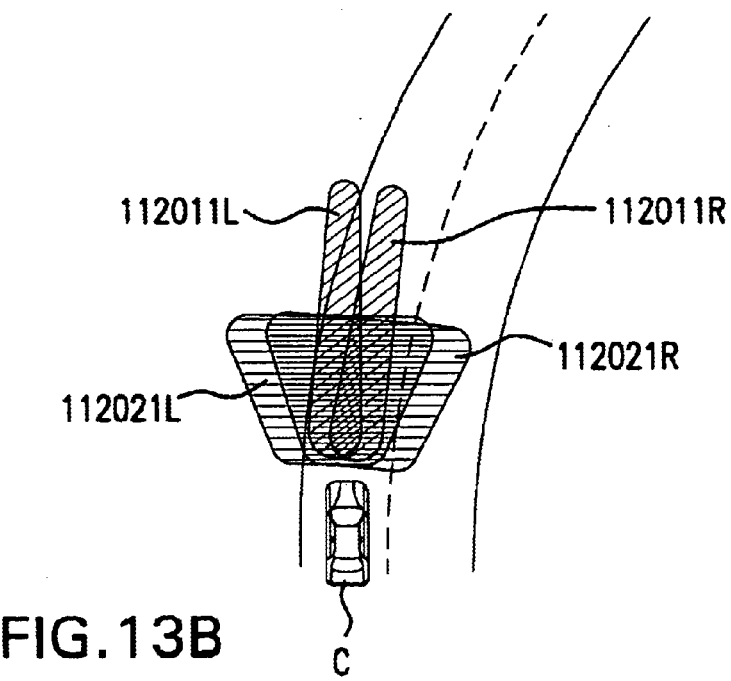
Figure 13C:
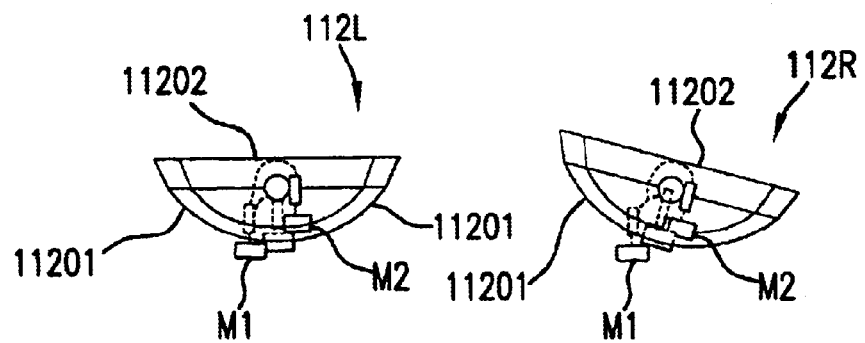

FIGS. 13A to 13C show a fourth situation in which whole rightward light distribution control lamp 112R independently turns to the rightward. FIG. 13A shows a variation in the light distribution pattern when whole rightward light distribution control lamp 112R is turned to the rightward; FIG. 13B is a top plan view showing the state in which the vehicle runs with its rightward and leftward light distribution control lamps 112R and 112L activated; and FIG. 13C shows the operation situation of rightward and leftward light distribution control lamps 112R and 112L in the case of FIG. 13B.

When whole rightward light distribution control lamp 112R is thus turned rightward, light distribution pattern 112011R for the rightward center light and light distribution pattern 112021R for the rightward surrounding light turn rightward, but light distribution pattern 112021L for the leftward surrounding light and light distribution pattern 112011L for the leftward center light are leftward as they are (not displaced).

Figure 14A:
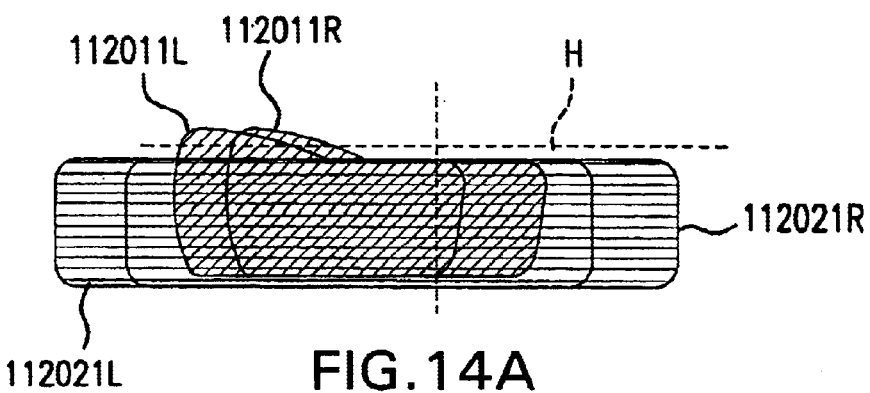
FIGS. 14A, 14B, and 14C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 14B:
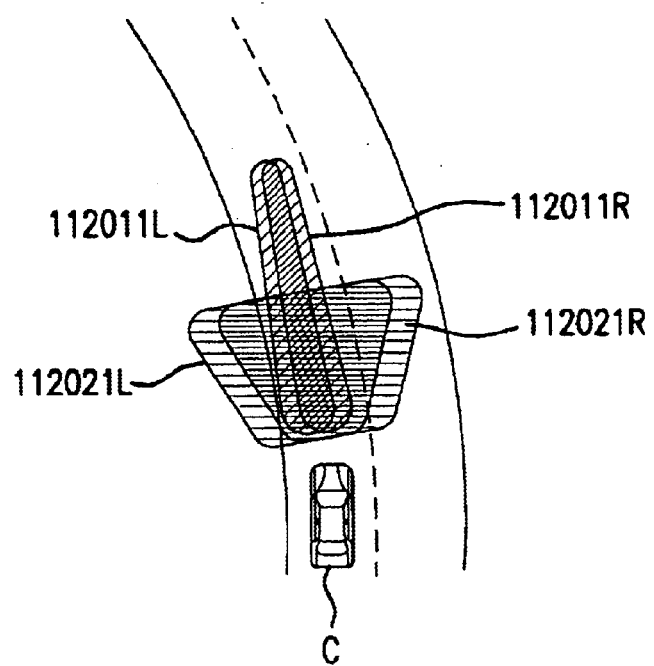
Figure 14C:
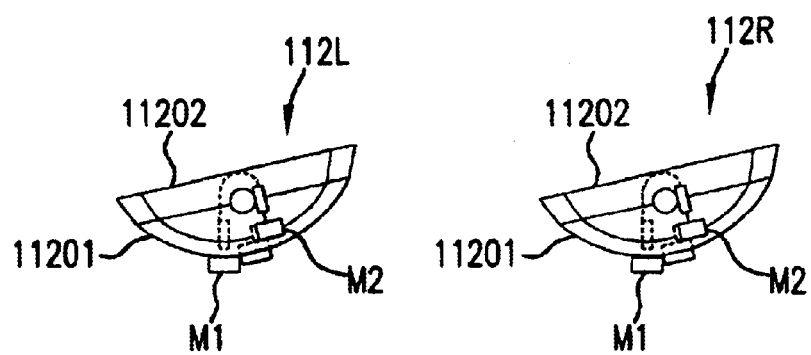

FIGS. 14A to 14C show a fifth situation in which each of rightward and leftward light distribution control lamps 112R and 112L is turned to the leftward. FIG. 14A shows a variation in the light distribution pattern when each of light distribution control lamps 112R and 112L is turned to the leftward; FIG. 14B is a top plan view showing the state in which the vehicle runs with its light distribution control lamps 112 activated; and FIG. 14C shows the operation situation of rightward and leftward light distribution control lamps 112R and 112L when the vehicle is running in the case of FIG. 14B.

When whole rightward and leftward light distribution control lamps 112R and 112L are thus turned leftward, all light distribution patterns turn leftward.

Figure 15A:
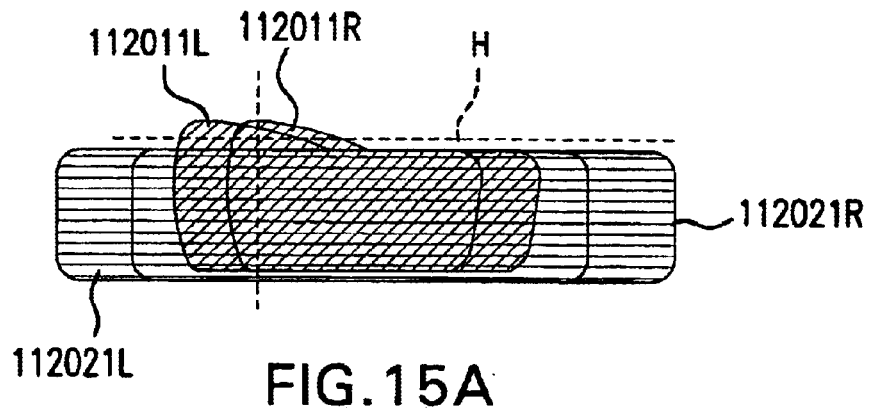
FIGS. 15A, 15B, and 15C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 15B:
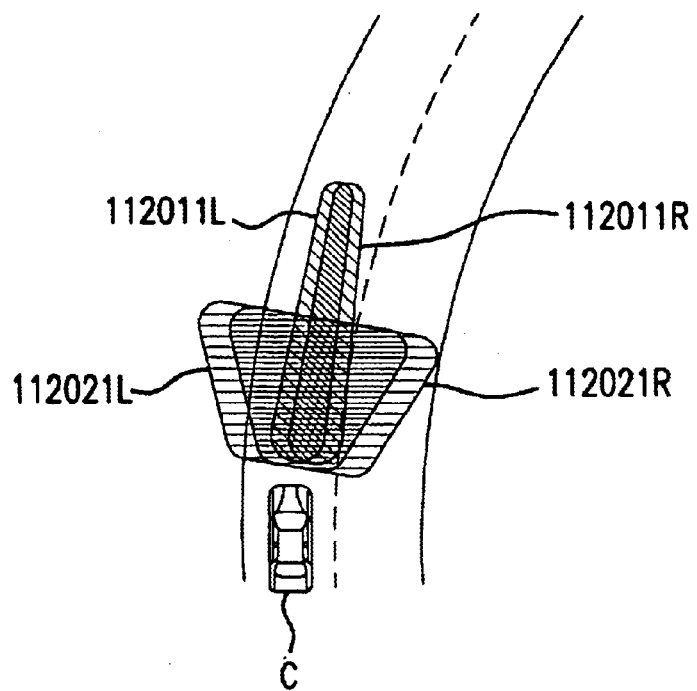
Figure 15C:
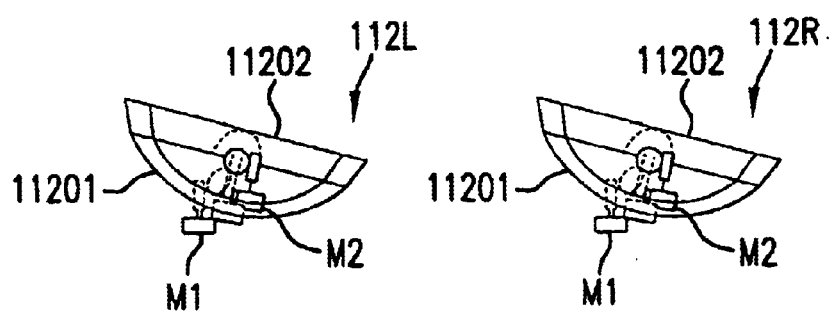

FIGS. 15A to 15C show a sixth situation in which rightward and leftward light distribution control lamps 112R and 112L turns to the rightward. FIG. 15A shows a variation in the light distribution pattern; FIG. 15B is a top plan view showing the state in which the vehicle runs with its light distribution control lamps 112L, 112R radiating; and FIG. 15C shows the operation situations of rightward and leftward light distribution control lamps 112R and 112L at the running time. When rightward and leftward light distribution control lamps 112R and 112L are thus turned rightward as a whole, all light distribution patterns turn rightward.

Figure 16A:
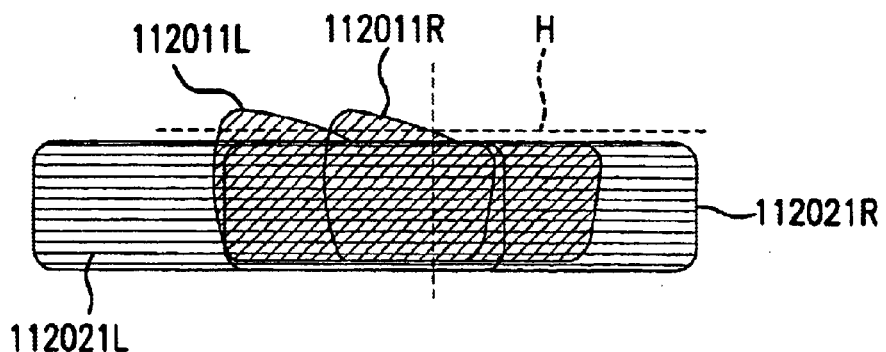
FIGS. 16A, 16B, and 16C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 16B:
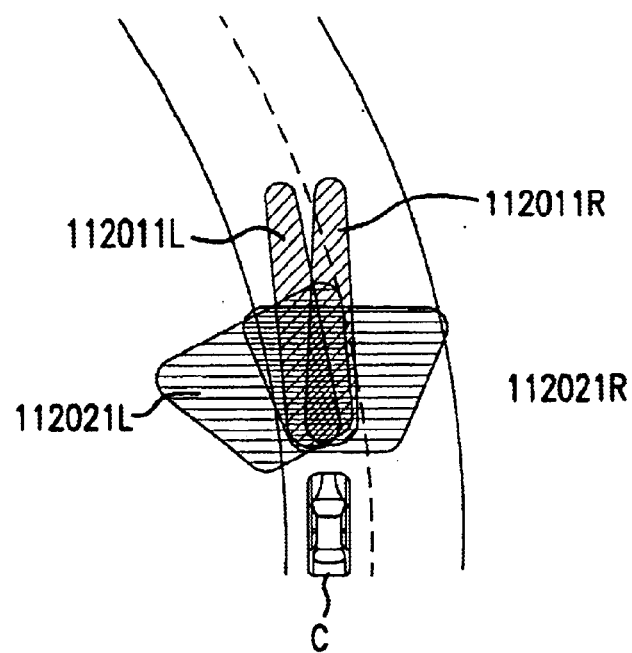
Figure 16C:
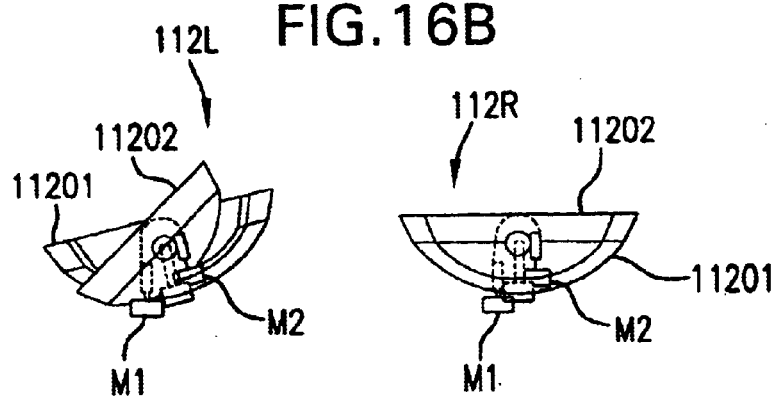

FIGS. 16A to 16C show a seventh situation in which whole leftward light distribution control lamp 112L turns once to the leftward and, thereafter, second reflector 11202 of the leftward light distribution lamp 11202 further turned to the leftward. FIG. 16A shows a variation in the light distribution pattern; FIG. 16B is a top plan view showing the state in which the vehicle runs with its light distribution control lamps 112L, 112R activated; and FIG. 16C shows the operation situations of rightward and leftward light distribution control lamps 112R and 112L in the case of FIG. 16B.

When leftward light distribution control lamp 112L is thus turned to the leftward or second reflector 11202 is further turned to the leftward, light distribution pattern 112011L for the leftward center light is turned to the leftward, and light distribution pattern 112021L for the leftward surrounding light is further turned to the leftward, but light distribution pattern 112021R for the rightward surrounding light and light distribution pattern 112011R for the rightward center light are leftward as they are (not displaced).

Figure 17A:
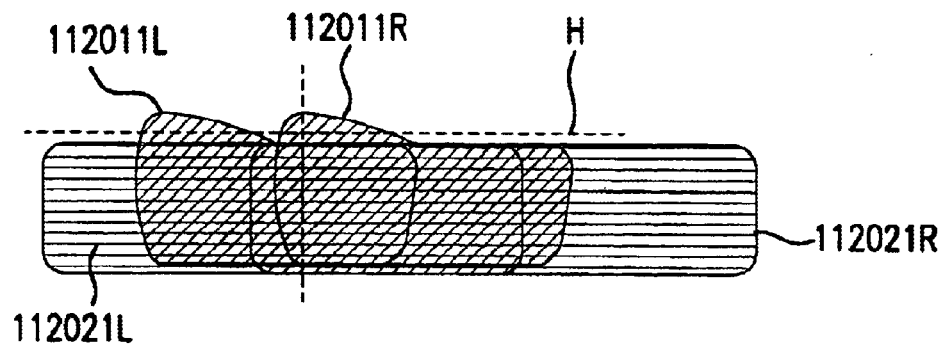
FIGS. 17A, 17B, and 17C are, in the case of the first preferred embodiment, a schematic front view representing a variation of the light distribution pattern, a schematic top view of the vehicle when the vehicle is running radiating the light beams from the light distribution control lamps, a schematic top view for explaining the operation state of both leftward and rightward light distribution control lamps, respectively.
Figure 17B:
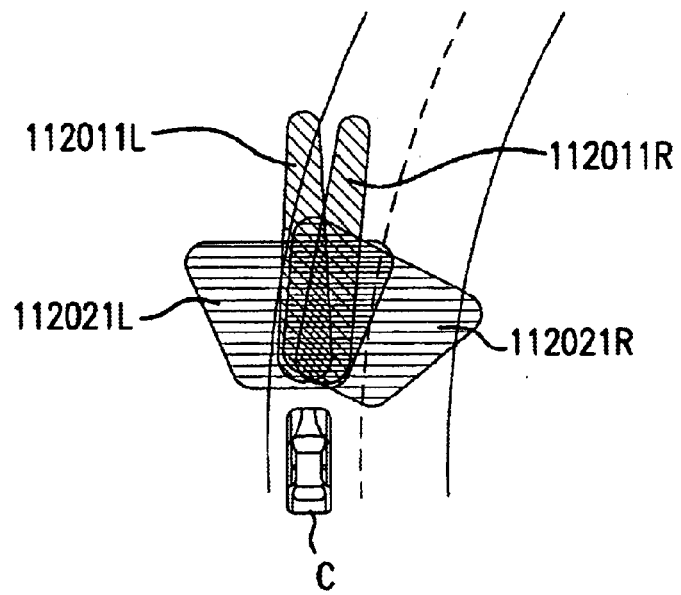
Figure 17C:
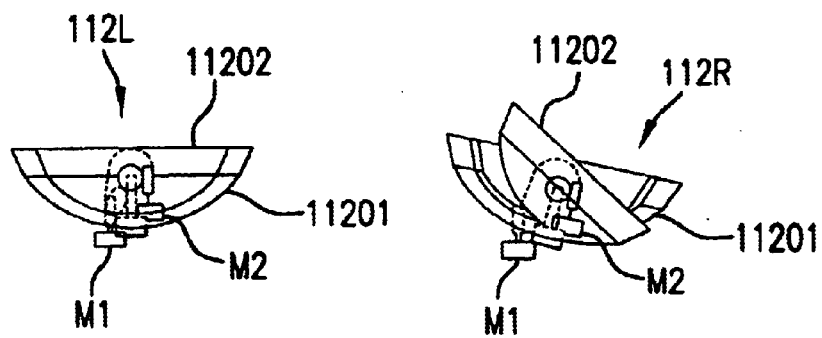

FIGS. 17A to 17C show the situations in which rightward light distribution control lamp 112R turns as a whole to the rightward and in which second reflector 11202 further turns to the rightward. FIG. 17A shows a variation in the light distribution pattern; FIG. 17B is a top plan view showing the state in which the vehicle runs with its light distribution control lamps 112L, 112R activated; and FIG. 17C shows the operation situation of rightward and leftward light distribution control lamps 112R and 112L in the case of FIG. 17B.

When rightward light distribution control lamp 112R is thus turned to the rightward and second reflector 11202 is further turned to the rightward, light distribution pattern 112011R for the rightward center light is turned to the rightward, and light distribution pattern 112021R for the rightward surrounding light is further turned to the rightward, but light distribution pattern 112011L for the rightward surrounding light and light distribution pattern 112011L for the rightward center light are leftward as they are (not displaced).

Next, processes executed in the vehicular lamp system will hereinafter be described in details.
[Procedure of Entire Vehicular Lamp System]

Figure 18:
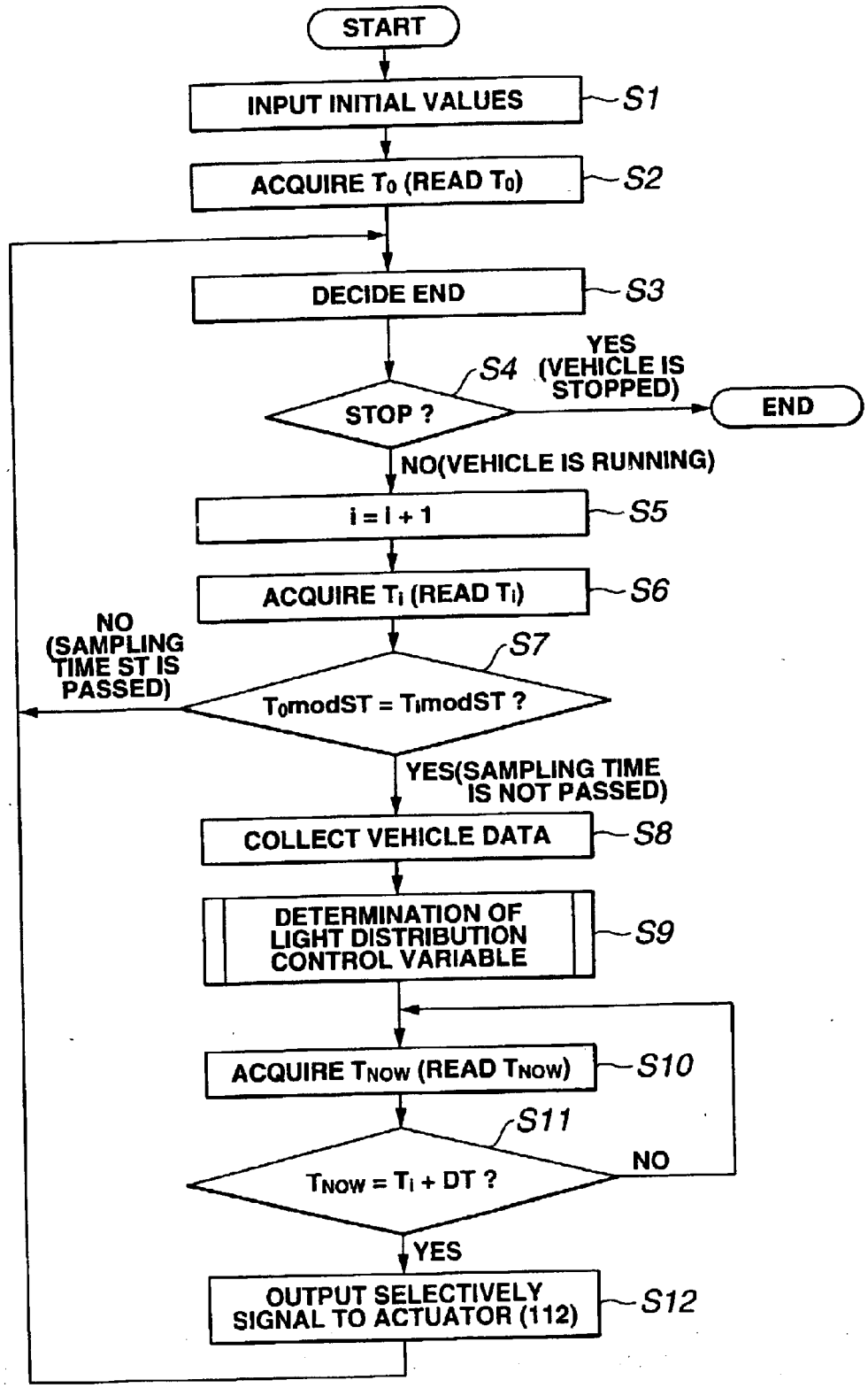
FIG. 18 is a whole operational flowchart representing a whole process in the case of the first preferred embodiment.

FIG. 18 is an operational flowchart showing the entire procedure of the vehicular lamp system in the preferred embodiment. When the procedure is started, controller 3 executes an operation of Input Initial Value at Step S1 (It is noted that Step S will, hereinafter, shortly be expressed as only S). In this operation to input the initial value, controller 3 read various constants, e.g., sampling period ST, as will be described hereinafter. At S2, controller 3 executes the operation of Acquire To so as to read time counter value To (1 ms/count).

At S3, controller 3 executes the operation as Decide End so as to decide the start of the engine, for example. At S4, controller 3 makes the decision of whether STOP is made. If the engine is not started so that controller 3 decides that vehicle C is not in the running state, the routine shown in FIG. 18 is ended (END). If the engine is started so as to decide that the vehicle is running, controller 3 executes an increment operation of "i=i+1" at S5. At S6, controller 3 executes the operation as Acquire Ti so as to read the time counter count value Ti (1 ms/count) for each time at which the routine enters S6.

At S7, controller 3 makes a determination of whether $T_0 \text{modST} = T_1 \text{modST}$ so as to decide whether it is the present time at which a time is passing sampling period ST. In this embodiment, sampling period ST is set to 100 (milliseconds). The operations of S3, S4, S5 and S6 are executed until the present time has elapsed sampling period of ST, but operations of S3 to S12 within a time interval corresponding to the sampling period ST if sampling time ST has yet been passed (Yes).

At S8, controller 3 executes a process of Collect Vehicle Data so as to read steering angle δI(i) (deg), vehicle velocity V(i) (Km/h), and yawing rate γ(i) (degree/second) as variables.

At S9, controller 3 implements an operation of "Determination of light Distribution Control Variable". At S10, controller 3 executes an operation of Acquire $T_{NOW}$ so as to read the present time counter value $T_{NOW}$ (1 ms/count). At S11, controller 3 makes the decision of whether $T_{NOW}$=Ti+ DT so as to decide whether a delay time DT has elapsed. It is noted that delay time DT is a period of time from a time at which the start of the routine is carried out to a time at which the supply of signals to motors M1 and M2 is carried out for the reflector deflective drive and is set to 40 (milliseconds), for example. This delay time DT permits the light distribution control to provide delay time DT after the steering operation so that the deflective drive can match to the feel of driver's driving sense.

At S11, the execution at S10 is repeatedly executed until delay time DT has been elapsed. After an lapse of delay time DT, controller 3 executes an operation of "Output Signals to Actuator (112)" of S12. At S12, on the basis of the light distribution control determined at S9, the signals are selectively outputted to the actuators or motors M1 and M2 of one light distribution control lamp 112 so that the deflective drives are made by first reflector 11201 and second reflector 11202 in the respective or either of the light distribution control lamps 112 depending on one of the situations described with reference to FIGS. 10A to 17C.

[Determination of Light Distribution Control]

Figure 19:
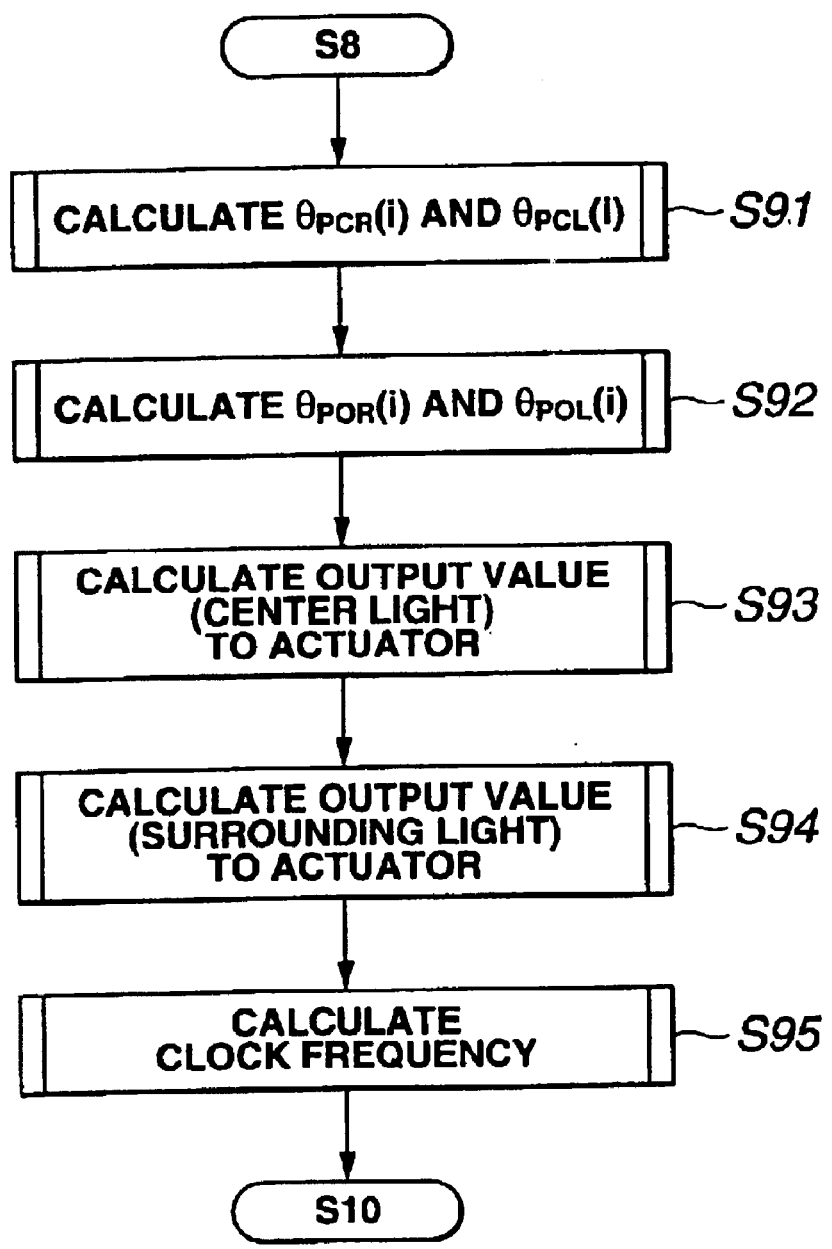
FIG. 19 is an operational flowchart representing a decision process of a light distribution control variable in the case of the first preferred embodiment.

FIG. 19 schematically shows a subroutine of "Determination of Light Distribution Controlled Variable" at S9 of FIG. 18.

At first S91, controller 3 executes such a calculation operation as Calculate $\theta_{PCR}(i)$ and $\theta_{PCL}(i)$ so as to calculate controlled variable $\theta_{PCR}(i)$ of the rightward center light, i.e., the deflection drive controlled variable of rightward first reflector 11201 (this is, hereinafter, called a "panning angle of the center light") and the control $\theta_{PCL}(i)$ of the leftward center light, i.e., the deflection drive variable of leftward first reflector 11201, as a determined value.

At S92, the execution such that "Calculate $\theta_{POR}$ (i) and $\theta_{POL}(i)$" is implemented by controller 3 so as to calculate a controlled variable $\theta_{POR}$ (i) of the rightward surrounding light, i.e., the deflection drive variable of rightward second reflector 11202 (such a deflection drive variable for rightward second variable is, hereinafter, also called a panning angle of the surrounding light) and controlled variable $\theta_{POL}(i)$ of the leftward surrounding light, i.e., the deflection drive variable of leftward second reflector 11202 as another determined value.

At S93, the execution such that "Calculate (on Center light) Output Value to Actuator" is implemented by controller 3 to calculate the output value to motor M1 for driving first reflector 11201 to be deflectively driven to achieve panning angle $\theta_{PCR}(i)$ of the rightward center light and panning angle $\theta_{PCL}(i)$ of the leftward center light calculated at S91.

At S94, controller 3 executes a calculation operation of "Calculate (on Surrounding light) Output Value to Actuator" so as to calculate the output to motor M2 for driving second reflector 11202 deflectively to achieve panning angle $\theta_{POR}$ (i) of the rightward surrounding light and panning angle $\theta_{POL}(i)$ of the leftward surrounding light calculated at S92.

At S95, controller 3 carries out the execution such that "Calculate Clock Frequency". The details of these steps S91 to S95 will be described later.

[Calculation of Panning Angles of Rightward/Leftward Center Lights]

Figure 20:
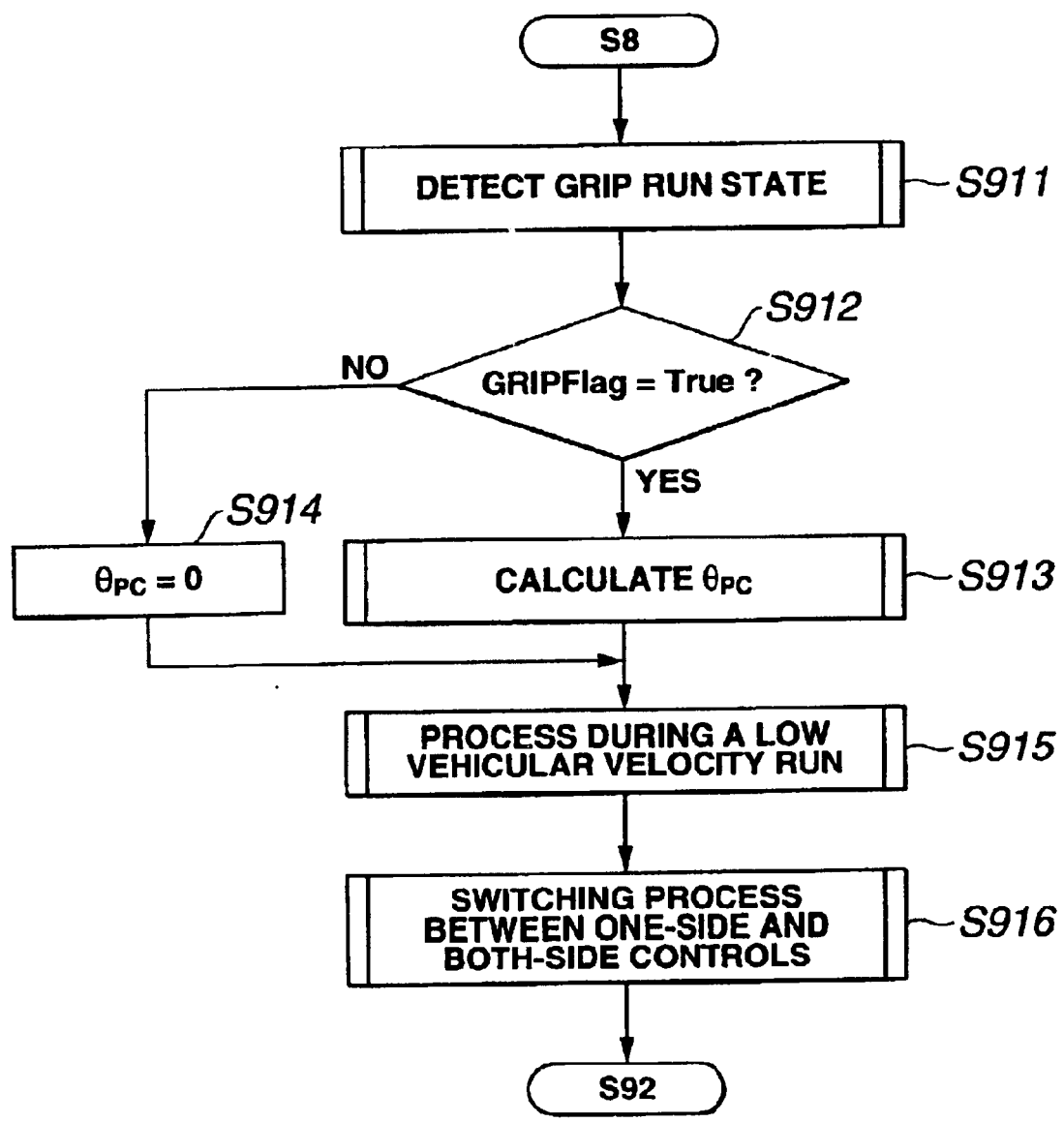
FIG. 20 is an operational flowchart representing a calculation process of a center light spanning angle in the case of the first preferred embodiment.

FIG. 20 shows a subroutine at S91 in FIG. 19.

At S911 shown in FIG. 20, controller 3 executes a monitoring operation as "Detect Grip Run State" to detect a spin state of vehicle C by detecting whether vehicle C is in a grip run state.

If a product of a yaw rate and a steering angle produces a negative value at S911, for example, controller 3 determines that vehicle C is counter-steered or spun.

Next, at S912, controller 3 determines if "GRIPflag= True", viz., to decide whether or not the grip run state is True. The routine goes to S913 if Yes (at S912) but goes to S914 if No (at S912).

At S913, controller 3 executes as "Calculate $\theta_{PC}$" so as to calculate a provisional value of panning angle $\theta_{PC}$ of the center light. Then, the routine goes to S915.

When the routine goes to S914, controller 3 executes as follows: "$\theta_{PC}$=0" so as to set panning angle $\theta_{PC}$ of the center light to zero. Then, the routine goes to S915.

When decided that the vehicle is spun, therefore, the radiation direction by first reflector 11201 can be returned to or fixed at the front of vehicle C so that the radiation range in accordance with the spin state can properly be controlled. When controller 3 decides that vehicle C is spun, the light radiation direction by second reflector 11202 can also simultaneously be returned to or fixed at the front radiation range of vehicle C.

At S915, controller 3 executes as follows: "Process During A Low Vehicular Velocity" so as to set a provisional value of panning angle $\theta_{PC}$ of the center light at a low vehicular velocity.

At S916, controller 3 executes as follows: "Switching Process Between one-side/both-side Controls" so as to determine the rightward and leftward controlled variables of rightward and leftward first reflectors 11201. The executions at S911, S913, S915, and S916 will be described hereinafter.

[Detection of Grip Run State]

Figure 21:
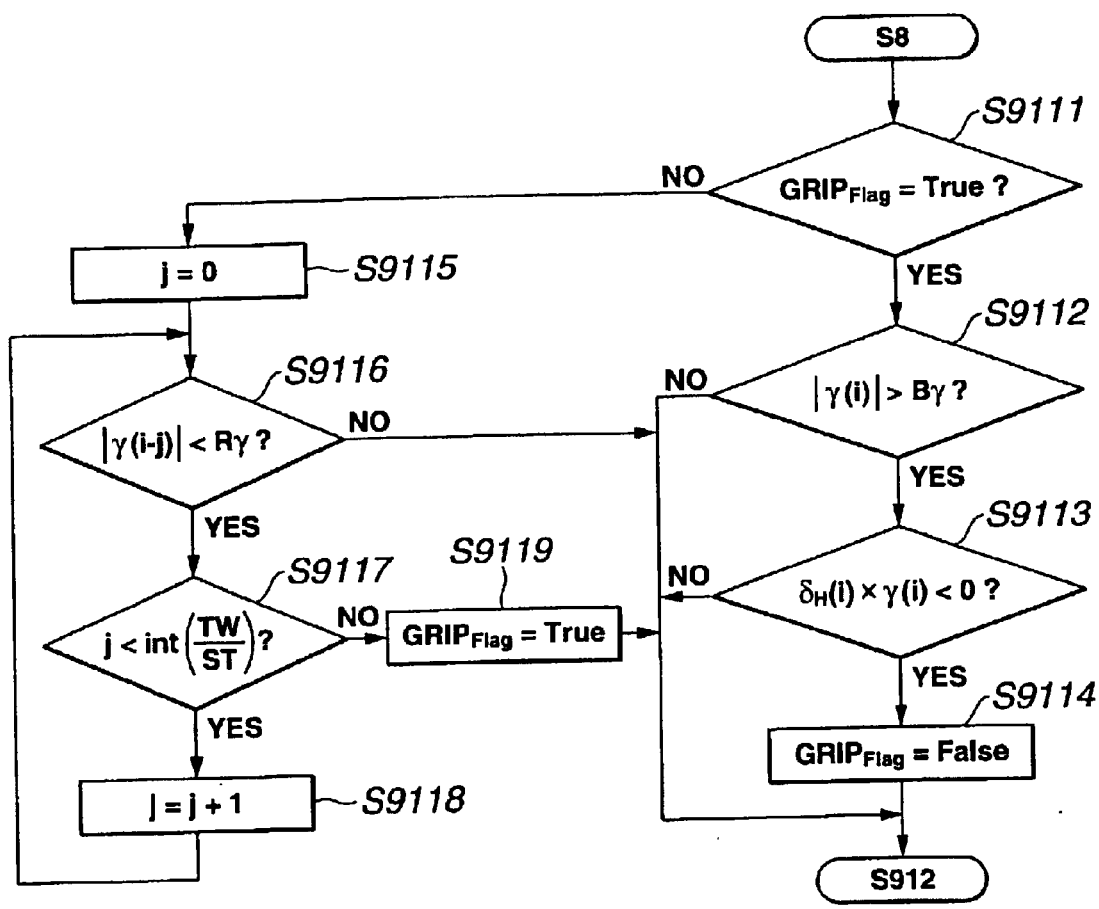
FIG. 21 is an operational flowchart representing a detection process of a grip run state in the case of the first preferred embodiment.

FIG. 21 shows a detailed subroutine at S911 in FIG. 20.

At S9111, controller 3 executes a calculation as GRIPflag=True so as to decide whether or not vehicle C is in the grip state. The routine goes to S9112, if Yes. If No at S9111, the routine goes to S9115.

At S9112, controller 3 determines if $|\gamma(i)| > B\gamma$. It is noted that γ(i) denotes the yawing rate (degree/second) which has been obtained by collecting the vehicle data at S8 in FIG. 18. In addition, Bγ denotes a reference yawing rate, at which the monitor of the gripping state/non-gripping state is started. In the first embodiment, yawing rate Bγ=5 (degree/second) has been read as constant at S1 in FIG. 18. When the detected yawing rate |γ(i)| exceeds Bγ=5 (degree/second), therefore, the routine goes to S9113, at which the monitoring of whether the grip state or non-grip state is started. Otherwise (No at S9111), the routine goes to S912 without the monitoring described above.

At S9113, controller 3 makes the decision of whether $\delta_H(i) \times \gamma(i) < 0$ so as to monitor whether or not vehicle C is gripping. It is noted that $\delta_H(i)$ denotes a steering angle (degree), which has been read as a variable in the operation of "Collect Vehicle Data" at S8. In this embodiment, $\delta_H(i)$ is sampled at a pitch of 2 degrees. If the answer at S9113 is Yes, controller 3 decides the non-gripping state and the routine goes to S9114. If No at S9113, controller 3 decides the grip state and the routine goes to S912. At S9114, controller 3 executes the calculation as GRIPflag=False so as to decide that grip flag GRIPflag represents the non-gripping state, viz., false.

At S9111, if the non-gripping state is decided, the routine goes to S9115. At S9115, controller 3 executes a subscript initialization as j=0 (j is initialized). At S9116, controller 3 determines if $|\gamma(i-j)|<R\gamma$, namely, to decide whether or not vehicle C has returned from the non-grip state to the grip state. It is noted that $\gamma(i-j)$ denotes a variation in the yawing rate which has been collected as the vehicle data as a variation rate of the yawing rate at S8 in FIG. 18, and $R\gamma$ denotes a recovery yawing rate, which is read as a constant of $R\gamma=5$ (degree/second) at S1 in FIG. 18, in this embodiment.

If the answer at S9116 is YES, namely, controller 3 decides that the gripping mode has been restored, the routine goes to S9117. If the answer of S9116 is No, namely, controller 3 determines that the non-grip state remains unchanged, the routine goes to S912 through S9119.

When the routine goes to S9117, controller 3 determines that $|\gamma(i-J)|$ is below recovery yawing rate $R\gamma$, and determines if j<int(TW/ST) to monitor whether the restored grip state has continued for a constant time period. It is noted that TW denotes a monitoring time period of the recovery yawing rate and has been read as constant of TW=1,000 (milliseconds) at S1 in FIG. 18, in this embodiment. By dividing monitoring time period TW of the recovery yawing rate by sampling time ST, controller 3 calculates the number of time points for measurements to be monitored. With TW=1 second and ST=0.1 second, for example, a result of this calculation indicates 1/0.1=10 so that $\gamma(i-9)$ is monitored from yawing rate values of $\gamma(i)$ at past ten time points.

If all yawing rates at the ten time points are below the recovery value, the routine goes to S9119. If the monitoring time period has not elapsed yet, an increment operation of j=j+1 is executed at S9118, and the contents of S9116 and S9117 are repeated.

If the answer at S9116 is No until the monitoring time period has elapsed, controller 3 decides that the non-grip state has occurred and the routine goes to S912.

At S9119, controller 3 executes the calculation operation as GRIPflag=True so as to set grip flag GRIPflag to grip state (i.e., True) and the routine goes to S912.

Figure 22:
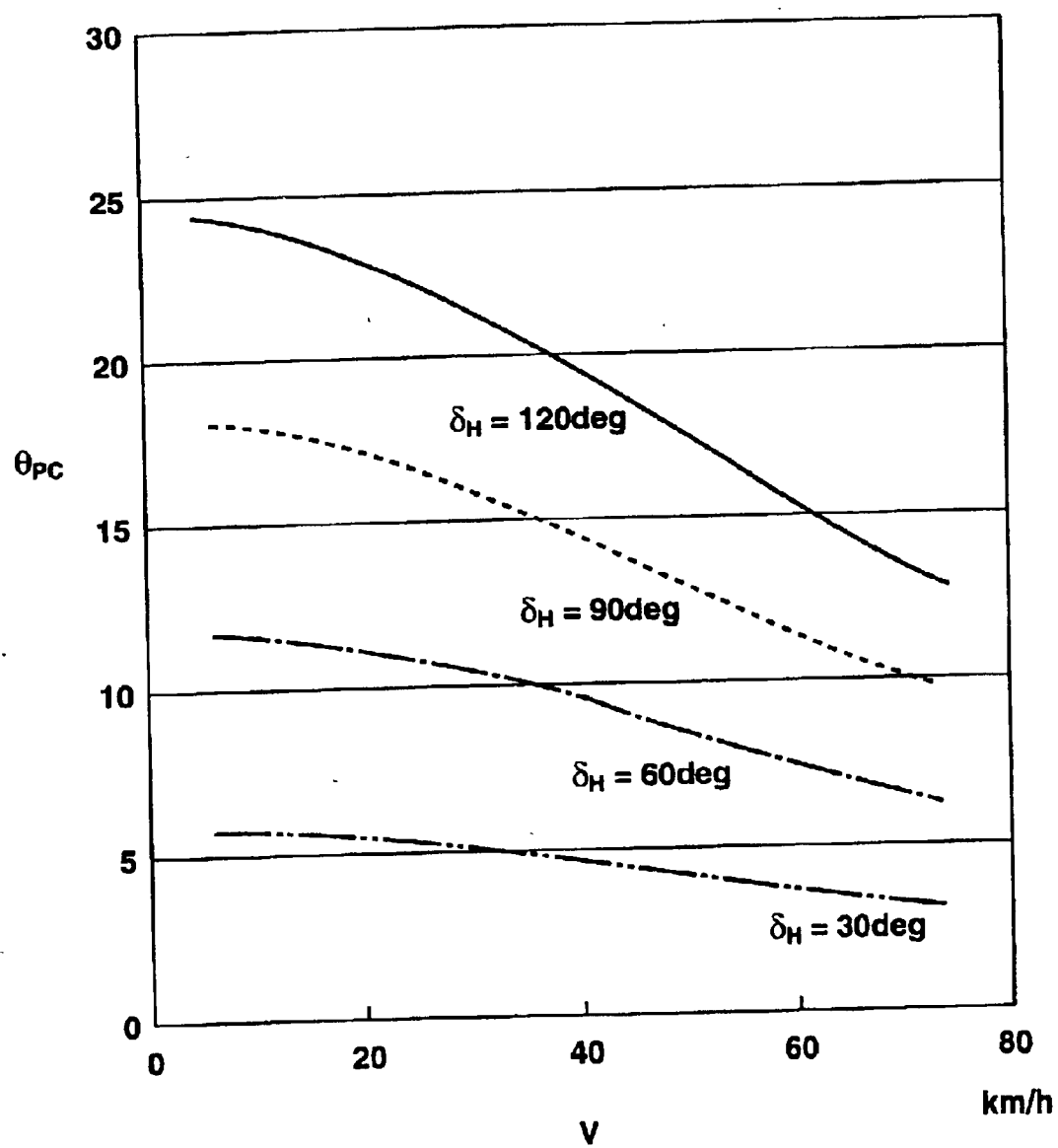
FIG. 22 is a characteristic graph representing a relationship among a steering angle of a vehicular steering wheel, a vehicular velocity, and panning angle, in the case of the first preferred embodiment.
Figure 23:
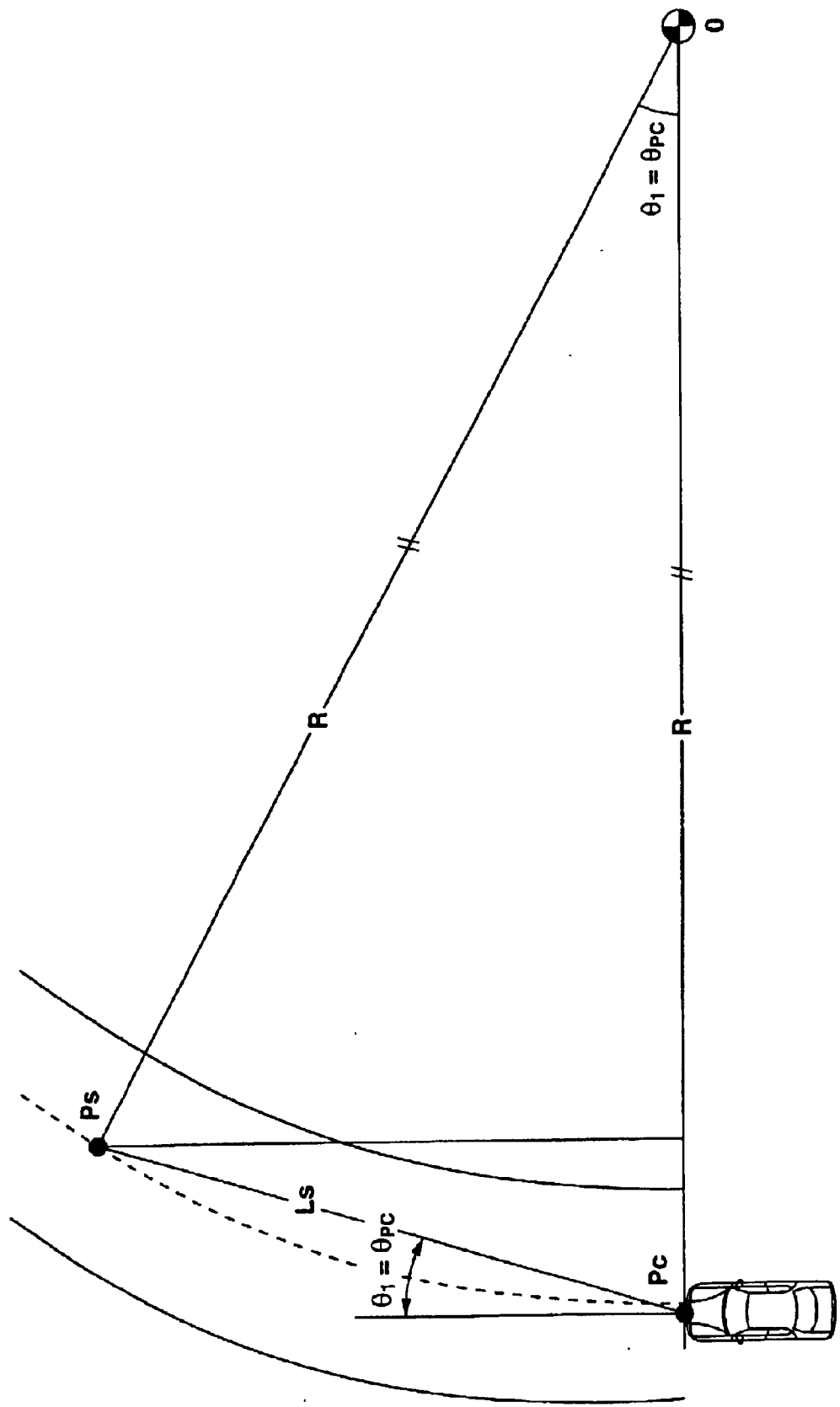
FIG. 23 is an explanatory view representing a relationship between a vehicular turn and an optical axis displacement, in the case of the first preferred embodiment.

It is noted that panning angle $\theta_{PC}$ is determined to correspond to steering angle $\delta_H$ in accordance with vehicular velocity V, as illustrated in FIG. 22. In the light distribution control, as illustrated in FIG. 23, panning angle $\theta_{PC}$ is determined to correspond to steering angle $\delta_H$. At this time, the following relationship is established between steering angle $\delta_H$ and panning angle $\theta_{PC}$.

$$\theta_{Pc} = \frac{K \cdot \delta_H}{N} \qquad \text{[Equation 1]}$$

In the Equation 1, N denotes a steering gear ratio, and K denotes a gain.

It is noted that one example of a determination of gain K will be described below.

As illustrated in FIG. 23, vehicle C is turn round on the center of a traffic lane with a radius of turn R.

If it is assumed that the vehicular driver in vehicle C recognizes the course visually, a point Ps at distance Ls on the course is to be visually recognized by the driver. Distance Ls can be defined as the gain of the center light, as described hereinbefore. At this time, a triangle, as constituted by a center O of a circle of turn, point Ps to be visually recognized by the driver, and a center point Pc at the front end of vehicle C is an isosceles triangle. If the distance from front end center point Pc of vehicle C to point Ps to be visually recognized is denoted by Ls and if the turn radius is denoted by R, angle $\theta_1$ can be determined by the following Equation, as contained by a segment between center point Pc and point Ps and by the forward direction of vehicle C:

$$\theta_1 = \sin^{-1} \frac{Ls}{2 \cdot R} \qquad \text{[Equation 2]}$$

The lamp is the brightest new its optical axis so that its brightest portion can radiate point Ps to be visually recognized by the driver if the optical axis is moved by angle $\theta_1$. If angle $\theta_1$, as contained by the segment between point Ps to be visually recognized by the driver and the front end center point Pc of vehicle C and by the forward direction of vehicle C, is equalized to movement $\theta_{PC}$ of the optical axis, the following Equation is established.

$$\theta_{PC} = \sin^{-1} \frac{Ls}{2 \cdot R} \qquad \text{[Equation 3]}$$

If tire steering angle $\delta_T$ at the time of turn a curve having the radius of curvature R at velocity V is denoted by $\delta_T$, the following Relation is established from among radius R, vehicular velocity V, and tire steering angle $\delta_T$:

$$R = \frac{1(1 + A \cdot V^2)}{\delta_T} \qquad \text{[Equation 4]}$$

(l: wheelbase of the vehicle, and A: stability factor).

It is noted that stability factor A and wheelbase 1 are vehicular dynamic characteristic values to determine turn (cornering) characteristics of vehicle C.

If Equation 4 is substituted into Equation 3, the following Equation is given:

$$\theta_{PC} = \sin^{-1} \frac{Ls \cdot \delta_T}{2 \cdot 1 \cdot N \cdot (1 + A \cdot V^2)} \qquad \text{[Equation 5]}$$

The following relationship holds between tire steering angle $\delta_T$ and steering angle $\delta_H$:

$$\frac{\delta_H}{\delta_T} = N \qquad \text{[Equation 6]}$$

(N: steering gear ratio).

Therefore, Equation 6 can be expressed as follows:

$$\theta_{PC} = \sin^{-1} \frac{Ls \cdot \delta_H}{2 \cdot 1 \cdot N \cdot (1 + A \cdot V^2)} \qquad \text{[Equation 7]}$$

The following Equation [Equation 8] is given:

$$\sin\left[\frac{\pi}{180}\theta_{PC}(deg)\right] = \frac{\pi \cdot Ls}{360 \cdot 1 \cdot (1+AV^2)} \cdot \frac{\delta_H(deg)}{N} \quad \text{[Equation 8]}$$

Within a range of $-15 \leq \theta_{PC}$ (deg) $\leq 15$, Equation 8 can be approximated into the following Equation:

$$\sin\left[\frac{\pi}{180}\theta_{PC}(deg)\right] \cong \frac{1}{60}\theta_{PC}(\text{degree}) \quad \text{[Equation 9]}$$

In the equations, (deg) denotes degree.

Therefore, the following Equation is derived.

$$\frac{1}{60}\theta_{PC}(deg) = \frac{\pi \cdot Ls}{360 \cdot 1 \cdot (1+AV^2)} \cdot \frac{\delta_H(deg)}{N}$$

$$\theta_{PC}(deg) = \frac{\pi \cdot Ls}{6 \cdot 1 \cdot (1+QV^2)} \cdot \frac{\delta_H(deg)}{N}$$

If the following relationship is assumed, $$\theta_{PC}(deg) = K\frac{\delta_H(deg)}{N} \quad \text{[Equation 10]}$$

Then, gain K is expressed by the following Equation:

$$K = \frac{\pi \cdot Ls}{6 \cdot 1 \cdot (1+AV^2)} \quad \text{[Equation 11]}$$

[Calculation of $\theta_{PC}$]

Figure 24:
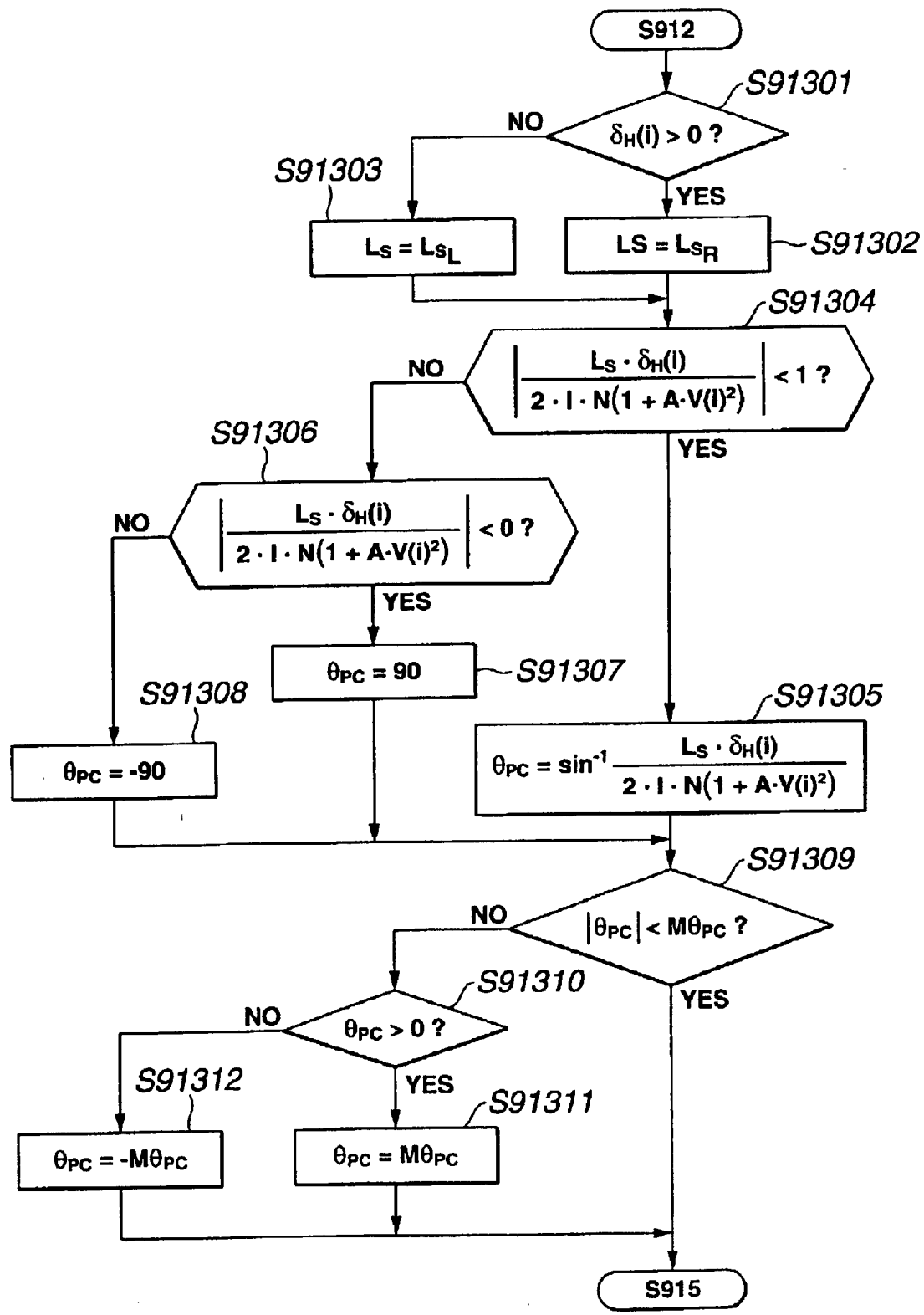
FIG. 24 is an operational flowchart representing a calculation process of the center light spanning angle, in the case of the first preferred embodiment.

FIG. 24 shows a detailed flowchart at S913 in FIG. 20. With reference to FIG. 24, the calculation of a provisional value of panning angle $\theta_{PC}$ of the center light will be described below.

That is to say, at S91301, controller 3 determines if $\delta_H(i) > 0$ so as to decide the steering direction of vehicle C.

If this answer is YES, viz., the rightward steering is the steering direction. The routine goes to S91302.

Otherwise, the leftward steering is decided to be the steering direction and the routine advances to S91303.

At S91302, controller 3 executes as follows: $Ls=Ls_R$. On the other hand, at S91303, controller 3 executes $Ls=Ls_L$. It is noted that Ls denotes a gain for determining the deflection drive variable in accordance with the steering angle, and $Ls_R$ denotes a rightward center light gain, which has been inputted as a constant of $Ls_R=12$ at S1 in FIG. 18, in this embodiment. $Ls_L$ denotes a leftward center light gain, which has been inputted as a constant of $Ls_L=12$ at S1 in FIG. 18, in this embodiment. The difference between the rightward and leftward center light gains $Ls_R$ and $Ls_L$ is based on the fact that the forward distance to be visually recognized is different in the leftward lane between the cases in which vehicle C is turned toward rightward direction and the leftward direction.

At S91304, controller 3 decides from the following relationship whether or not provisional value $\theta_{PC}$ of the center light panning angle is within ±90 degrees:

$$|Ls \cdot \delta_H(i)/2 \cdot l \cdot N(1+AV(i)^2)| < 1.$$

If controller 3 decides that provisional value $\theta_{PC}$ of the center light panning angle is below +90 degrees, the routine goes to S91305. If not, the routine goes to S91306.

At S91305, provisional value $\theta_{PC}$ of the center light panning angle is calculated using the following equation and the routine goes to S91309. That is to say, $$\theta_{PC}=\sin^{-1}\{Ls \cdot \delta_H(i)/2 \cdot l \cdot N(1+AV(i)^2)\}.$$

At S91306, according to the following relationship, controller 3 determines whether the steering direction is rightward or leftward:

$$\{Ls \cdot \delta_H(i)/2 \cdot l \cdot N(1+AV(i)^2)\}.$$

The routine goes to S91307 in the case of the rightward steering but goes to S91308 in the case of the leftward steering. At S91306, it is sufficient to decide the rightward or leftward steering direction, and this decision may be made in terms of the steering angle as at S91301.

At S91307, provisional value $\theta_{PC}$ of the center light panning angle is set to 90 degrees by setting $\theta_{PC}$ as follows: $\theta_{PC}=90$.

At S91308, provisional value $\theta_{PC}$ of the center light-panning angle is set to −90 (degrees) by setting $\theta_{PC}$ as follows: $\theta_{PC}=-90$. Then, the routine goes from either S91307 or S91308 to S91309.

At S91309, controller 3 determines whether $|\theta_{PC}| < M\theta_{PC}$. It is noted that $M\theta_{PC}$ denotes a maximum panning angle of the center light, which has been read as constant $M\theta_{PC}=15$ (degrees) at S1 in FIG. 18, in this embodiment.

Then, the routine directly goes to S915 shown in FIG. 21, if the absolute value of center light panning angle $\theta_{PC}$ is below maximum panning angle $M\theta_{PC}$ but otherwise (No at S91309) goes to S91310.

At S91310, controller 3 determines whether $\theta_{PC} > 0$ to decide whether vehicular steering direction is the rightward steering or the leftward steering.

The routine goes to S91311, if the steering direction is rightward. In the other case, the routine goes to S91312 (if leftward).

At S91311, controller 3 sets $\theta_{PC}=M\theta_{PC}$ to set provisional value $\theta_{PC}$ of the center light panning angle to maximum panning angle $M\theta_{PC}$ of the center light.

At S91312, provisional value $\theta_{PC}$ of the center light panning angle is set to maximum panning angle $-M\theta_{PC}$ of the center light. After these two settings, the routine goes to S915.

[Process During Low Vehicular Velocity]

Figure 25:
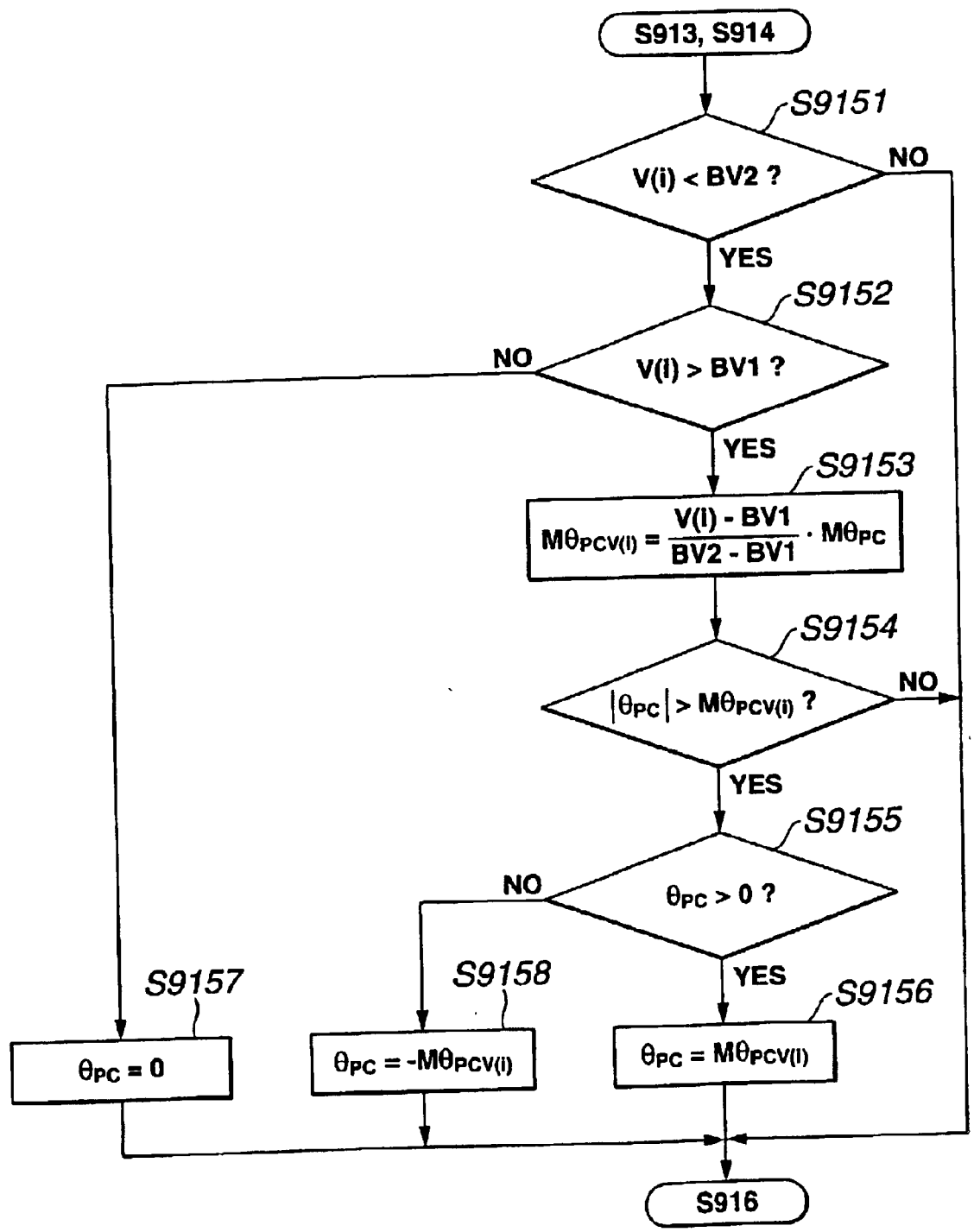
FIG. 25 is an operational flowchart representing a process in a case of a low vehicular velocity run, in the case of the first preferred embodiment.

FIG. 25 shows a detailed flowchart of the process at a low vehicular velocity of S915 of FIG. 20.

At S9151, as shown in FIG. 25, controller 3 determines if V(i)<BV2. It is noted that BV2 denotes a vehicular velocity at which the center light moves within a range of the maximum panning angle and which has been read as constant as BV2=30 (Km/h) at S1 in FIG. 18, in this embodiment.

If vehicular velocity V(i) exceeds BV2 so that vehicular velocity V(i) is decided to fall within middle and high velocity ranges (Yes), the routine goes to S916. Otherwise (if No at S9151), the routine goes to S9152.

At S9152, controller 3 determines if V(i)>BV1. It is noted that BV1 denotes a vehicular velocity at which the center light starts to move and which has been read as constant of BV1=15 (Km/h) at S1 in FIG. 18, in this embodiment.

If vehicular velocity V(i) exceeds BV1 so that the vehicular velocity is decided to fall within a low velocity range (Yes), the routine goes to S9153. Otherwise, the vehicular velocity is decided to fall within an extremely low velocity range and the routine goes to S9157.

At S9153, provisional value $\theta_{PC}$ of the maximum panning angle of the center light at velocity V(i) is calculated from the following equation:

$$M\theta_{PC}V(I)=\{(V(i)-BV1)/(BV2-BV1)\} \cdot M\theta_{PC}.$$

At S9154, controller 3 determines whether $|\theta_{PC}|>M\theta_{PC}$ V(I). The routine goes to S916, if an absolute value of provisional value $\theta_{PC}$ of the center light panning angle is below the maximum panning angle of the center light at vehicular velocity V(i). Otherwise (if No at S9154), the routine goes to S9155.

At S9155, controller 3 determines if $\theta_{PC}>0$ to determine whether the steering is rightward or leftward is decided depending upon whether provisional value $\theta_{PC}$ of the center light panning angle is positive or negative. If provisional value $\theta_{PC}$ of the center light panning angle is over zero, it is decided by controller 3 that the steering is rightward, and the routine goes to S9156. Otherwise, it is decided by controller 3 the steering is leftward, and the routine goes to S9158.

At S9156, controller 3 executes the setting of $\theta_{PC}=M\theta_{PC}$ V(I) so as to set provisional value $\theta_{PC}$ of the center light panning angle to maximum panning angle $M\theta_{PC}$ V(I) of the center light at vehicular velocity V(i) in the rightward steering but to maximum panning angle $-M\theta_{PC}$ V(I) of the center light at vehicular velocity V(i) in the leftward steering.

When vehicular velocity V(i) is extremely low, on the other hand, controller 3 executes a set operation of $\theta_{PC}=0$, at S9157, so as to set provisional value $\theta_{PC}$ of the center light panning angle to zero. Then, the routine goes to S916.

[Switching of One-side/Both-sides Controls]

Figure 26:
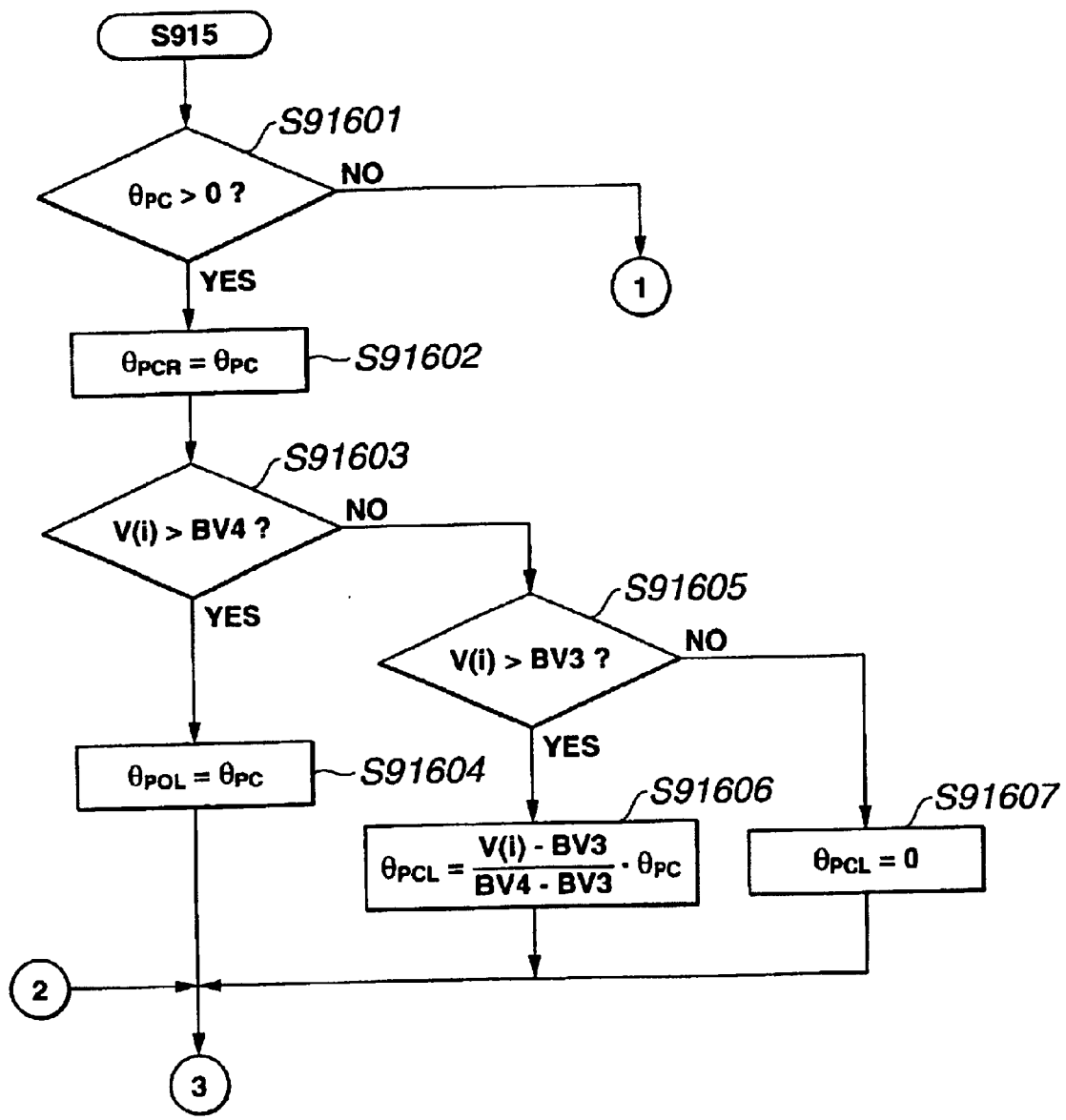
FIG. 26 is an operational flowchart representing a switching process of, so-called, one-side and both-side controls, in the case of the first preferred embodiment.
Figure 27:
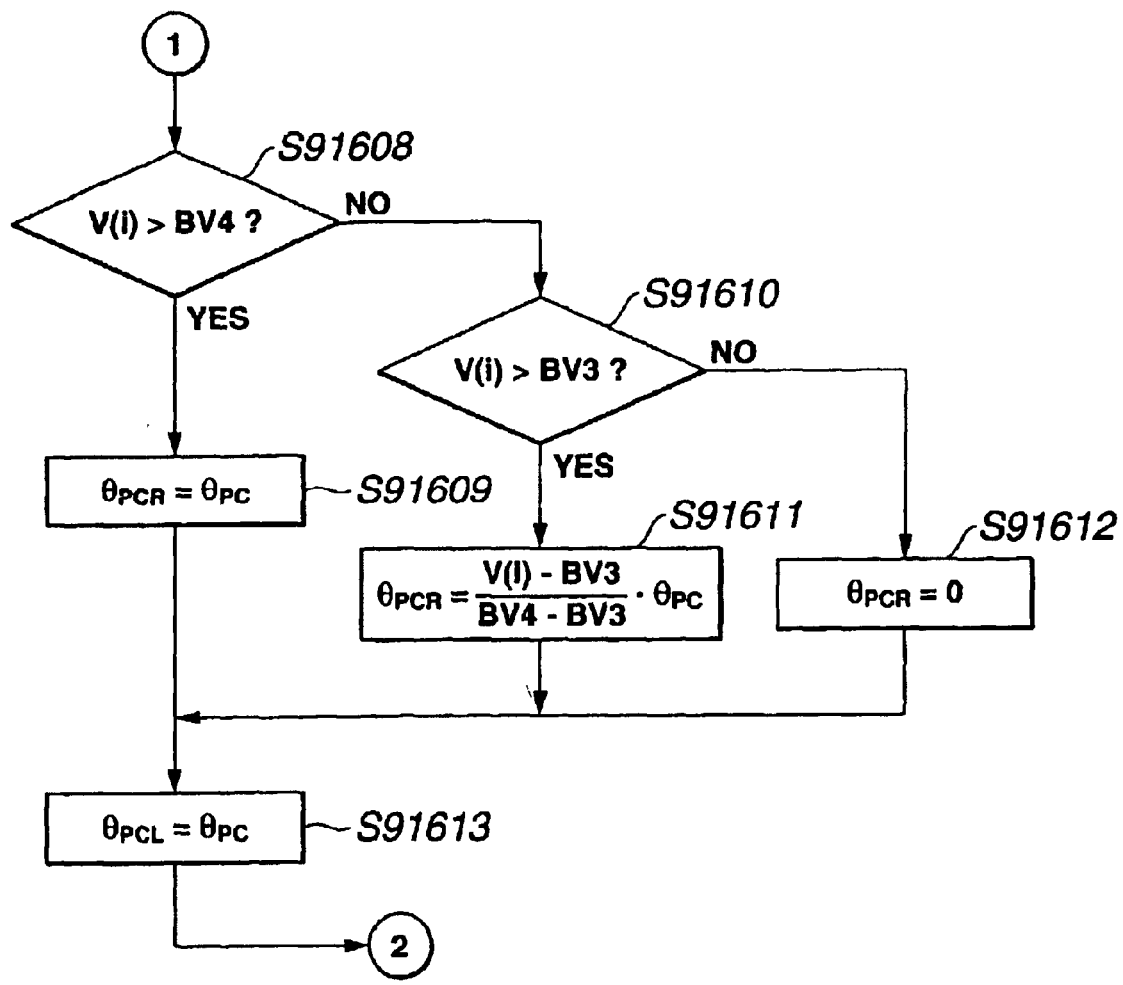
FIG. 27 is an operational flowchart representing a switching process of, so-called, one-side and both-side controls, in the case of the first preferred embodiment.
Figure 28:
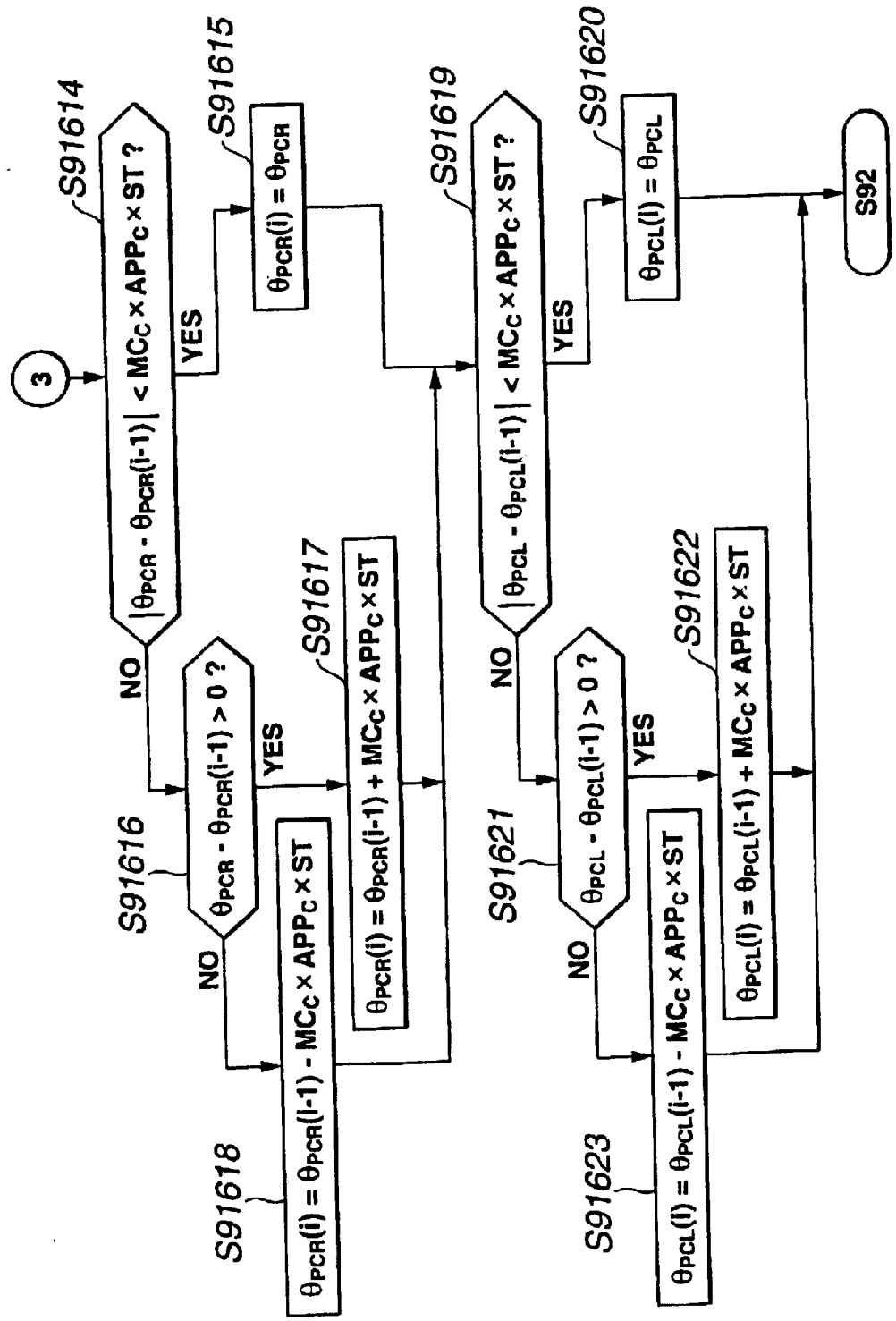
FIG. 28 is an operational flowchart representing a switching process of, so-called, one-side and both-side controls, in the case of the first preferred embodiment.

FIGS. 26, 27, and 28 show detailed flowcharts of switching of one-side/both-sides controls at S916 of FIG. 20. It is noted that one-side control is the control for one of rightward and leftward light distribution control lamps 112R or 112L and that both-side control is the control for each of rightward and leftward light distribution control lamps 112R and 112L.

First of all, at S91601, as shown in FIG. 26, controller 3 determines if $\theta_{PC}>0$ so as to decide whether the steering is rightward or leftward. If this answer is Yes, the steering is decided to be rightward. Then, the routine goes to S91602. If No (at S91601), the steering direction is decided by controller 3 to be leftward and the routine goes to S91608 of FIG. 27.

At S91602, controller 3 executes the setting operation of $\theta_{PCR}=\theta_{PC}$ to set provisional value $\theta_{PCR}$ of the rightward center light panning angle to provisional value $\theta_{PC}$, as has been set, of the center light panning angle.

On the other hand, at S91603, controller 3 makes the decision of whether V(i)>BV4. It is noted that BV4 denotes a vehicular velocity at which the center light on the un-turning side moves within the range of the maximum panning angle and which has been read as a constant of BV4=60 (Km/h) at S1 in FIG. 18, in this embodiment. It is also noted that the term of un-turning side used in the specification means an outside of the vehicular turn direction with respect to the center of the circle of turn, If vehicular velocity V(i) exceeds BV4, it is decided by controller 3 that vehicular velocity V(i) falls in the high velocity range, and the routine goes to S91604. Otherwise, the routine goes to S91605.

At S91604, controller 3 executes operation of $\theta_{PCL}=\theta_{PC}$ to set provisional value $\theta_{PCL}$ of the leftward center light panning angle on the un-turning side to provisional value $\theta_{PC}$, as set before, of the center light panning angle, and the routine goes to S91614 of FIG. 28.

At S91605, controller 3 determines if V(i)>BV3. It is noted that BV3 denotes a vehicular velocity at which the center light on the un-turning side starts to move and which has been read as a constant of BV3=40 (Km/h) at S1 in FIG. 18, in this embodiment. If vehicular velocity V(i) exceeds BV3 (Yes), controller 3 decides that the vehicular velocity is in the middle velocity range and the routine goes to S91606. Otherwise (If No at S91605), the routine goes to S91607.

At S91606, provisional value $\theta_{PCL}$ of the leftward center light panning angle is calculated from the following equation:

$$\theta_{PCL}=\{(V(i)-BV3)/(BV4-BV3)\}\cdot\theta_{PC}.$$

In the middle velocity range, therefore, provisional value $\theta_{PCL}$ of the leftward center light panning angle is calculated according to vehicular velocity V(i). Then, the routine goes to S91614 of FIG. 28.

At S91607, controller 3 executes a setting operation as $\theta_{PCL}=0$ so as to set provisional value $\theta_{PCL}$ of the leftward center light panning angle to zero.

If, at S91601, controller 3 decides that vehicle C is turn leftward, the routine goes to S91608 of FIG. 27. Controller 3 determines if V(i)>BV4 at S91608. If it is decided by controller 3 that vehicular velocity V(i) exceeds BV4 and that vehicle C is running in the high velocity range, the routine goes to S91609 shown in FIG. 27. Otherwise (No at S91608), the routine goes to S91610.

At S91609, controller 3 executes the operation of $\theta_{PCR}=\theta_{PC}$ to set provisional value $\theta_{PCR}$ of the rightward center light panning angle on the un-turning side to provisional value $\theta_{PC}$, of the center light panning angle and the routine goes to S91613.

At S91613, controller 3 sets as follows: $\theta_{PCL}=\theta_{PC}$ so as to set provisional value $\theta_{PCL}$ of the leftward center light panning angle on the turning side to provisional value $\theta_{PC}$, of the center light panning angle. Then, the routine goes to S91614 of FIG. 28. It is noted that the term of turning side, in this specification, means an inside of the turn direction of vehicle C with respect to the center of the circle of turn.

At S91610 in FIG. 27, controller 3 determines if V(i)>BV3. If it is decided by controller 3 that vehicular velocity V(i) exceeds BV3 and that vehicle C is running in the middle velocity range, the routine goes to S91611. Otherwise (No), controller 3 decides that vehicle C is running in the low vehicular velocity range (No at S91610) the routine goes to S91612.

At S91611, provisional value $\theta_{PCR}$ of the rightward center light panning angle according to the vehicular velocity is calculated from the following equation and the routine goes to S91613:

Namely, $\theta_{PCR}=\{(V(i)-BV3)/(BV4-BV3)\}\cdot\theta_{PC}.$

At S91612, controller 3 executes as follows $\theta_{PCR}=0$ to set provisional value $\theta_{PCR}$ of the rightward center light panning angle on the un-turning side to zero.

It is noted that S91614 to S91618 of FIG. 28 serves as a flowchart for determining value $\theta_{PCR}(i)$ of the rightward center light panning angle, and S91619 to S91623 serves as a flow for determining value $\theta_{PCL}(i)$ of the leftward center light panning angle.

At S91614 in FIG. 28, controller 3 determines whether $|\theta_{PCR}-\theta_{PCR}(i-1)|<MCc\times APPc\times ST$. It is noted that $\theta_{PCR}(i-1)$ denotes a previous (i-1) provisional value of the rightward center light panning angle and $|\theta_{PCR}-\theta_{PCR}(i-1)|$ denotes an absolute value of a variation in provisional value $\theta_{PCR}$ of the rightward center light panning angle. It is also noted that MCc denotes a center light panning angle, i.e., the maximum frequency of pulses for driving motor M1 to set the deflection drive variable for driving first reflector 11201. In this embodiment, MCc has been read as constant of MCc=290 (Hz) at S1 in FIG. 18, in this embodiment. It is further noted that APPc denotes the deflection drive variable of first reflector 11201 per pulse, which has been read as constant of APPc=0.188 (deg/pulse) at S1 in FIG. 18, in this embodiment. Therefore, MCc×APPc×ST denotes the maximum deflection drive variable in sampling period ST.

If controller 3 decides that $|\theta_{PCR}-\theta_{PCR}(i-1)|$ of the provisional value of the rightward center light panning angle is less than maximum deflection drive variable MCc×APPc×ST (Yes at S91614), the routine goes to S91615. Otherwise, the drive cannot be made by the calculated variable (No at S91614), the routine goes to S91616 for corrections.

When the routine goes from S91614 to S91615, controller 3 executes as $\theta_{PCR}(i)=\theta_{PCR}$ so that rightward center light panning angle $\theta_{PCR}(i)$ is determined to be the same as calculated provisional value $\theta_{PCR}$ of the rightward center light panning angle.

When the routine goes from S91614 to S91616, controller 3 decides $\theta_{PCR}-\theta_{PCR}(i-1)$ to decide whether the panning angle is deflectively driven for the rightward or the leftward. If provisional value $\theta_{PCR}$ of the rightward center light panning angle is over zero and positive, controller 3 determines that the deflective drive is for the rightward, and the routine goes to S91617. Otherwise, it is decided by controller 3 that the deflective drive is for the leftward, and the routine goes to S91618.

At S91617, controller 3 executes the operation of $\theta_{PCR}(i)=\theta_{PCR}(i-1)+$MCc×APPc×ST" so as to determine value $\theta_{PCR}(i)$ of the rightward center light panning angle as the sum of previous value $\theta_{PCR}(i-1)$ of the rightward center light panning angle at the preceding instant (previous time) and maximum deflection drive variable MCc×APPc×ST within sampling period ST.

At S91618, the same value is determined by subtracting them. In either case, the routine goes to S91619. It is noted that S91619 corresponds to S91614; S91621 to S91616; S91622 to S91617; and S91623 to S91618. In a similar process, leftward center light panning angle $\theta_{PCL}(i)$ is determined (at S91620, S91622 and S91623) by comparing (at S91619) $|\theta_{PCL}-\theta_{PCL}(i-1)|$ of the leftward center light panning angle with maximum deflection drive variable MCc×APPc×ST and by deciding (at S91621) of the deflecting direction of the panning angle.

[Calculations of $\theta_{POR}(i)$ and $\theta_{POL}(i)$]

Figure 29:
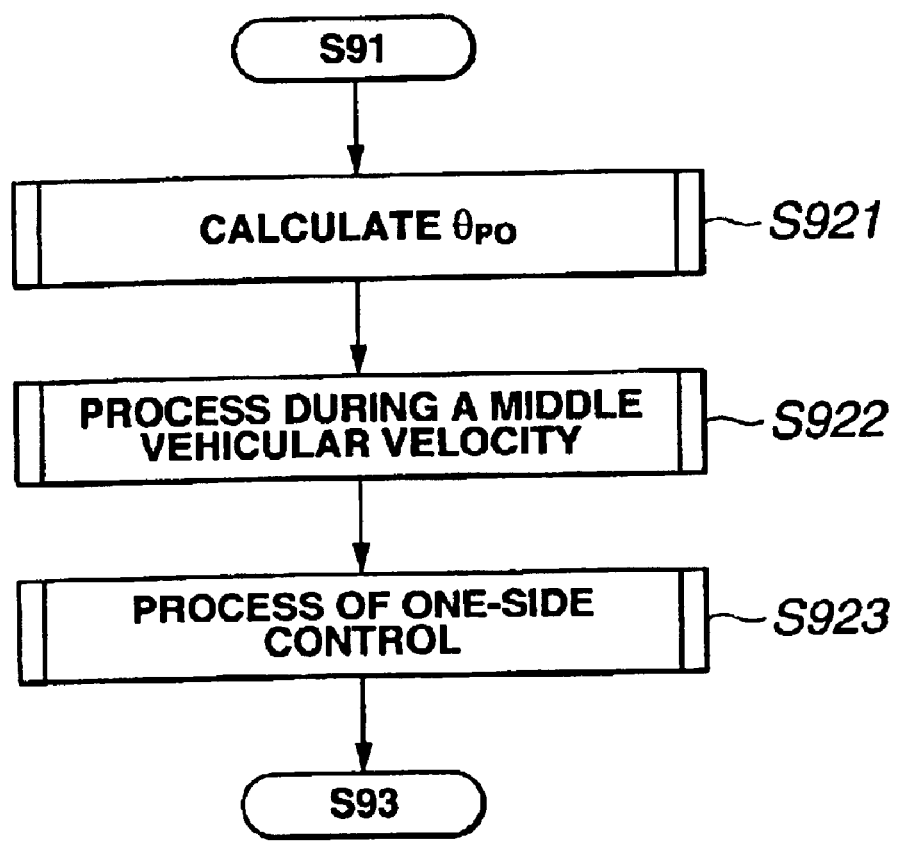
FIG. 29 is an operational flowchart representing a calculation process of a surrounding light panning angle, in the case of the first preferred embodiment.

FIG. 29 is a general flowchart at S92 in FIG. 19.

That is to say, at S921, controller 3 calculates as follows: calculation of $\theta_{PO}$ to derive the provisional value of the surrounding light panning angle, i.e., the deflection controlled variable for second reflector 11202.

At S922, controller 3 executes the operation of Convergence at Middle Velocity. The detailed process at S922 will be described later with reference to FIG. 31.

At S923, controller 3 executes the one-side control. The detailed process at S923 will be described later with reference to FIG. 32.

[Calculation of $\theta_{PO}$]

Figure 30:
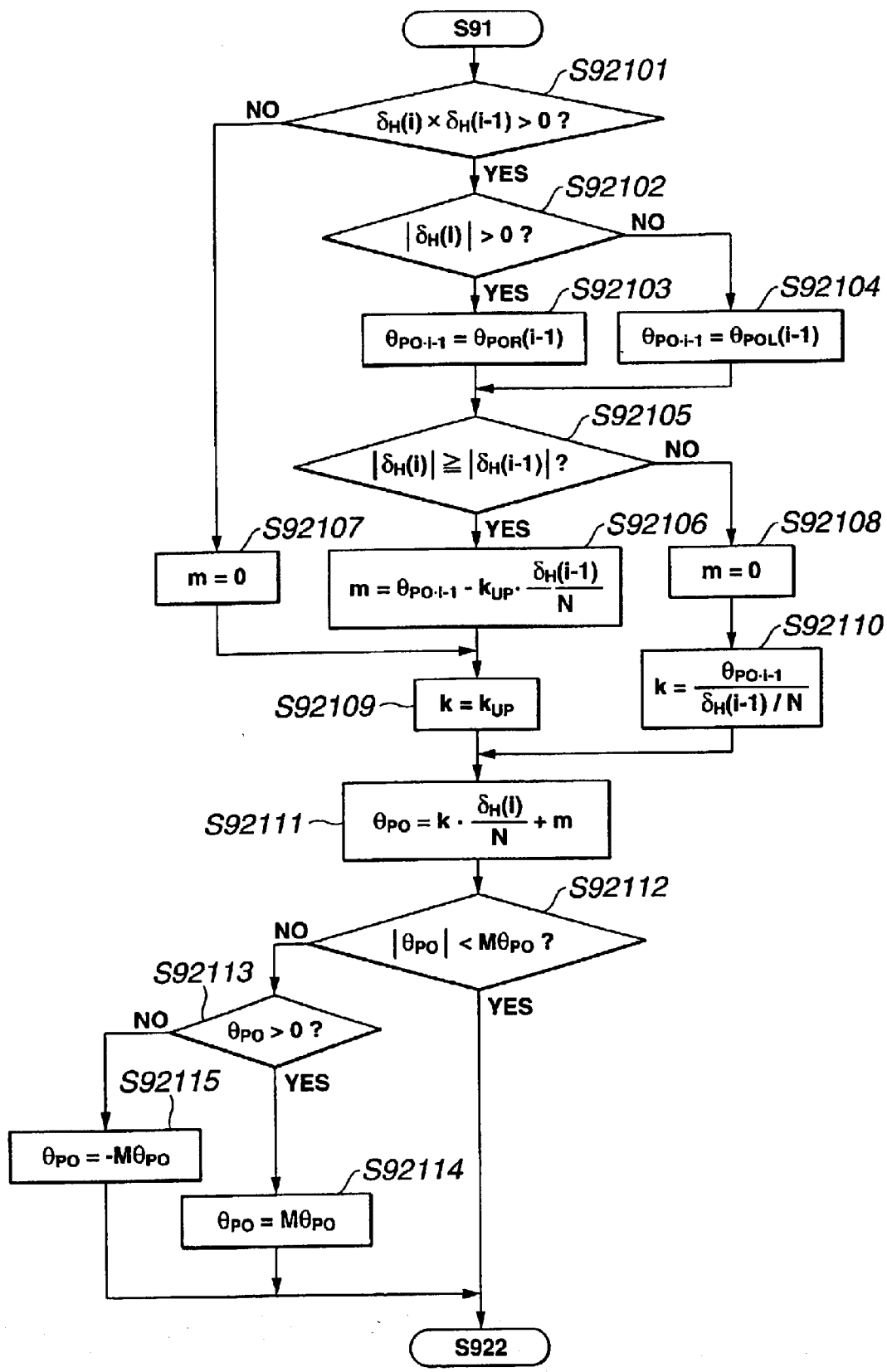
FIG. 30 is an operational flowchart representing the calculation process of the surrounding light panning angle, in the case of the first preferred embodiment.

FIG. 30 is a detailed flowchart of S921 in FIG. 29.

At S92101, controller 3 decides whether $\delta_H(i)\times\delta_H(i-1)>0$ so as to decide whether or not the vehicular steering angle has crossed over a neutral point.

If $\delta_H(i)\times\delta_H(i-1)$ is over 0 (No at S92101), it is decided that the neutral point has not be crossed. If controller 3 determines that the neutral point has been crossed (No), the routine goes to S92102. If the answer is Yes (the steering angle has not crossed the neutral point), the routine goes to S92107.

At S92102, controller 3 makes the decision of whether $|\delta_H(i)|>0$ so as to decide whether the steering is directed to rightward or leftward direction. If the steering angle $|\delta_H(i)|$ is positive to decide that the rightward steering angle is carried out (Yes at S92102), the routine goes to S92103. If negative to decide the leftward steering angle (No at S92102), the routine goes to S92104.

At S92103, controller 3 executes $\theta_{PO'i-1}=\theta_{POR(i-1)}$ to set previous provisional value $\theta_{PO'i-1}$ of the surrounding light panning angle to previous provisional value $\theta_{PORi-1}$ of the rightward surrounding light panning angle and the routine goes to S92105.

At S92104, controller 3 executes $\theta_{PO'i-1}=\theta_{POL(i-1)}$" so as to set previous provisional value $\theta_{PO'i-1}$ of the surrounding light panning angle to previous provisional value $\theta_{POLi-1}$ of the leftward surrounding light panning angle and the routine goes to S92105.

At S92105, controller 3 makes the decision of $|\delta_H(i)|\geq|\delta_H(i-1)|$ so as to decide whether the steering angle is furthermore increased or returned to the original steering angle (decreased direction).

If the present steering angle $|\delta_H(i)|$ exceeds the previous steering angle $|\delta_H(i-1)|$ so as to decide that the steering angle is furthermore increased, the routine goes to S92106. Otherwise, it is decided by controller 3 that the steering angle is returned to the original steering angle (in decrease direction) and the routine goes to S92108.

At S92106, an intercept value of an surrounding light calculating equation is calculated by the following equation. Namely, $m=\theta_{PO'i-1}-k_{UP}\{\delta_{H(i-1)}/N\}$. It is noted that, in this equation, $k_{UP}$ denotes a gain at the time when the surrounding light gain or second reflector 11202 is deflectively driven according to the steering angle. This gain $k_{UP}$ is employed only when the steering wheel is steered and has been read as constant of $k_{UP}=5.6$ at S1 in FIG. 18, in this embodiment.

At S92109, controller 3 sets as follows: $K=k_{UP}$ to set surrounding light gain K to surrounding light gain $k_{UP}$ and the routine goes to S92111.

When the routine goes from S92101 to S92107, controller 3 sets as follows: m=0 so as to set intercept value m of the surrounding light calculation equation to zero. Then, the routine goes to S92109. In a case where the routine goes from S92105 to S92108, controller 3 sets as follows: m=0 so as to set intercept value m of the surrounding light calculation equation to zero. Then, the routine goes to S92110.

At S92110, the surrounding light gain K is calculated by the following equation and the routine goes to S92111:

$$K=\theta_{PO'i-1}/\{\delta_H(i-1)/N\}.$$

At S92111, provisional value $\theta_{PO}$ of the surrounding light panning angle is calculated from the following equation. Then, the routine goes to S92112.

That is to say, $\theta_{PO}=k\cdot\{\theta_H(i)/N\}+m$.

At S92112, controller 3 makes the decision of whether $|\theta_{PO}|<M\theta_{PO}$. It is noted that $M\theta_{PO}$ denotes the maximum panning angle of the surrounding light, which is read as constant of $M\theta_{PO}=30$ (deg) at S1 in FIG. 18, in this embodiment. The routine goes to S922, if the answer is Yes. The routine goes to S92113, if No at S92112.

At S92113, controller 3 makes the decision of whether $\theta_{PO}>0$. If this answer is Yes and controller 3 decides that the deflective drive is for the rightward one, the routine goes to S92114. If No at S92113 and it is decided by controller 3 that the deflective drive is for the leftward one, the routine goes to S92115.

At S92114, controller 3 executes the operation of $\theta_{PO}=M\theta_{PO}$ so as to set provisional value $\theta_{PO}$ of the surrounding light panning angle to maximum panning angle $M\theta_{PO}$ on the rightward turning side.

At S92115, controller 3 executes the operation of $\theta_{PO}=-M\theta_{PO}$ so as to set provisional value $\theta_{PO}$ of the surrounding light panning angle to maximum panning angle $-M\theta_{PO}$ on the leftward turning side. In either case, the routine goes to S922.

[Convergence at Middle Velocity]

Figure 31:
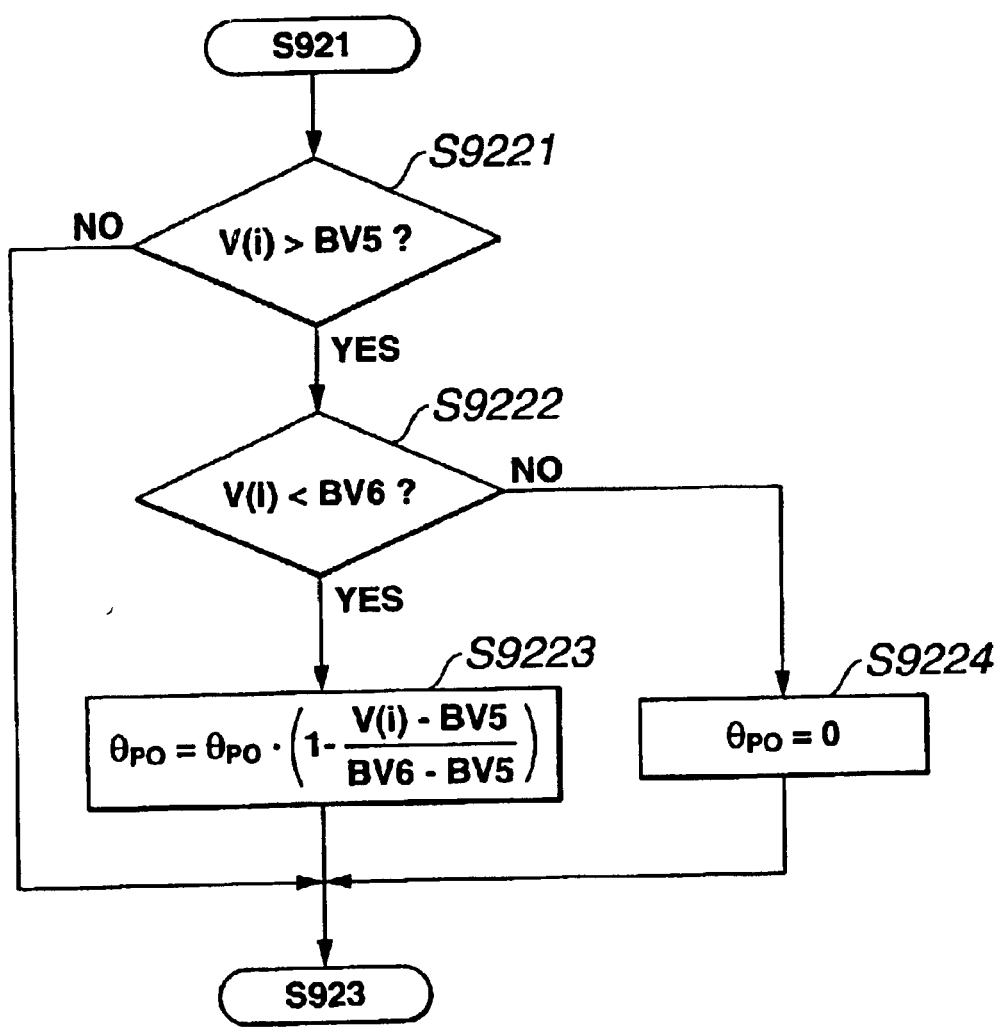
FIG. 31 is an operational flowchart representing a process representing a convergence process during a vehicular run at a middle vehicular velocity range, in the case of the first preferred embodiment.

FIG. 31 shows a detailed flowchart of a convergence at a middle velocity of S922 in FIG. 29. That is to say, at S9221, controller 3 makes the decision of whether V(i)>BV5. It is noted that BV5 denotes a vehicular velocity at which the motion of the surrounding light starts to be reduced and which has been read as constant of BV5=40 (Km/h) at S1 in FIG. 18, in this embodiment. The routine goes to S9222, if the vehicular velocity V(i) exceeds BV5, but the routine goes to S923 if NO (V(i)≦BV5).

At S922, controller 3 makes the decision of whether V(i)<BV6. It is noted that BV6 denotes a vehicular velocity at which the displacement of the surrounding light completely stops and which has been read as constant of BV6=60 (Km/h) at S1 in FIG. 18, in this embodiment. If the answer is No at S922 so as to decide that the vehicle is running at the vehicular velocity falling in a high velocity range, the routine goes to S9224. If Yes at S922, controller 3 decides that vehicle C is running in a transition range and the routine goes to S9223.

At S9224, controller 3 executes the operation as $\theta_{PO}=0$ so as to set provisional value $\theta_{PO}$ of the surrounding light panning angle to zero. On the other hand, at S9223, controller 3 sets provisional value $\theta_{PO}$ of the surrounding light panning angle according to vehicular velocity V(i) by the following equation:

$$\theta_{PO}=\theta_{PO}\cdot\{1-(V(i)-BV5)\cdot(BV6-BV6)\}.$$

[One-Side Control]

Figure 32:
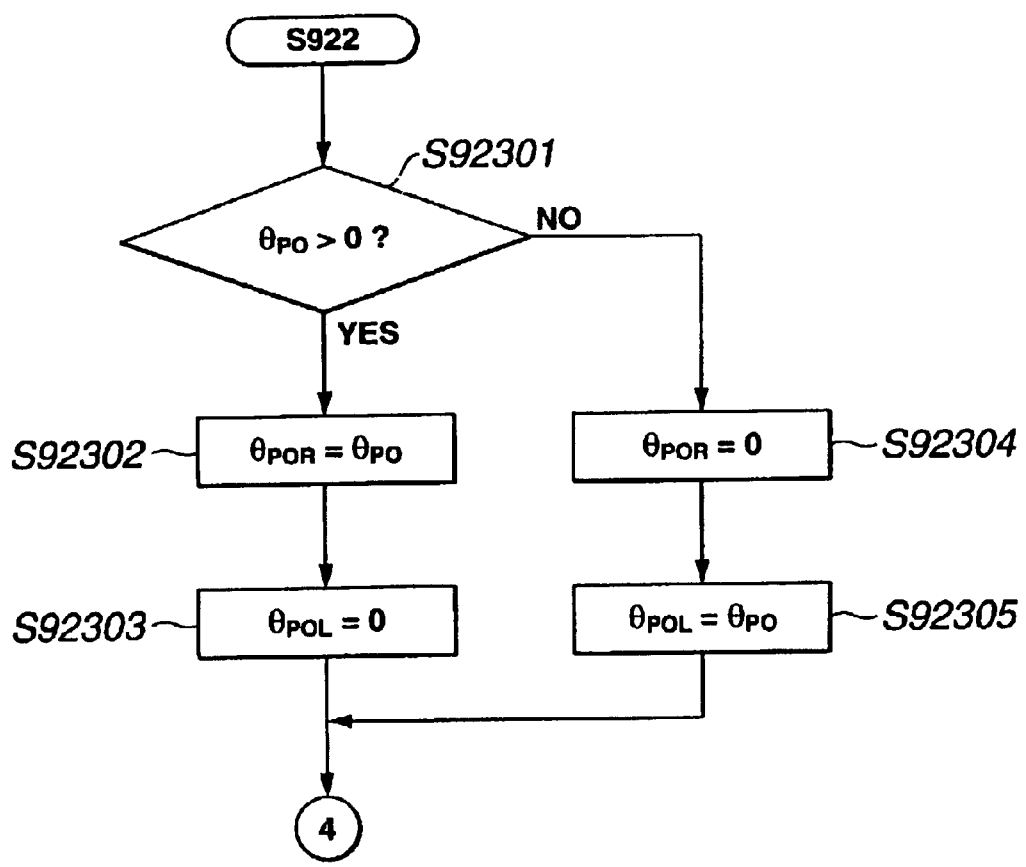
FIG. 32 is an operational flowchart representing a, so-called one-side control process, in the case of the first preferred embodiment.
Figure 33:
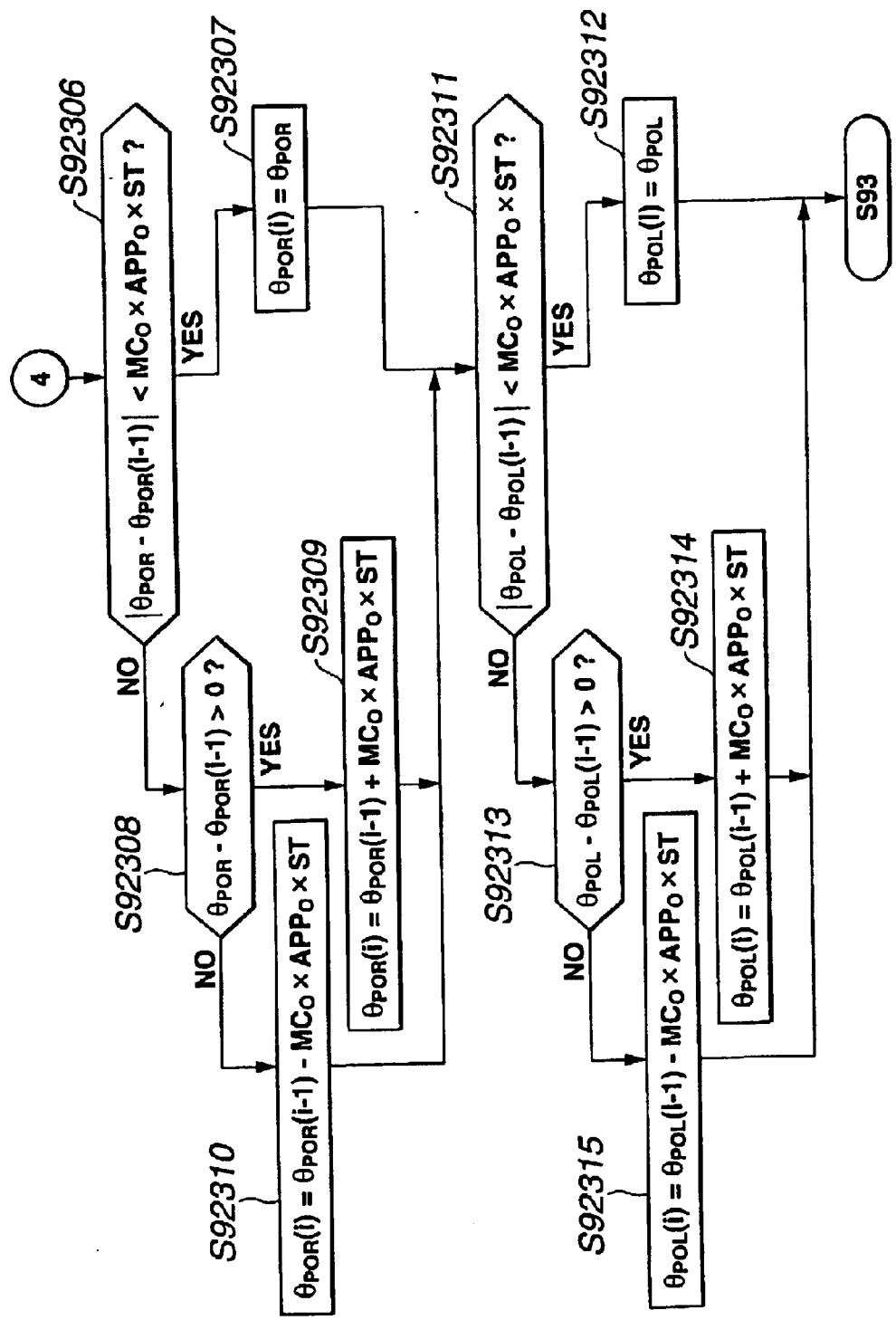
FIG. 33 is an operational flowchart representing the one-side control process, in the case of the first preferred embodiment.

FIGS. 32 and 33 show detailed flowcharts of one-side control executed at S923 in FIG. 29.

At S92301, controller 3 makes the decision of whether $\theta_{PO}>0$ so as to decide whether the vehicular turn is rightward direction or leftward direction. If this answer is Yes ($\theta_{PO}>0$), controller 3 decides that the vehicular turn is in the rightward direction. Then, the routine goes to S92302. If No ($\theta_{PO}\leq0$) at S92301 so as to decide that the vehicular turn is in the leftward direction, the routine goes to S92304.

At S92302, controller 3 executes the operation of $\theta_{POR}=\theta_{PO}$ so as to set provisional value $\theta_{POR}$ of the rightward surrounding light panning angle to provisional value $\theta_{PO}$ of the surrounding light panning angle. Then, the routine goes to S92303.

At S92303, controller 3 executes the operation as $\theta_{POL}=0$ so as to set provisional value $\theta_{POL}$ of the leftward surrounding light panning angle to zero. Then, the routine goes to S92306 in FIG. 33.

At S92304, controller 3 executes the operation as $\theta_{POR}=0$ to set provisional value $\theta_{POR}$ of the rightward surrounding light panning angle to zero. Thereafter, the routine goes to S92305. Next, at S92305, controller 3 executes the operation as $\theta_{POL}=\theta_{PO}$ so as to set provisional value $\theta_{POL}$ of the leftward surrounding light panning angle to provisional value $\theta_{PO}$ of the surrounding light panning angle. Thereafter, the routine goes to S92306 in FIG. 33.

In FIG. 33, a series of steps S92306 to S92310 serves as a processing flow for deciding value $\theta_{POR}(i)$ of the rightward surrounding light panning angle, and a series of steps S92311 to S92315 serves as a processing flow for determining value $\theta_{POL}(i)$ of the leftward surrounding light panning angle.

At S92306 in FIG. 33, controller 3 makes the decision of whether $|\theta_{POR}-\theta_{POR}(i-1)|<MCo\times APPo\times ST$. It is noted that $\theta_{POR}(i-1)$ denotes previous provisional value of the rightward surrounding light panning angle, and $|\theta_{POR}-\theta_{POR}(i-1)|$ denotes an absolute value of a variation in the provisional value of the rightward surrounding light panning angle. In addition, MCo denotes the maximum frequency of pulses for driving motor M2 to control the deflection drive variable of second reflector 11202, that has been read as constant of MCo=290 (hz) at S1 in FIG. 18, in this embodiment. Furthermore, APPo denotes an operation rate per pulse of second reflector 11202. In addition, MCo×APPo×ST denotes the maximum deflection drive variable of second reflector 11202 within sampling period ST.

Hence, if the variation in provisional value $\theta_{POR}$ of the rightward surrounding light panning angle is within the maximum deflection drive variable for sampling time period ST (Yes at S92306), the routine goes to S92307. Otherwise (No at S92306), the routine goes to S92308 for corrections.

At S92307, controller 3 executes the operation such as $\theta_{POR}(i)=\theta_{POR}$ so as to set value $\theta_{POR}(i)$ of the rightward surrounding light panning angle to provisional value $\theta_{POR}$ of the rightward surrounding light panning angle. Then, the routine goes to S92311. On the other hand, at S92308, controller 3 makes the decision of whether $\theta_{POR}-\theta_{POR}(i-1)>0$ so as to decide whether the panning angle is for deflectively driven rightward one or leftward one. If this answer is Yes ($\theta_{POR}-\theta_{POR}(i-1)>0$ at S92308), controller 3 decides that the deflective drive is for the rightward one. At this time, the routine goes to S92309. Otherwise (No at S92308), the deflective drive is decided by controller 3 to be for the leftward one and the routine goes to S92310.

At S92309, controller 3 executes the calculation operation of $\theta_{POR}(i)=\theta_{POR}(i-1)+MCo\times APPo\times ST$ so as to determine rightward surrounding light panning angle $\theta_{POR}(i)$ by adding maximum deflection controlled variable MCo×APPo(× ST) multiplied by sampling period ST with previous provisional value $\theta_{POR}(i-1)$ of the rightward surrounding light panning angle.

At 92310, controller 3 performs the calculation operation of $\theta_{POR}(i)=\theta_{POR}(i-1)-MCo\times APPo\times ST$ so as to determine rightward surrounding light panning angle $\theta_{POR}(i)$ by subtracting maximum deflection controlled variable multiplied by sampling time period ST from previous provisional value of the rightward surrounding light panning angle. In either case, the routine goes to S92311.

S92311 corresponds to S92306; S92312 to S92307; S92313 to S92308; S92314 to S92309; and S92315 to S92310. By similar calculation operations, controller 3 executes so as to compare (at S92311) variation $|\theta_{POL}-\theta_{POL}(i-1)|$ in the provisional value of the leftward surrounding light panning angle and maximum deflection drive variable MCo×APPo×ST and to decide (at S92313) the deflecting direction of the panning angle, thereby determining leftward surrounding light panning angle $\theta_{POL}(i)$ (at S92312, S92314 and S92315).

[Calculation (on Center Light) of Output Value to Actuator]

Figure 34:
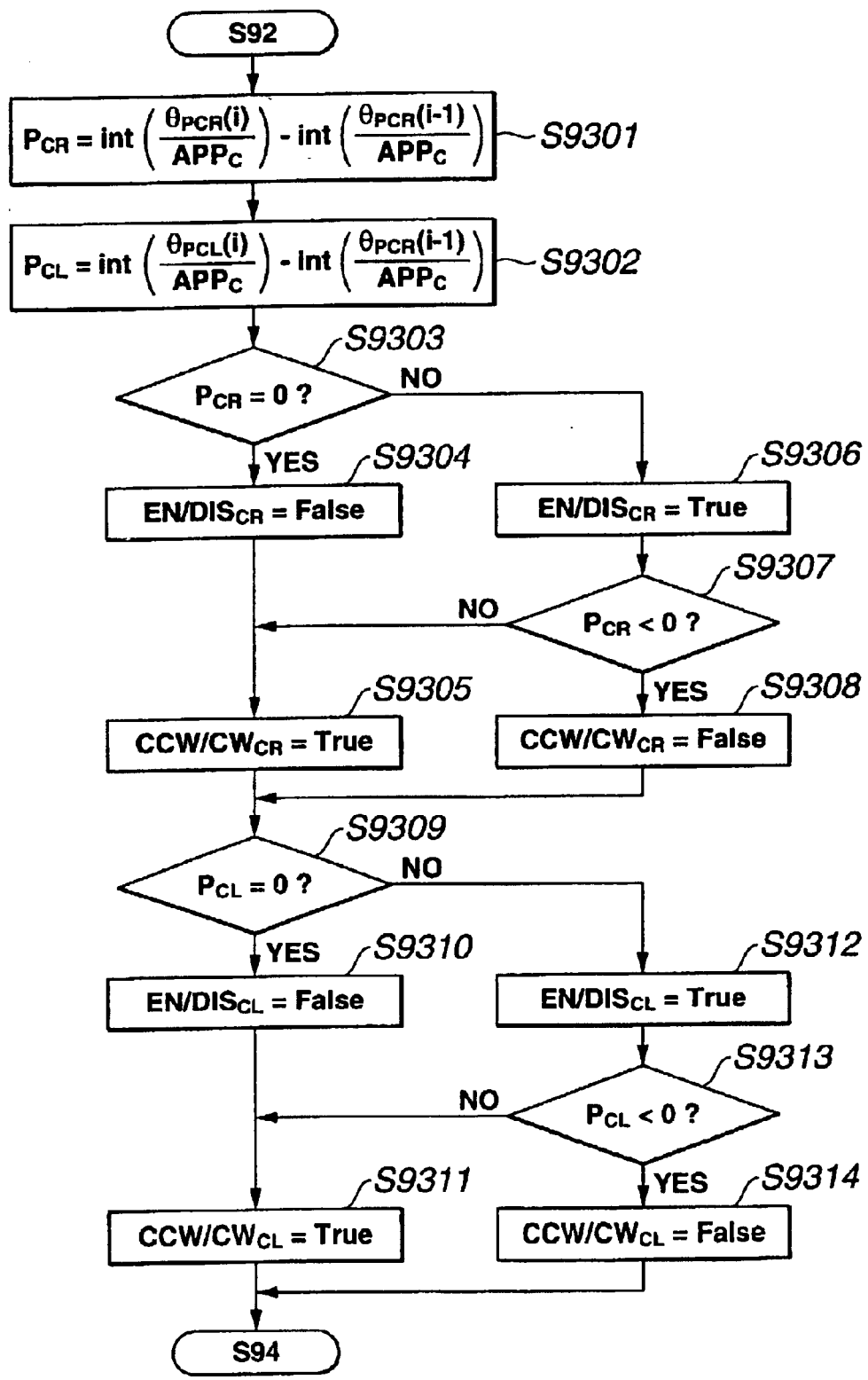
FIG. 34 is an operational flowchart representing a calculation process (center light) of an output value to an actuator, in the case of the first preferred embodiment.

FIG. 34 shows a detailed flowchart of a calculation (on the center light) of the output value to the actuator at S93 in FIG. 19.

At S9301, the rightward center light output pulses, i.e., pulses to be outputted to motor M1 for controllably driving rightward first reflector 11201 are calculated by the following equation:

$$P_{CR}=\text{int}\{\theta_{PCR}(i)/APPc\}-\text{int}\{\theta_{PCR}(i-1)/APPc\}.$$

It is noted that symbol int has the same meaning of Gauss' notation and is used in the whole specification.

At S9302, the leftward center light output pulses, i.e., pulses to be outputted to motor M1 for controllably driving leftward first reflector 11201 are calculated by the following equation:

$$P_{CL}=\text{int}\{\theta_{PCL}(i)/APPc\}-\text{int}\{\theta_{PCL}(i-1)/APPc\}.$$

At S9303, controller 3 makes the decision of whether $P_{CR}=0$. If rightward center light output pulses $P_{CR}$ are zero (Yes at S9303), the routine goes to S9304 to de-energize motor M1. It is noted that the term of de-energize has the same meaning as to turn off the power supply for. Otherwise (No at S9303), the routine goes to S9306 to energize motor M1. It is also noted that the term of energize has the same meaning as to turn on the power supply for.

At S9304, controller 3 executes the calculation operation of $EN/DIS_{CR}$=False. It is noted that $EN/DIS_{CR}$ denotes a rightward center light motor power switch, i.e., a power switch for motor M1 to controllably rightward first reflector 11201. This power switch is set inactive or False. Then, the routine goes to S9305.

At S9305, controller 3 executes the calculation operation of $CCW/CW_{CR}$=True. It is noted that $CCW/CW_{CR}$ denotes a decision on normal (counter-clockwise) rotation or reverse (clockwise) rotation (or referred to as forward/backward turns) of the rightward center light, i.e., a decision on the forward/backward turns of motor M1 for deflectively driving rightward first reflector 11201. The turn is set to be forward turn, viz., True. Then, the routine goes to S9309.

At S9306, controller 3 executes the calculation operation of $EN/DIS_{CR}$=True so as to set the rightward center light motor power switch active (power supply on), viz., True. Then, the routine goes to S9307.

At S9307, controller 3 makes the decision of whether $P_{CR}<0$ so as to decide whether the rightward center light is turned in the forward (normal) direction or backward (reverse) direction depending upon whether rightward center light output pulses PCR is positive or negative. If rightward center light output pulses PCR are negative, controller 3 decides that this direction is backward (Yes) and the routine goes to S9308. If the direction is decided to be the forward (normal) direction ($P_{CR} \geq 0$ (No), the routine goes to S9305. At S9305, controller 3 sets as follows: $CCW/CW_{CR}$=True. At S9308, controller 3 executes the calculation operation of $CCW/CW_{CR}$=False so as to set the decision on the forward/backward turns of the rightward center light to be backward (reverse direction), viz., or False. Then, the routine goes to S9309.

At S9309, controller 3 makes the decision of whether $P_{CL}=0$. Depending on whether or not leftward center light output pulses $P_{CL}$ are zero, controller 3 decides whether motor M1 for controllably driving and leftward first reflector 11201 is to be energized. If leftward center light output pulses $P_{CL}$ are zero (Yes), the routine goes to S9310. Otherwise (No, $P_{CL}\neq 0$), the routine goes to S9312.

At S9310, controller 3 executes the calculation operation of $EN/DIS_{CL}$=False. It is noted that $EN/DIS_{CL}$ denotes a leftward center light motor power switch, i.e., a power switch for motor M1 to controllably drive leftward first reflector 11201. This power switch is set inactive (power supply off), viz., False. Then, the routine goes to S9311.

At S9311, controller 3 executes the calculation operation of $CCW/CW_{CL}$=True. It is noted that $CCW/CW_{CL}$ denotes the decision on the forward or backward turn of the leftward center light, i.e., the decision on the forward or backward turn of motor M1 for controllably driving leftward first reflector 11201. This turn is set to be-forward direction, viz., True.

At S9312, controller 3 executes the calculation operation $EN/DIS_{CL}$=True so as to set leftward center light motor power switch $EN/DIS_{CL}$ active (power supply on), viz., True. Then, the routine goes to S9313.

At S9313, controller 3 makes the decision of whether the forward or backward turn is made depending on whether $P_{CL}<0$. If leftward center light output pulses $P_{CL}$ are negative (Yes), the turn is decided to be backward (reverse direction) and the routine goes to S9314. Otherwise (No at S9313), the turn is decided to be the forward direction. At this time, the routine goes to S9311.

At S9314, controller 3 executes the calculation operation as $CCW/CW_{CL}$=False and decision of $CCW/CW_{CL}$ on the forward or backward turn of the leftward center light is set backward (reverse direction), viz., False.

[Calculation (on Surrounding Light) of Output Value to Actuator]

Figure 35:
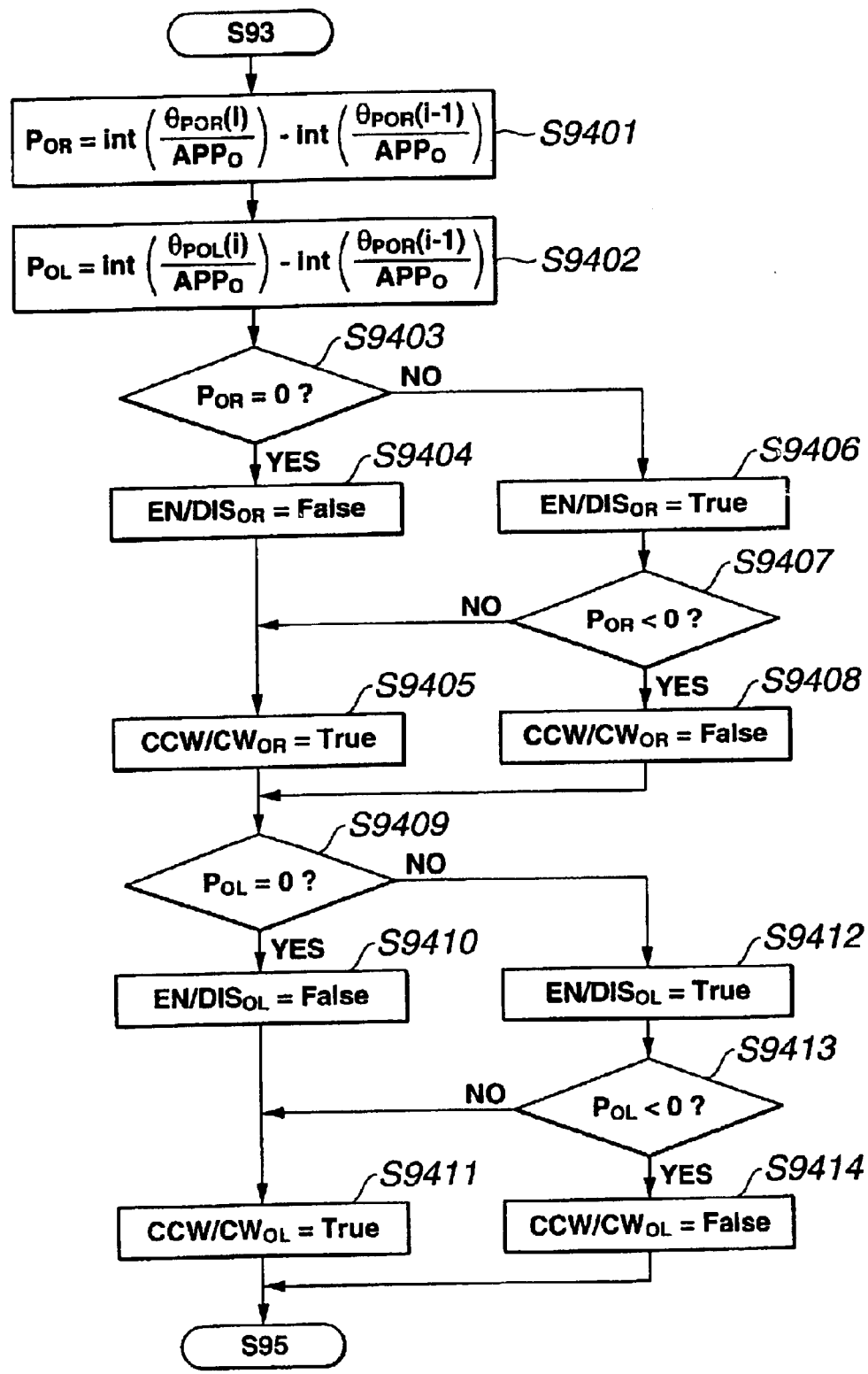
FIG. 35 is an operational flowchart representing a calculation process (surrounding light) of the output value to the actuator, in the case of the first preferred embodiment.

FIG. 35 shows a detailed flowchart of a calculation (on the surrounding light) of the output value to the actuator of S94 shown in FIG. 19.

At S9401, the rightward surrounding light output pulses, i.e., pulses to be outputted to motor M2 for controllably driving rightward second reflector 11202 are calculated by the following equation:

$$P_{OR}=\text{int}\{\theta_{POR}(i)/APPo\}-\text{int}\{\theta_{POR}(i-1)/APPo\}.$$

It is noted that APPo denotes a manipulated variable of second reflector 11202 per pulse, as read as constant of APPo=0.188 (deg/pulse) at S1 in FIG. 18, in this embodiment.

At S9402, leftward surrounding light output pulses are calculated by the following equation. Then, the routine goes to S9403. That is to say, $P_{OL}=\text{int}\{\theta_{POL}(i)/APPo\}-\text{int}\{\theta_{POL}(i-1)/APPo\}$.

At S9403, controller 3 decides whether $P_{OR}=0$ so as to decide whether motor M2 for deflectively driving rightward second reflector 11202 is energized or de-energized. The routine goes to S9404, if rightward surrounding light output pulses $P_{OR}$ are zero (Yes). If $P_{OR} \neq 0$, the routine goes to S9406.

At S9404, controller 3 executes the calculation operation as $EN/DIS_{OR}$=False. It is noted that $EN/DIS_{OR}$ denotes a rightward surrounding light motor power switch, i.e., a power switch for motor M2 to deflectively drive rightward second reflector 11202. This power switch is set inactive (power supply off), viz., False. Then, the routine goes to S9405.

At S9405, controller 3 executes the calculation operation as $CCW/CW_{OR}$=True. It is noted that $CCW/CW_{OR}$ denotes a decision on the forward or backward turn of the rightward surrounding light, i.e., a decision on the forward or backward turn of motor M2. The turn is set to be forward, viz., True. Then, the routine goes to S9409.

At S9406, controller 3 executes the calculation operation as $EN/DIS_{OR}$=True to set active or True. Then, the routine goes to S9407.

At S9407, controller 3 decides whether the forward or backward turn occurs depending upon whether $P_{OR}<0$. If rightward surrounding light pulses $P_{OR}$ are negative (Yes), the turn is decided to be backward (reverse direction) and the routine goes to S9408. Otherwise (No), controller 3 decides that this turn is the forward direction and the routine goes to S9405.

At S9408, controller 3 executes the calculation operation $CCW/CW_{OR}$=False so as to set rightward surrounding light forward/backward decision $CCW/CW_{OR}$ backward, viz., False. Then, the routine goes to S9409.

At S9409, controller 3 decides whether $P_{OL}=0$ so as to decide whether motor M2 for deflectively driving leftward second reflector 11202 is to be energized.

If the leftward surrounding light output pulses $P_{OL}$, i.e., the output pulses to leftward motor M2 are zero (Yes at S9409), the routine goes to S9410 for de-energizing motor M2 (turn off of the power supply to M2). Otherwise (No at S9409), the routine goes to S9412 for energizing (turn on the power supply to) motor M2 (EN/DIS$_{OL}$=True).

At S9410, controller 3 executes the calculation operation of EN/DIS$_{OL}$=False. It is noted that EN/DIS$_{OL}$ denotes the leftward surrounding light motor power switch, i.e., the power switch to leftward motor M2. This switch is set inactive or False. Then, the routine goes to S9411.

At S9411, controller 3 executes the calculation operation as CCW/CW$_{OL}$=True. It is noted that CCW/CW$_{OL}$ denotes a decision on the forward or backward turn of the leftward surrounding light, i.e., a decision on the forward or backward turn of leftward motor M2. This decision is set to be forward direction, viz., True.

On the other hand, at S9412, controller 3 executes the calculation operation of EN/DIS$_{OL}$=True so as to be set active or True. Then, the routine goes to S9413. At S9413, controller 3 decides whether the forward or backward turn occurs depending upon whether $P_{OL}<0$. If leftward surrounding light output pulses $P_{OL}$, i.e., the output pulses to leftward motor M2 are negative (Yes), the turn is decided to be backward and the routine goes to S9414. Otherwise (No), the turn is decided to be forward and the routine goes to S9411.

At S9414, controller 3 executes the calculation operation of CCW/CW$_{OL}$=False to set as the turn being backward, viz., False. At S9411, CCW/CW$_{OL}$=True.

[Calculation of Clock Frequency]

Figure 36:
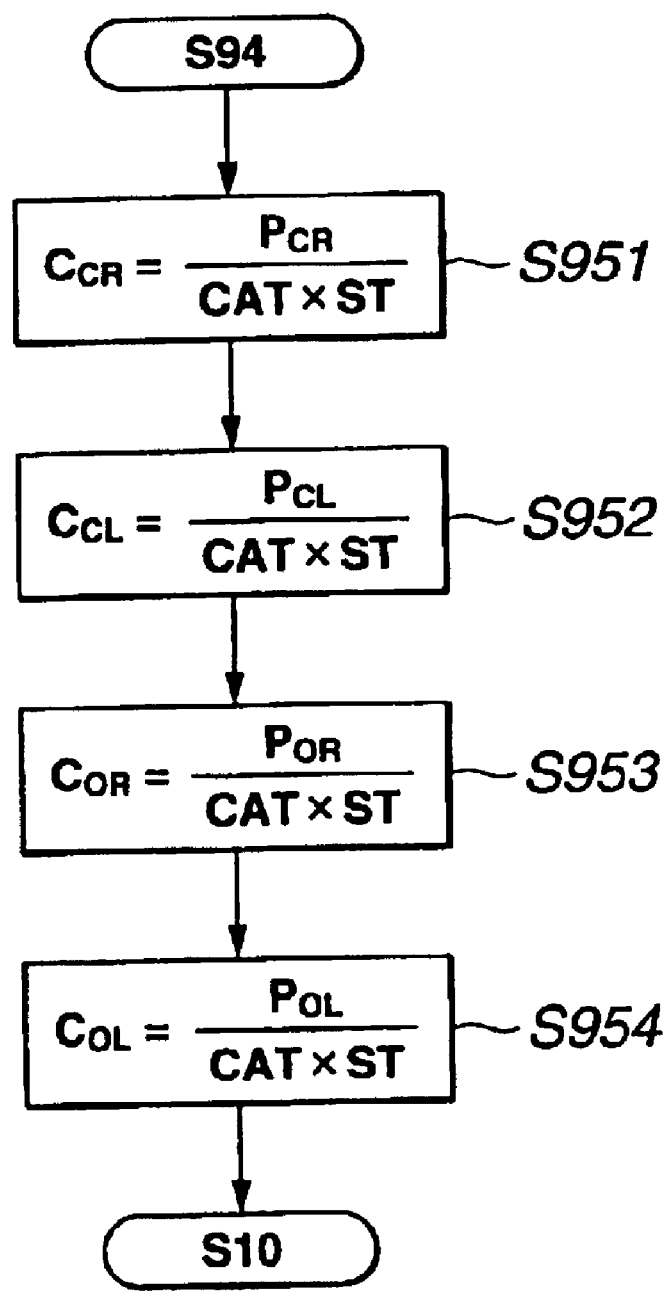
FIG. 36 is an operational flowchart representing a calculation process of a clock frequency, in the case of the first preferred embodiment.

FIG. 36 shows a detailed flowchart for calculating the clock frequency at S95 shown in FIG. 19.

That is to say, at S951, the rightward center light frequency, i.e., a drive frequency of motor M1 for rightward first reflector 11201 is calculated by the following equation:

$$C_{CR}=P_{CR}/CAT \times ST.$$

It is noted that CAT denotes a ratio of an calculation time period of motor M1 (stepping motor is used for M1) to the sampling period ST, as read as a constant of CAT=0.8 at S1 in FIG. 18, in this embodiment.

At S952, S953, and S954 leftward center light frequency $C_{CL}$, rightward surrounding light frequency $C_{OR}$, and leftward surrounding light frequency $C_{OL}$ are respectively calculated by controller 3 from the following three equations:

$$C_{CL}=P_{CL}/CAT \times ST;$$

$$C_{OR}=P_{OR}/CAT \times ST; \text{ and}$$

$$C_{OL}=P_{OL}/CAT \times ST.$$

Figure 37A:
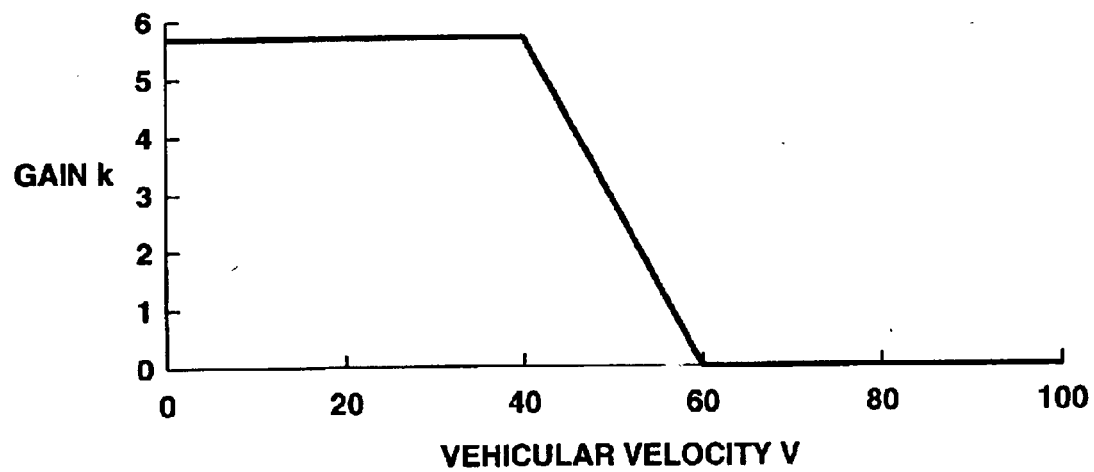
FIGS. 37A and 37B are characteristic graphs representing a gain of the surrounding light from one of the leftward and rightward light distribution control lamps which is placed at an inside of a vehicular turn direction with respect to a center of the circle of turn and a gain of the center light from one of the leftward and rightward distribution control lamps which is placed at the inside of the vehicular turn direction, in the case of the first preferred embodiment, respectively.

Thus, through the series of controls described above, motors M1 and M2 of rightward and leftward first and second reflectors 11201 and 11202 are controllably driven depending upon vehicular velocity V(i) and in accordance with steering angle $\delta_H(i)$. As a result of this, the visibility and brightness on the turning side, the un-turning side, and the front radiation area of vehicle C can be improved when vehicle C is being turned FIGS. 37A through 38B illustrate surrounding light gains and center light gains, respectively. FIG. 37A illustrates the gain on the turning side of the surrounding light and FIG. 37B illustrates the gain on the turning side of the center light.

Figure 38A:
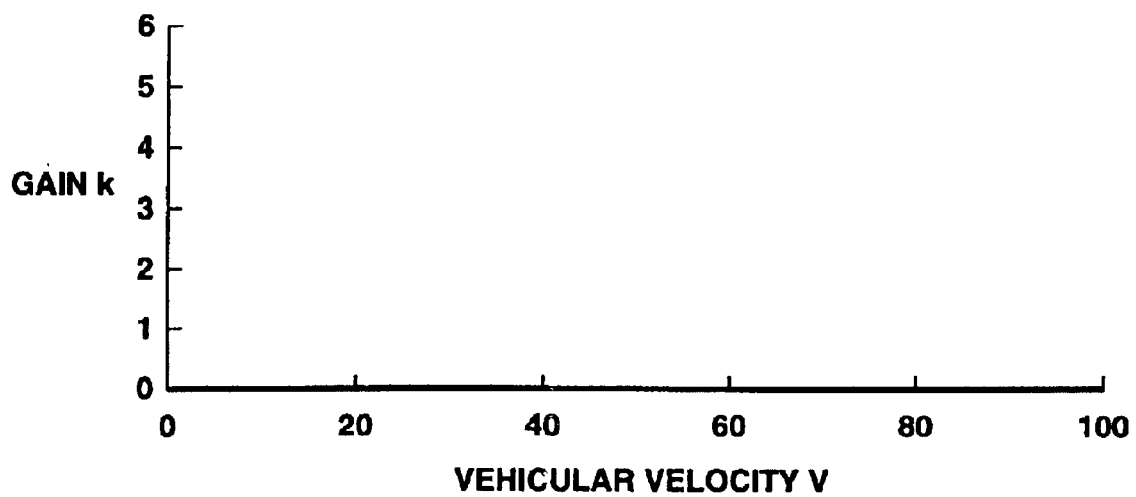
FIGS. 38A and 38B are characteristic graphs representing a gain of the surrounding light from one of the leftward and rightward light distribution control lamps which is placed at an outside of the vehicular turn direction with respect to a center of the circle of turn and a gain of the center light from one of the leftward and rightward distribution control lamps which is placed at the outside of the vehicular turn direction, in the case of the first preferred embodiment, respectively.
Figure 38B:
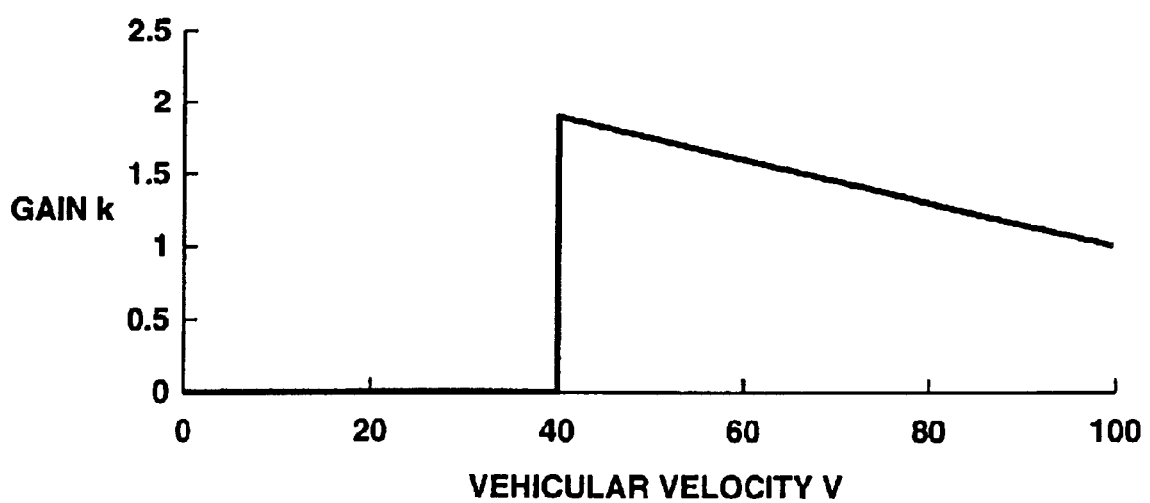

FIG. 38A illustrates the gain on the un-turning side of the surrounding light and FIG. 38B illustrates the gain on the un-turning side of the center light. It is noted that the terms of the turning side and un-turning side used in the specification has the same meaning that the turning side is the same direction as the turn of vehicle C, viz., the inside (rightward or leftward) of the vehicular body with respect to the center of a circle of turn and the un-turning side is the outside (leftward or rightward) of the vehicular body with respect to the center of the circle of turn.

As illustrated in FIG. 37A, on the turning side of the surrounding light, gain K indicates 5.6 until vehicular velocity V(i) is from 0 to 40 (Km/h). For vehicular velocity V(i) which indicates from 40 to 60 (Km/h), established is a transition range, in which gain K linearly decreases. At vehicular velocity V(i)=60 (Km/h) or higher, gain K=0.

Figure 37B:
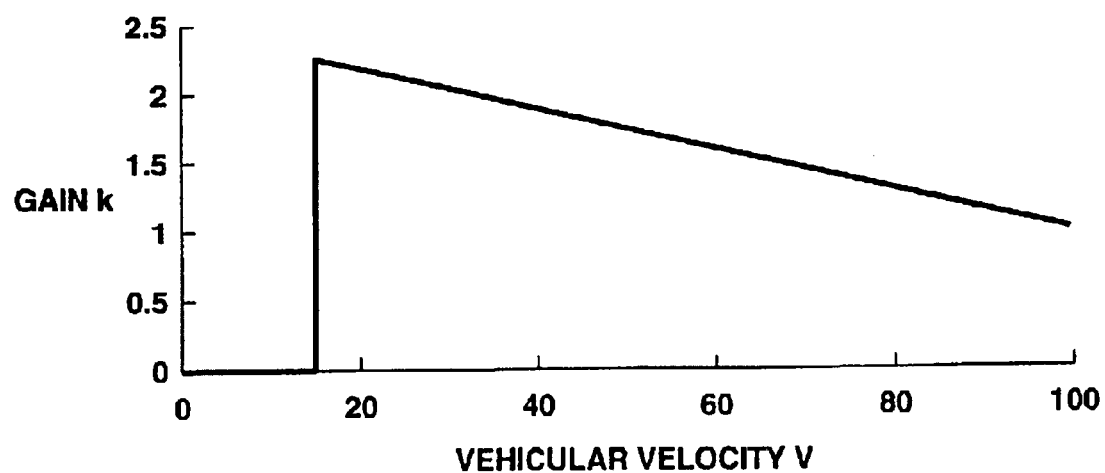

As shown in FIG. 37B, gain k on the turning side of the center light is 0 (zeroed) in an extremely low range where vehicular velocity V(i)=15 (Km/h) or lower. Gain k=2.2, at vehicular velocity V(i)=15 (Km/h). Gain k gradually decreases as vehicular velocity V(i) changes from 15 (Km/h) to a low velocity range, to a middle velocity range, and to a high velocity range.

Gain k of the surrounding light on the un-turning side is set to 0 over the whole velocity range, as illustrated in FIG. 38A. Gain k of the center light on the un-turning side is set, as illustrated in FIG. 38B, to 0 in the low velocity range and in the extremely low velocity range lower than vehicular velocity V(i)=40 (Km/h); to k=1.8 at vehicular velocity V(i)=40 (Km/h); and to gradually decrease over the middle velocity range and the high velocity range exceeding vehicular velocity V(i)=40 (Km/h).

Figure 39A:
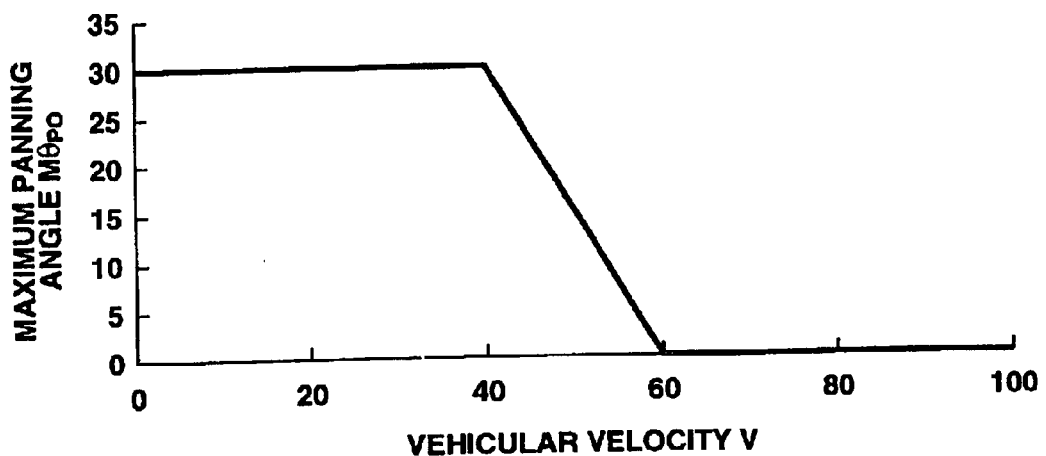
FIGS. 39A and 39B are a characteristic graph representing a maximum panning angle of the surrounding light from one of the leftward and rightward light distribution control lamps which is placed at an inside of the vehicular turn direction with respect to a center of the circle of turn and a gain of the center light from one of the leftward and rightward distribution control lamps which is placed at the inside of the vehicular turn direction, in the case of the first preferred embodiment.
Figure 39B:
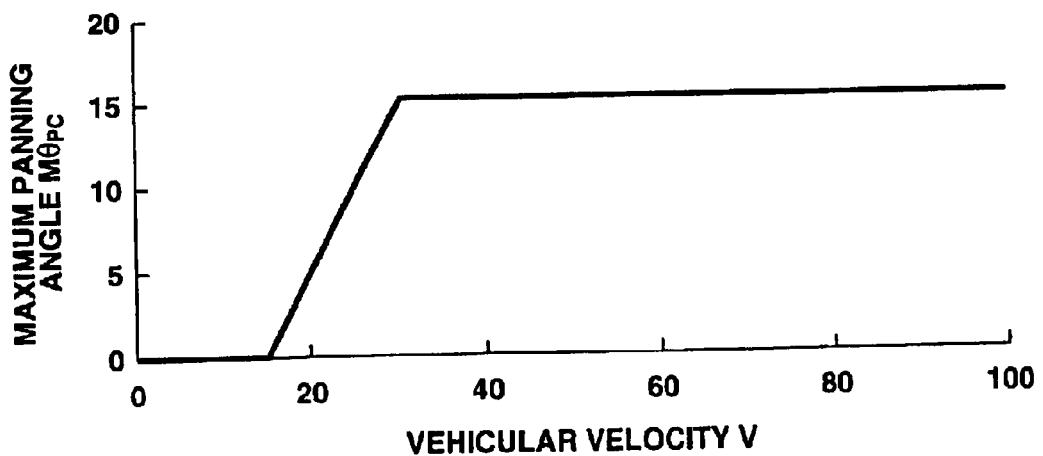
Figure 40A:
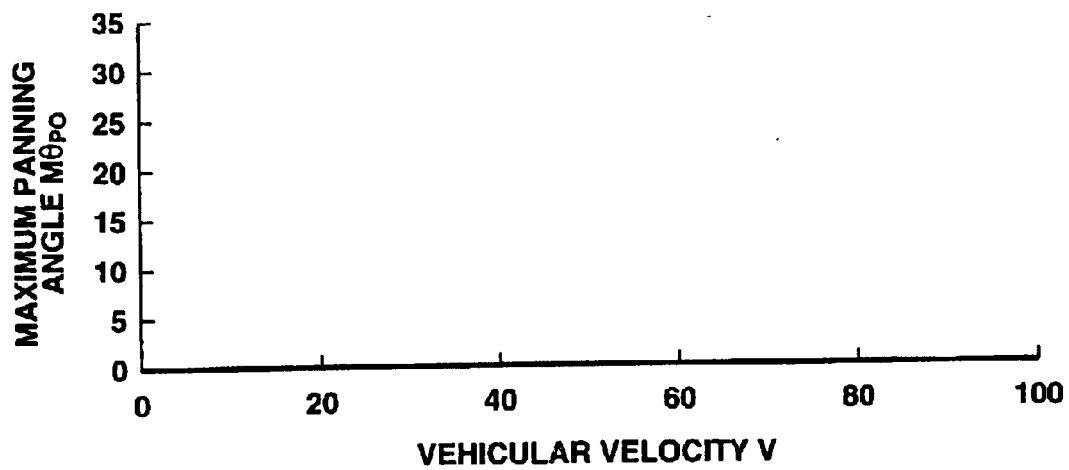
FIGS. 40A and 40B are a characteristic graph representing a maximum panning angle of the surrounding light from one of the leftward and rightward light distribution control lamps which is placed at an outside of the vehicular turn direction with respect to a center of the circle of turn and a gain of the center light from one of the leftward and rightward distribution control lamps which is placed at the outside of the vehicular turn direction, in the case of the first preferred embodiment, respectively.
Figure 40B:
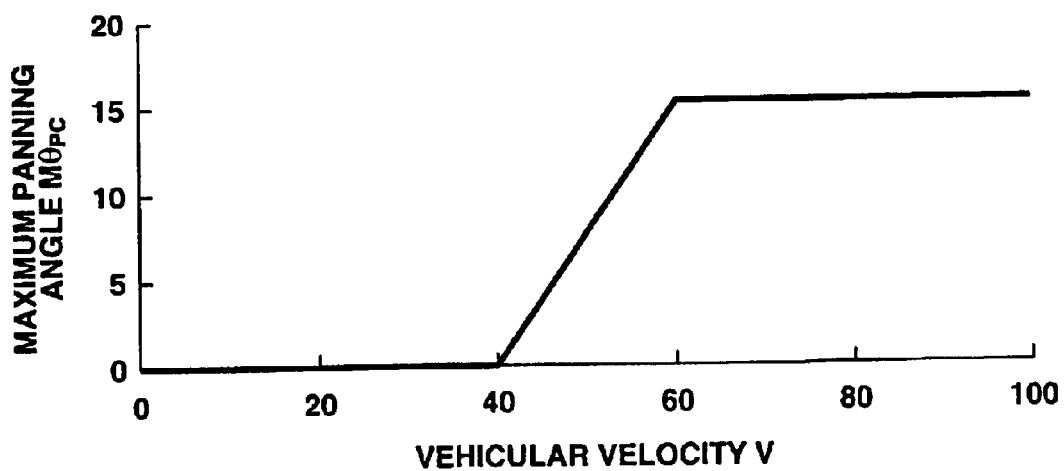

FIGS. 39A through and 40B illustrate variations in the maximum panning angles. FIG. 39A illustrates a variation in maximum panning angle M$\theta_{PO}$ of the surrounding light on the turning side, and FIG. 39B illustrates a variation in maximum panning angle M$\theta_{PC}$ of the center light on the turning side. FIG. 40A illustrates a variation in maximum panning angle M$\theta_{PO}$ of the surrounding light on the un-turning side, and FIG. 40B illustrates a variation in maximum panning angle M$\theta_{PC}$ of the center light on the un-turning side.

Maximum panning angle M$\theta_{PO}$ of the surrounding light on the turning side is set, as illustrated in FIG. 39A, to M$\theta_{PO}$=30 (degrees) in the middle, low, and extremely low velocity ranges where the vehicular velocity is below V(i)=40 (Km/h). In the range wherein the vehicular velocity is over V(i)=40 (Km/h) or below V(i)=60 (Km/h), maximum panning angle M$\theta_{PO}$ gradually decreases linearly. In the high velocity range wherein vehicular velocity is over V(i)=60 (Km/h), M$\theta_{PO}$=0.

Thus, a transition range in which maximum panning angle M$\theta_{PO}$ gradually decreases is provided for the velocity range of V(i)=from 40 to 60 (Km/h). The surrounding light whose radiation area is varied according to the steering angle can cause a smooth variation in the panning angle on the turning side even in a case where the vehicular velocity varies from the middle velocity range to high velocity range. Consequently, such a control, without insufficient feeling given to vehicular driver, that the deflective drive according to the natural feeling of driving sense by the driver can be achieved.

The variation in maximum panning angle M$\theta_{PC}$ of the center light on the turning side is set to 0, as illustrated in FIG. 39B, in the extremely low velocity range where vehicular velocity is below V(i)=15 (Km/h). The variation gradually increases linearly in the range where the vehicular velocity is V(i)=from 15 to 30 (Km/h) and Mθ$_{PC}$ is set to Mθ$_{PC}$=15 (degrees) in the middle and high velocity ranges where the vehicular velocity is over V(i)=30 (Km/h).

As well as in this maximum panning angle Mθ$_{PC}$ of the center light on the turning side, the transition range is provided for the vehicular velocity of V(i)=from 15 to 30 (Km/h). Hence, the natural deflection drive which matches to the driver driving sense can be achieved without insufficient feeling given to vehicular driver.

The variation in maximum panning angle Mθ$_{PO}$ of the surrounding light on the un-turning side is set to 0 over all vehicular velocity ranges, as illustrated in FIG. 40A. The variation in maximum panning angle Mθ$_{PC}$ of the center light on the un-turning side is set to 0, as illustrated in FIG. 40B, in the middle, low, and extremely low velocity ranges of the vehicular velocity of V(i)=40 (Km/h) or lower. The variation gradually increases linearly for the vehicular velocity of V(i)=from 40 to 60 (Km/h), and the maximum panning angle is set to Mθ$_{PC}$=15 (deg) in the high velocity range of the vehicular velocity of V(i)=60 (Km/h) or higher.

In this maximum panning angle of the center light on the un-turning side, the transition range is also provided for the vehicular velocity of V(i)=from 40 to 60 (Km/h). Hence, the natural drive control can be achieved without insufficient feeling given to vehicular driver.

According to these deflection drive controls described above with reference to FIGS. 37A to 40B, one of the rightward and leftward second reflectors 11202 which is placed on the vehicular turning side can be driven, in the extremely low, low, and middle velocity ranges where the vehicular velocity is V(i)=40 (Km/h) or lower, to vary the surrounding light panning angle in the vehicular turn direction in accordance with steering angle δ$_H$(i) over the range to maximum panning angle Mθ$_{PO}$. In the transition range of the vehicular velocity of V(i)=40 to 60 (Km/h), a rate of the deflection drive variable of the second reflector 11202 which is placed on the vehicular turning side is reduced in proportion to a rise in the vehicular velocity. In the high velocity range of the vehicular velocity as V(i)=60 (Km/h) or higher, the corresponding second reflector 11202 may be fixed to radiate the reflected light toward the front radiation area of vehicle C.

On the other hand, one of the rightward and leftward first reflectors 11201 which is placed on the turning side is fixed to radiate the reflected light toward the forward radiation area of vehicle C, in the extremely low velocity range where the vehicular velocity is below V(i)=15 (Km/h). In the transition range of the vehicular velocity of V(i)=from 15 to 30 (Km/h), the deflection drive variable therefor 11201 is gradually reduced as the vehicular velocity is increased. In the middle and high velocity ranges where the vehicular velocity exceeds V(i)=30 (Km/h), the deflection drive therefor 11201 can be performed to vary the center light panning angle within the range of maximum panning angle Mθ$_{PC}$ in accordance with the vehicular steering angle δ$_H$(i).

On the other hand, one of the rightward and leftward second reflectors 11202 which is placed on the un-turning side is fixed to radiate the reflected light toward forward radiation area of vehicle C over all the vehicular velocity ranges.

In addition to this, one of rightward and leftward first reflectors 11201 which is placed on the un-turning side light distribution control lamp 112R or 112L can be fixed to radiate its reflected light toward forward radiation area of vehicle C in the three vehicular velocity ranges of the extremely low, low, and middle velocity ranges where the vehicular velocity is below V(i)=40 (Km/h). Then, this first reflector 11201 can be deflectively driven, in the transition range of the vehicular velocity of V(i)=from 40 to 60 (Km/h), so as to decrease the center light panning angle according to the increase in steering angle δ$_H$(i). In the high velocity range where the vehicular velocity is above V(i)=60 (Km/h), this first reflector 11201 on the un-turning side can be deflectively driven to vary the center light panning angle according to steering angle δ$_H$(i) within the range of maximum panning angle Mθ$_{PC}$=15 (degrees).

That is to say, when the vehicular velocity is in the extremely low velocity range, the front area of vehicle C can be radiated by rightward and leftward first reflectors 11201 and the vehicular turn direction can be radiated by means of one of rightward and leftward second reflectors 11202 placed on the turning side. For example, while the vehicle is turning a traffic intersection over the extremely low velocity range at night, the visibility can remarkably be improved by radiating light beams on both of the vehicular front area and turn direction of vehicle C. In the high vehicular velocity range, on the other hand, the visibility of the turn direction can be remarkably improved during the high velocity turn by radiating the vehicular turn direction positively by both of rightward and leftward first reflectors 11201.

In addition, by performing free deflection drive for both of rightward and leftward first and second reflectors 11201 and 11202 according to the situation of the vehicular turn at the vehicular velocity of high velocity range, the optical axes and the radiation areas can freely be deflected. Thus, a size of the system thereby can be reduced and a degree of freedom in design can remarkably be improved.

When vehicle C is running at a vehicular velocity falling in the extremely low velocity range, the front area of vehicle C is radiated by each of rightward and leftward first reflectors 11201 and the direction toward which vehicle C is turned is radiated by deflecting one of rightward and leftward second reflectors 11202 which is placed on the turning side (i.e., placed on one of front lateral ends which is inside of the vehicular body with respect to the center of the circle of turn) while the other of second reflectors 11202 which is placed on the un-turning side maintains its radiation area at the present unchanged position. When vehicle C is turned at the traffic intersection or the like at the extremely low velocity, therefore, the visibility on the un-turning side can also be kept while the visibility on the turning side being improved. Hence, the whole visibility can remarkably be improved.

During the vehicular turn at a vehicular velocity which falls in the high velocity range, the turn direction can be radiated by both of rightward and leftward first reflectors 11201, thus the visibility in the vehicular turn direction being remarkably improved.

When vehicle is turning at the vehicular velocity falling in the middle and low velocity ranges, the vehicular turn direction can be radiated by one of rightward and leftward first reflectors 11201 which is placed on the turning side. Thus, the visibility in the vehicular turn direction can be improved during the vehicular turn at the low and middle velocity ranges while the visibilities on the un-turning side and in the front radiation area of vehicle C maintained by other reflectors.

In the middle velocity range, on the other hand, one of rightward and leftward first reflectors 11201 which is placed on the un-turning side can be deflected in the turn direction to a degree narrower than the other first reflector 11201 which is placed on the turning side in accordance with the detected steering angle. Hence, when vehicle C is turned at the vehicular velocity falling in the middle velocity range, the vehicular turn direction can be radiated over a wider range of the turn direction by both of rightward and leftward first reflectors 11201. Thus, the visibility can be remarkably improved by the radiations of reflected light beams from both of rightward and leftward first reflectors 11201 on the turn direction which accord to a field of view by the driver. In this case, one of rightward and leftward first reflectors 11201 which is placed on the un-turning side may be deflected after the other thereof which is placed on the turning side has been deflected.

Hence, when vehicle C is turning at the vehicular velocity falling in the middle velocity range, the smooth deflection operation can be achieved according to a vehicular motion found during the vehicular turn so that the light distribution control without insufficient feeling given to vehicular driver can be achieved which matches to the human's sense of driving feeling When vehicle C is turning at a substantially constant vehicular velocity lower than the low velocity range, one of rightward and leftward first reflectors 11201 which is placed on the un-turning side and one of rightward and leftward second reflectors which is placed on the same un-turning side can be left undeflected (fixed at its position). Hence, while vehicle C is turning at the constant vehicular velocity falling below the low velocity range, the radiation range on the un-turning side can be maintained through each of first and second reflectors 11201 and 11202 which are placed on the un-turning side.

In addition when vehicle C is turning at a vehicular velocity falling in the low velocity range, on the other hand, each of first and second ones of rightward and leftward first and second (totally four) reflectors 11201 and 11202 which is placed on the turning side are deflectively driven toward the turn direction so that the visibility in the turn direction can furthermore be improved. Each of the other first and second ones of rightward and leftward first and second reflectors 11201 and 11202 which is placed on the un-turning side is not deflectively driven. As a result of this, the vehicular un-turn direction can also widely be radiated.

Furthermore, when vehicle C is turning at a velocity falling in the middle velocity range, the visibility in the vehicular turn direction can be improved by the deflection drives for at least one of rightward and leftward first reflectors 11201 which is placed on the turning side. At the same time, by deflectively driving the other of rightward and leftward first reflectors 11201 which is placed on the un-turning side to a degree narrower than the one placed on the turning side, the visibility in the turn direction in accordance with the field of view of the driver can furthermore be improved during the vehicular turn at the middle velocity range.

Since the gain k of the deflection drive variable which accords with wheel steering angle $\delta_H(i)$ at a time when the steering angle, i.e., wheel steering angle $\delta_H(i)$ is further increased is set so as to exceed gain k of the deflection drive variable which accords with wheel steering angle $\delta_H(i)$ at a time when wheel steering angle $\delta_H(i)$ is decreased, a natural deflection drive can be achieved which accords with a kind of human action such that he or she quickly views the vehicular turn direction while the steering wheel is increasingly turned and his or her viewing direction is returned gradually to the front area of vehicle C while the steering wheel is returned to the neutral position. Consequently, the natural deflection drive without giving the insufficient feeling to the driver can be assured.

Since gain k of the deflection drive variable for each of the rightward and leftward second reflectors 11202 according to steering angle $\delta_H(i)$ is set to be in excess of gain k of the deflection drive variable for each of the rightward and leftward first reflectors 11201 according to vehicular steering angle $\delta_H(i)$, a quick deflection drive for the second reflectors toward the vehicular turn direction can be achieved in such a case as the vehicular turn at a vehicular velocity falling in the high velocity range. Consequently, the vehicular lamp system in the first embodiment can positively provide the natural deflection drive which accords with the human's sense with almost no insufficient feeling given to the driver.

Thus, in accordance with a variation in the vehicular velocity and in response to the steering angle, controller 3 can positively perform the deflection drive through driving section for first reflectors 11201, each for forming the center light, and for second reflectors 11202, each for forming the surrounding light, both reflectors being placed on the turning side and on the un-turning side.

Hence, the vehicular lamp system in the first embodiment can assuredly improve the visibility in the vehicular turn direction, as needed most at the vehicular turn situation, and keep the visibility of both of the front radiation area and the un-turning side of vehicle C in accordance with the vehicular velocity. Consequently, the whole visibility can remarkably be improved.

In addition, the natural deflection drive control for either or both of rightward and leftward first reflectors 11201 and rightward and leftward second reflectors 11202 in accordance with the vehicular velocity and the steering wheel's steering angle can be achieved with almost no insufficient feeling given to the vehicular driver and in conformity to the human's sense.

Second Embodiment

FIGS. 41 to 49B show a second embodiment of vehicular lamp system according to the present invention. Hereinafter will be described deflection drive controls. The basic controls are similar to those of the first embodiment described above.

Figure 43:
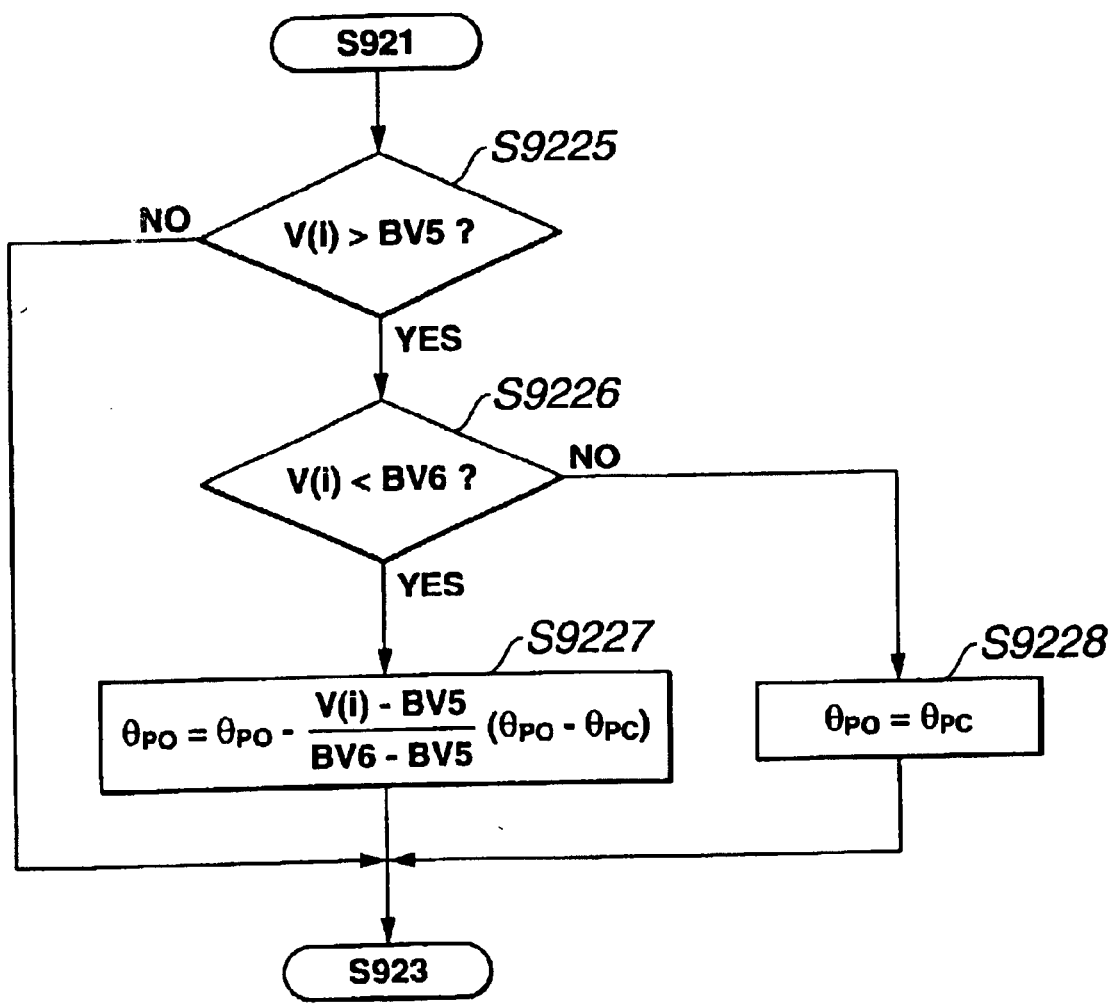
FIG. 43 is an operational flowchart representing the convergence process when the vehicle is running at the middle vehicular velocity range, in the case of the second preferred embodiment.
Figure 44:
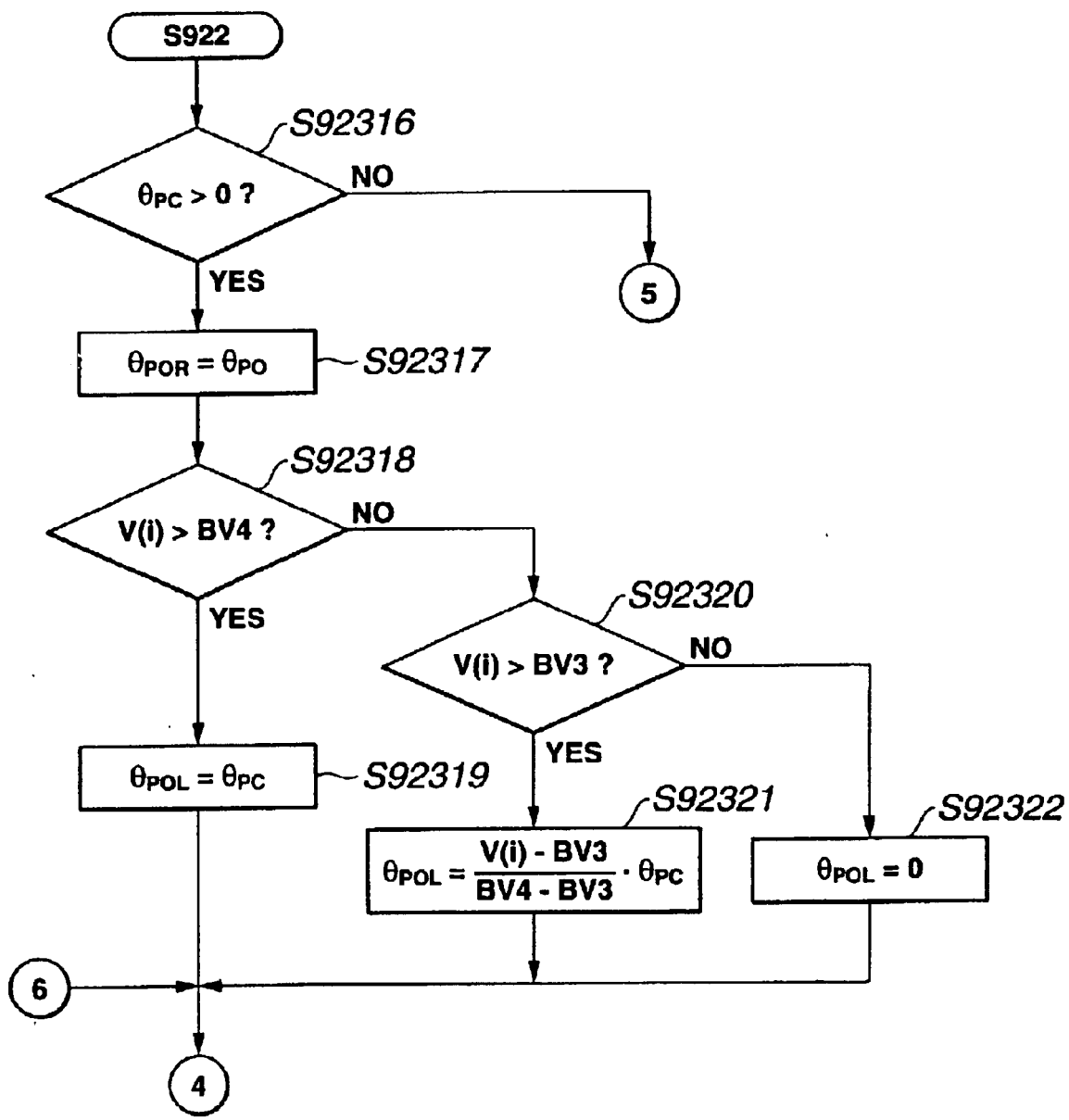
FIG. 44 is an operational flowchart representing the so-called one-side control, in the case of the second preferred embodiment.
Figure 45:
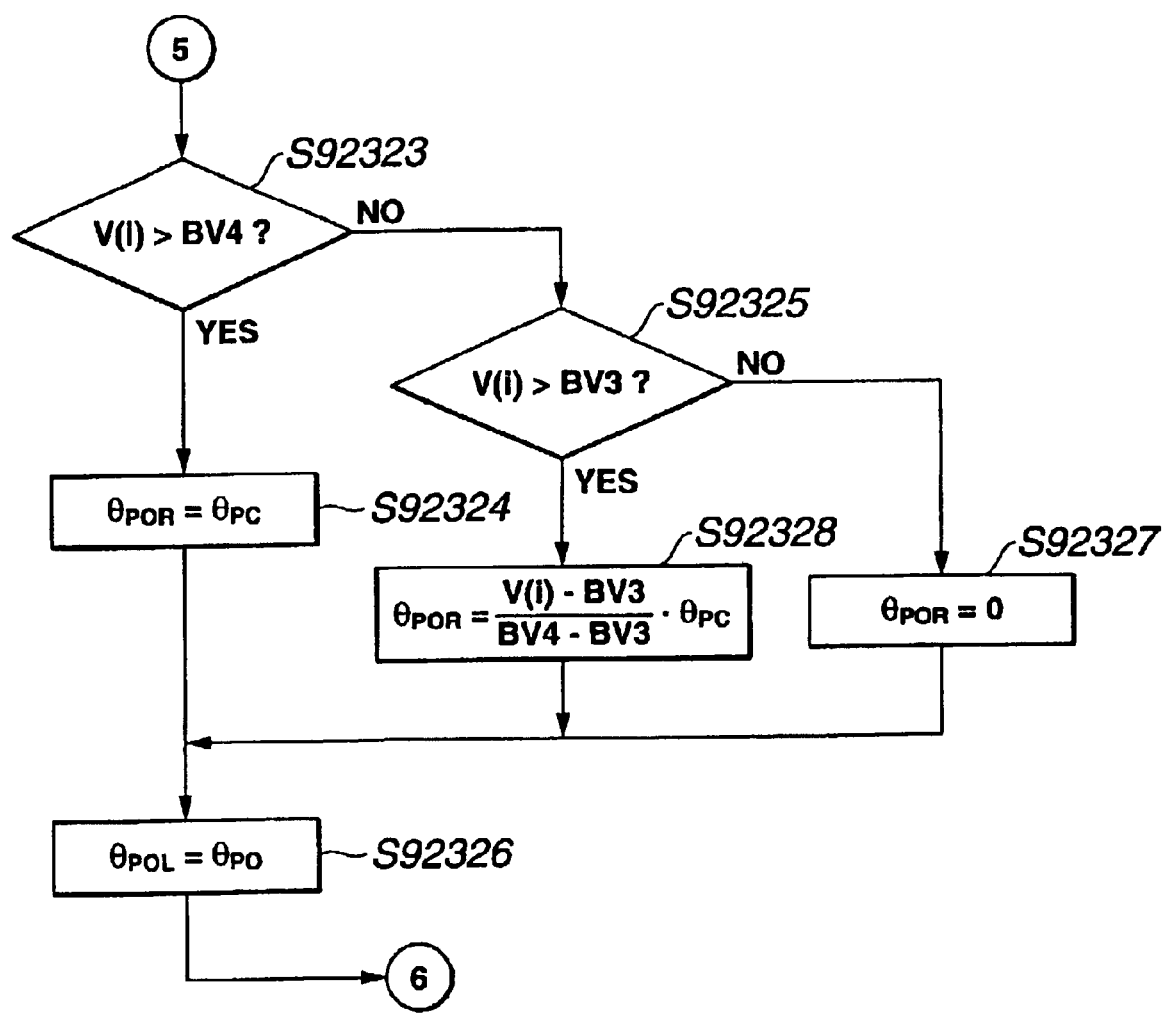
FIG. 45 is an operational flowchart representing the switching process of the one-side control process, in the case of the second preferred embodiment.

In the second embodiment, processing flows in FIGS. 31, 32 and 33 described in the first embodiment are replaced by those in FIGS. 43, 44 and 45.

Figure 41:
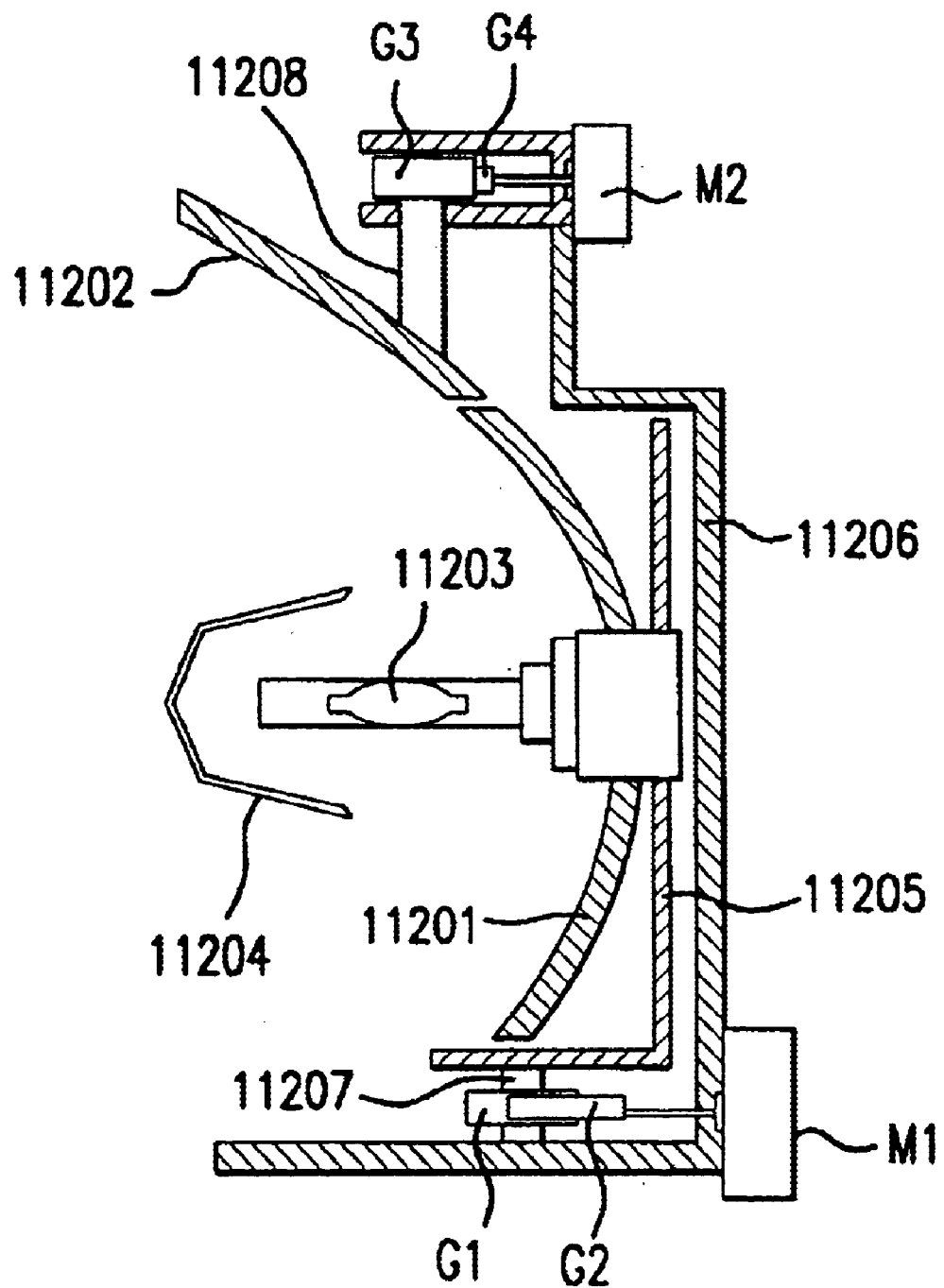
FIG. 41 is a schematic cross sectional view of the light distribution control lamp in a case of a second preferred embodiment of the vehicular lamp system according to the present invention.
Figure 42:
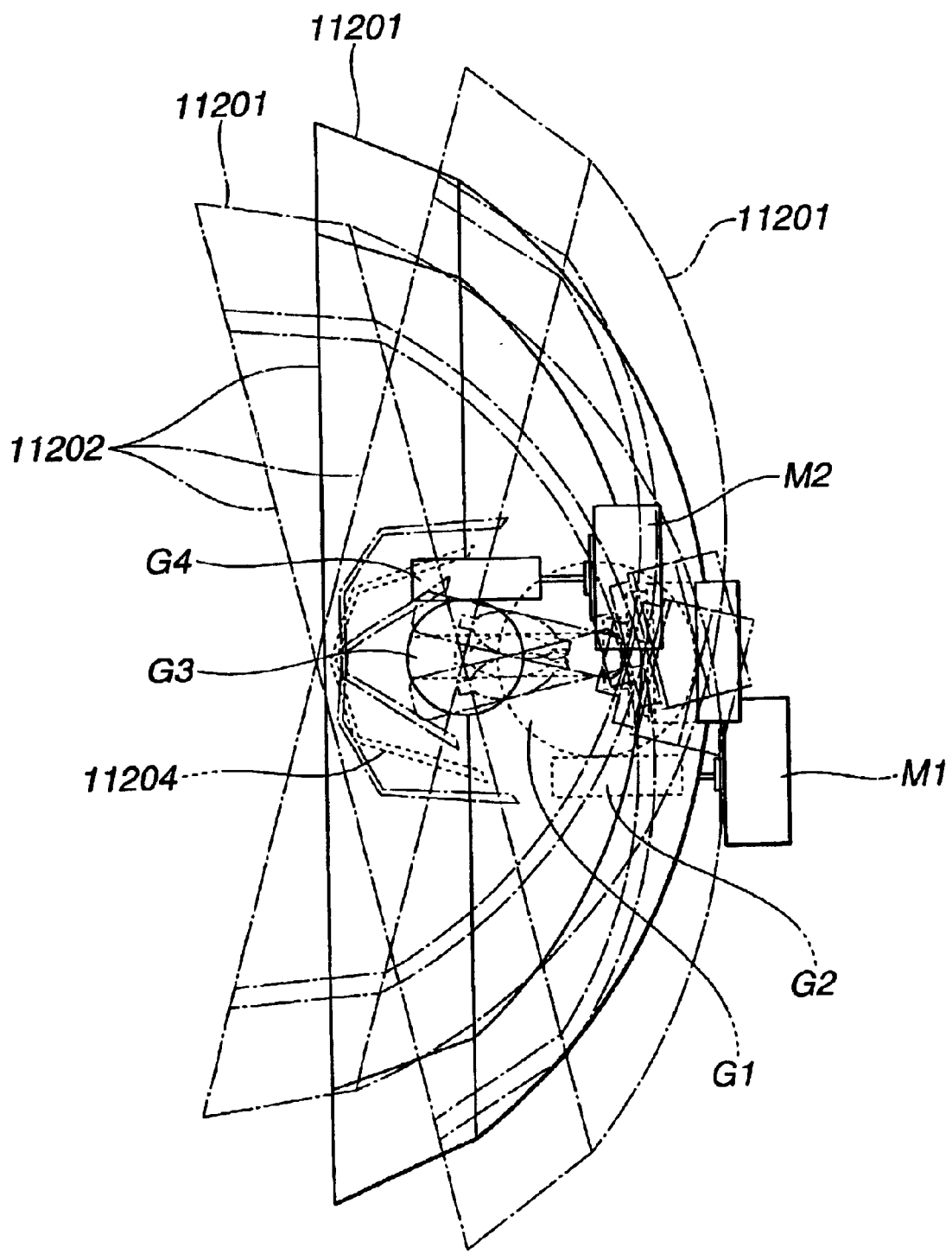
FIG. 42 is a schematic plan view of the light distribution control lamp including an operation situation of the light distribution control lamp, in the case of the second preferred embodiment.

FIG. 41 is a side elevation view representing a schematic configuration of one-side light distribution control lamp 112, and FIG. 42 is a top plan view showing an operated state thereof.

As shown in FIG. 41, light distribution control lamp 112 is provided in lower reflector 11201 with light source 11203, in front end of which shade 11204 is disposed for shading the direct light coming from light source 11203.

Although not shown, shade 11204 is supported by the support axle extended from lower reflector 11201. Two (stepping) motors M1 and M2 are installed as the driving section (as shown in FIG. 1). Upper reflector is coupled to base 11206 through a rotary axle 11208, on which gear G3 is mounted. By the power of motor M2 mounted on base 11206 through gear G4, as shown in FIG. 8, upper reflector 11202 is turned on a rotary axle 11208 to the rightward and leftward.

Then, base 11205, on which lower reflector 11201 and light source 11203 are mounted, is coupled to base 11206 through a rotary axle 11207, on which gear G1 is mounted. By the power of motor M1 through gear G2, therefore, lower reflector 11201 and light source 11203 are turned on a rotary axle 11207 to the rightward and leftward, as shown in FIG. 42. Then, base 11206 is fixed to the vehicle body.

[Convergence at Middle Velocity]

FIG. 43 shows a detailed flow of the convergence at a middle velocity at S922 in FIG. 29.

At S9225, controller 3 decides whether V(i)>BV5 so as to decide whether vehicular velocity V(i) exceeds vehicular velocity BV5 at which the motion (angular displacement) of the surrounding light starts to be reduced. The routine goes to S9226, if the vehicular velocity V(i) exceeds BV5 (Yes). If No at S9225, the routine of FIG. 43 jumps to S923 in FIG. 29.

At S9226, controller 3 makes the decision of V(i)<BV6 so as to decide whether or not vehicular velocity V(i) is lower than vehicular velocity BV6 (=60 (Km/h)) at which the motion (angular displacement) of the surrounding light completely stops. If controller 3 decides that vehicular velocity V(i) is lower than vehicular velocity BV6 (Yes) and controller 3 decides that vehicular velocity V(i) is in the range of 40 to 60 (Km/h), the routine goes to S9227. If controller 3 decides that vehicular velocity V(i) equal to or exceed BV6 (No) and controller 3 decides that vehicular velocity V(i) is in the high velocity range exceeding 60 (Km/h), the routine goes to S9228.

At S9227, provisional value $\theta_{PO}$ of the surrounding light panning angle is calculated by the following equation:

$$\theta_{PO}=\theta_{PO}-\{(V(i)-BV5)/(BV6-BV5)\}(\theta_{PO}-\theta_{PC}).$$

At S9228, controller 3 executes the calculation operation $\theta_{PO}=\theta_{PC}$ so as to set provisional value $\theta_{PO}$ of the surrounding light panning angle to set provisional value $\theta_{PC}$ of the center light panning angle.

It is noted that $\theta_{PO}$ is calculated as $\theta_{PO}-\theta_{PC}$ so that a proper control can be made as in the case of the first embodiment even in a case where the upper and lower reflectors are controlled completely independently of each other.

[One-Side Control]

FIGS. 44 and 45 show detailed flowcharts of the one-side control carried out at S923 in FIG. 29.

At S92316, controller 3 decides whether $\theta_{PC}=0$ so as to decide the direction of the panning angle. If provisional value $\theta_{PC}$ of the center light panning angle is positive and controller 3 decides that the turn is to be rightward (Yes), the routine goes to S92317. If No at SS92316 and controller 3 decides the turn is in the leftward direction, the routine goes to S92323 in FIG. 45.

At S92317, controller 3 executes the calculation operation of $\theta_{POR}=\theta_{PO}$ so as to set provisional value $\theta_{POR}$ of the rightward surrounding light panning angle to set provisional value $\theta_{PO}$ of the surrounding light panning angle. Then, the routine goes to S92318.

At S92318, controller 3 makes the decision of V(i)>BV4 so as to decide whether or not vehicular velocity BV4=60 (Km/h) at which the center light on the un-turning side is displaced within the range of the maximum panning angle is exceeded. If vehicular velocity V(i) exceeds BV4 (Yes), the routine goes to S92319. If No at S92318, the routine goes to S92320.

At S92319, controller 3 executes the calculation operation of $\theta_{POL}=\theta_{PC}$ so as to set provisional value $\theta_{POL}$ of the leftward surrounding light panning angle to set provisional value $\theta_{PC}$ of the center light panning angle.

At S92320, controller 3 makes the decision of whether V(i)>BV3 so as to decide whether or not vehicular velocity V(i) exceeds vehicular velocity BV3=40 (Km/h) at which the center light on the un-turning side starts to move. The routine goes to S92321, if the answer is Yes (V(i)>BV3). If No (V(i)≦BV3 at S92320), the routine goes to S92322.

At S92321, provisional value $\theta_{POL}$ of the leftward surrounding light panning angle is calculated by the following equation:

$$\theta_{POL}=\{(V(i)-BV3)/(BV4-BV3)\}\cdot\theta_{PC}.$$

At S92322, controller 3 executes the calculation operation of $\theta_{POL}=0$ so as to set provisional value $\theta_{POL}$ of the leftward surrounding light panning angle to zero.

At S92323 in FIG. 45, controller 3 makes the decision of whether V(i)>BV4 so as to decide whether or not vehicular velocity V(i) exceeds vehicular velocity BV4=60 (Km/h) at which the center light on the un-turning side moves in the range of the maximum panning angle. The routine goes to S92324, if the answer is YES (V(i)>BV4). If No at S92323, the routine goes to S92325.

At S92314, controller 3 executes the calculation operation of $\theta_{POR}=\theta_{PC}$ so as to set provisional value $\theta_{POR}$ of the leftward surrounding light panning angle to set provisional value $\theta_{PC}$ of the center light panning angle as $\theta_{POR}=\theta_{PC}$. Then, the routine goes to S92326.

At S92325, controller 3 makes the decision of V(i)>BV3 so as to decide whether or not vehicular velocity V(i) exceeds vehicular velocity BV3=40 (km/h) at which the center light on the un-turning side starts to move. The routine goes to S92328, if the answer is Yes V(i)>BV3. If No at S92325, the routine goes to S92327.

At S92326, provisional value $\theta_{POR}$ of the rightward surrounding light panning angle is calculated by the following equation:

$$\theta_{POR}=\{(V(i)-BV3)/(BV4-BV3)\}\cdot\theta_{PC}.$$

At S92327, controller 3 executes the calculation operation of $\theta_{POR}=0$ as to set provisional value $\theta_{POR}$ of the rightward surrounding light panning angle to zero. Then, the routine goes to S92328.

At S92328, controller 3 executes the calculation operation of $\theta_{POL}=\theta_{PO}$ so as to set provisional value $\theta_{POL}$ of the leftward surrounding light panning angle to provisional value $\theta_{PO}$ of the surrounding light panning angle.

Figure 46A:
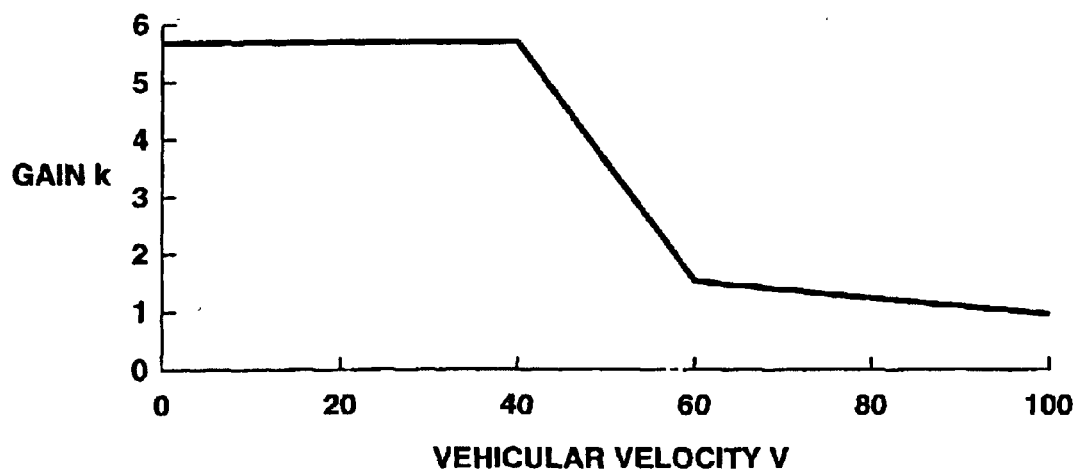
FIGS. 46A and 46B are characteristic graphs representing the gain on the surrounding light placed at the inside of the vehicular turn direction and representing the gain on the center light placed at the inside of the vehicular turn direction, in the case of the second embodiment, respectively.
Figure 46B:
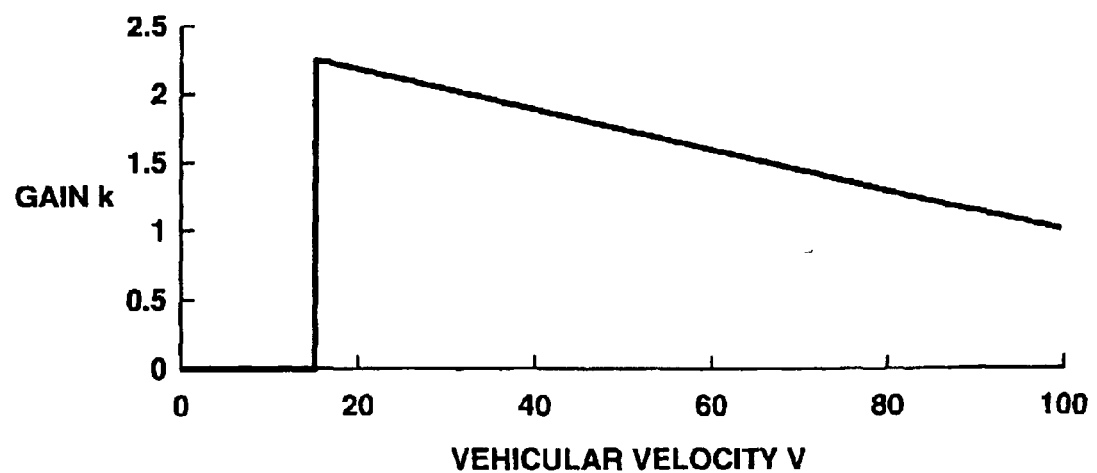
Figure 47A:
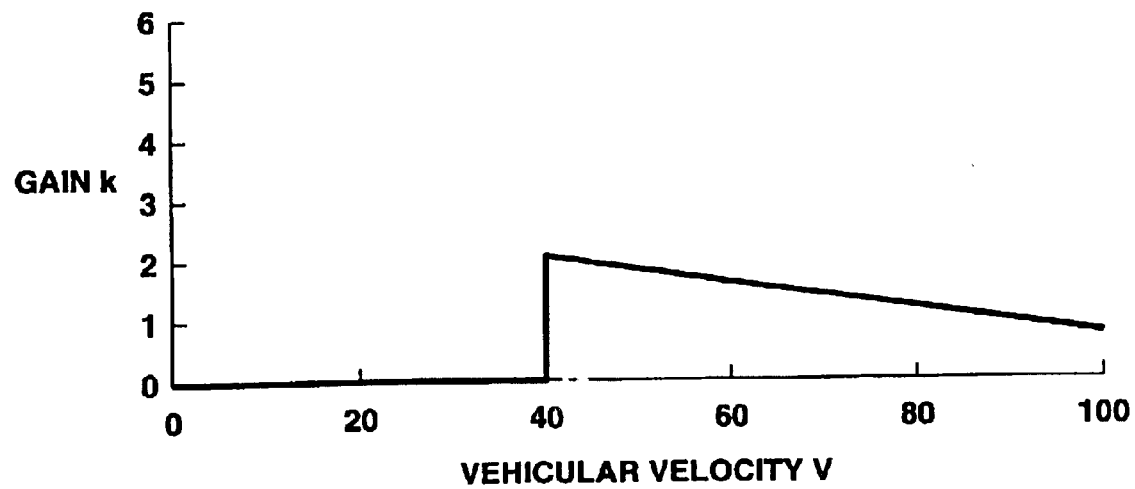
FIGS. 47A and 47B are characteristic graphs representing the gain on the surrounding light placed at the inside of the vehicular turn direction and representing the gain on the center light placed at the inside of the vehicular turn direction, in the case of the second preferred embodiment, respectively.
Figure 47B:
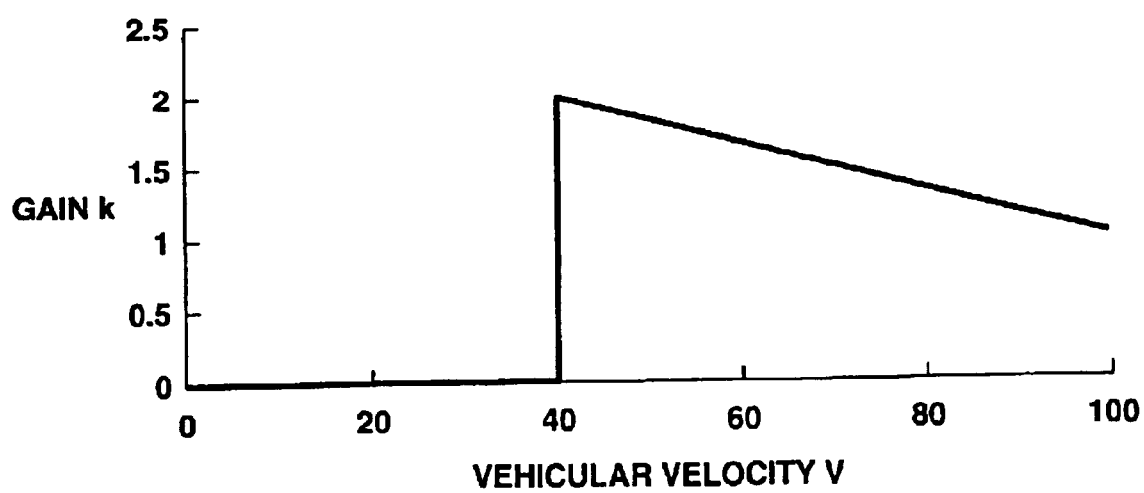

FIGS. 46A through 47B illustrate surrounding light gains and center light gains, respectively. FIG. 46A illustrates the gain on the turning side of the surrounding light, and FIG. 46B illustrates the gain on the turning side of the center light. FIG. 47A illustrates the gain on the un-turning side of the surrounding light, and FIG. 47B illustrates the gain on the un-turning side of the center light.

As illustrated in FIG. 46A, on the turning side of the surrounding light, the gain K=5.6 till vehicular velocity V(i) is 0 to 40 (Km/h). For vehicular velocity V(i)=40 to 60 (Km/h), a transition range in which gain k linearly decreases to 1.5 is provided. At vehicular velocity as V(i)=60 (Km/h) or higher, gain k is set so as to be gradually decreased.

Gain k on the turning side of the center light is 0 in an extremely low range where vehicular velocity V(i)=15 (Km/h) or lower. Gain k=2.2, at vehicular velocity V(i)=15 (Km/h). Gain k gradually decreases as vehicular velocity V(i) changes from 15 (Km/h) to the low velocity range, the middle velocity range, and the high velocity range.

Gain k on un-turning side of the surrounding light is 0 in the middle vehicular velocity range, low velocity range, and in the extremely low velocity range below vehicular velocity of V(i)=40 (Km/h), and gain k is set as gain k=2.2 when the vehicular velocity is V(i)=40 (Km/h). Gain k is subsequently set to be gradually decreased as vehicular velocity V(i) varies to the high velocity range of 40 (Km/h) or higher.

Gain k on the un-turning side of the center light is set to 0, as illustrated in FIG. 47B, in the low velocity range and in the extremely low velocity range in which vehicular velocity V(i) is below V(i)=40 (Km/h). Gain k is set to k=1.8 when vehicular velocity V(i) is V(i)=40 (Km/h) and is subsequently set to gradually decrease over the high velocity range in which vehicular velocity V(i) exceeds V(i)=40 (Km/h).

Figure 48A:
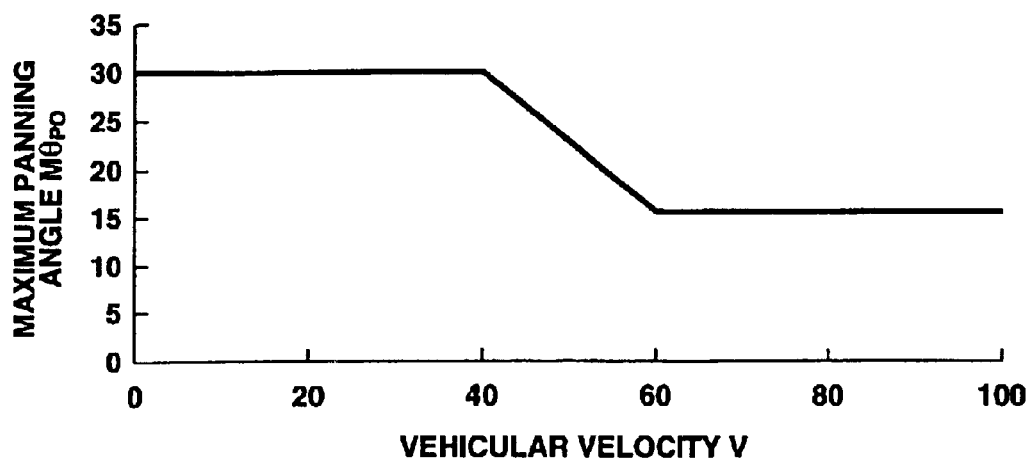
FIGS. 48A and 48B are characteristic graphs representing the maximum panning angle on the surrounding light placed at the inside of the vehicular turn direction and representing the maximum panning angle of the center light placed at the inside of the vehicular turn direction, in the case of the second preferred embodiment, respectively.
Figure 48B:
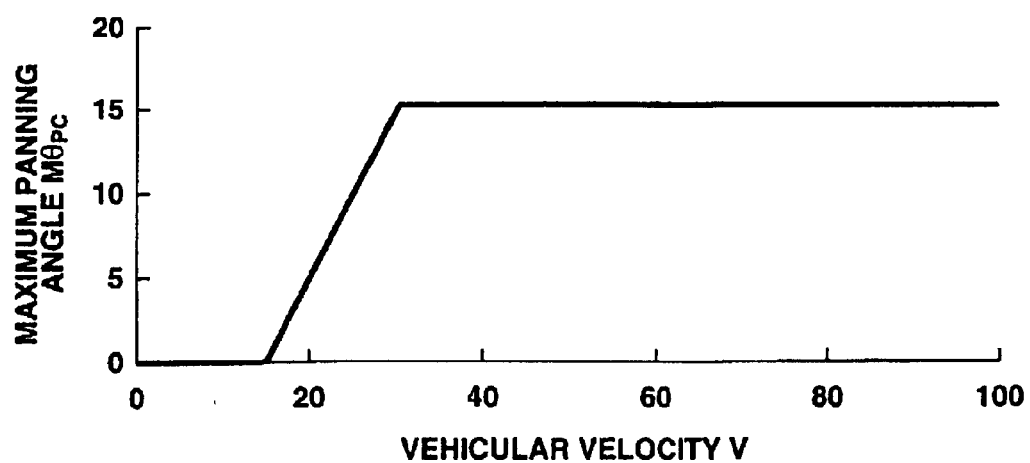
Figure 49A:
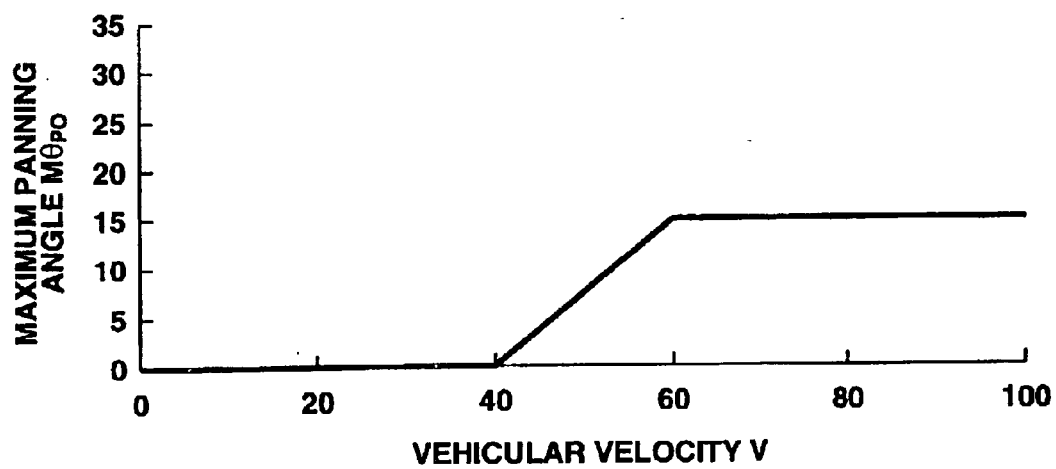
FIGS. 49A and 49B are characteristic graphs representing the maximum panning angle of the surrounding light at the outside of the vehicular turn direction and representing the maximum panning angle of the center light placed at the outside of the vehicular turn direction, in the case of the second preferred embodiment, respectively.
Figure 49B:
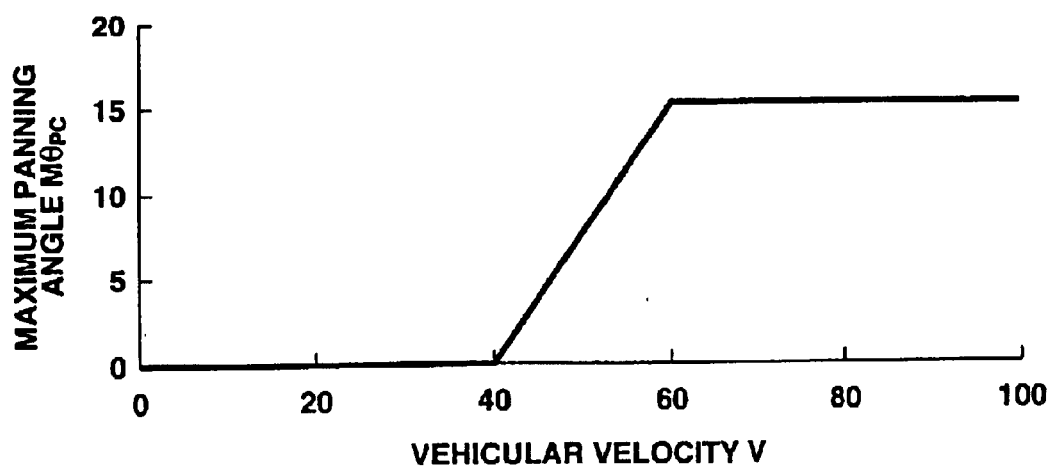

FIGS. 48A to 49B illustrate changes in the maximum panning angles. FIG. 48A illustrates a variation in maximum panning angle $M\theta_{PO}$ of the surrounding light on the turning side, and FIG. 48B illustrates a variation in maximum panning angle $M\theta_{PC}$ of the center light on the turning side. FIG. 49A illustrates a variation in maximum panning angle $M\theta_{PO}$ of the surrounding light on the un-turning side, and FIG. 49B illustrates a variation in maximum panning angle $M\theta_{PC}$ of the center light on the un-turning side.

Maximum panning angle $M\theta_{PO}$ of the surrounding light on the turning side is set, as illustrated in FIG. 48A, to $M\theta_{PO}$=30 (deg) in the middle, low, and extremely low velocity ranges where the vehicular velocity is below V(i)=40 (Km/h). In the range where the vehicular velocity is over V(i)=40 (Km/h) or below V(i)=60 (Km/h), maximum panning angle $M\theta_{PO}$ gradually decreases linearly to 15 (degrees). In the high velocity range where vehicular velocity is over V(i)=60 (Km/h), $M\theta_{PO}$ is set to constant of $M\theta_{PO}$=15 (degrees).

Thus, by providing the transition range in which maximum panning angle $M\theta_{PO}$ gradually decreases in the velocity range of V(i)=40 to 60 (Km/h), the surrounding light according to the steering angle can be established while naturally matching to the variation in the panning angle on the turning side even when the vehicular velocity variations from the middle to high velocity range. Hence, the deflection drive control can be achieved without insufficient feeling given to vehicular driver. The deflection drive according to the natural driving sense of the driver can be achieved.

The variation in maximum panning angle $M\theta_{PC}$ of the center light on the turning side is set to 0, as illustrated in FIG. 48B, in the extremely low velocity range where vehicular velocity is below V(i)=15 (Km/h). The variation gradually increases linearly in the range where the vehicular velocity is V(i)=15 to 30 (Km/h), and is set to $M\theta_{PC}$=15 (deg) in the middle and high velocity ranges where the vehicular velocity is over V(i)=30 (Km/h).

In this maximum panning angle $M\theta_{PC}$ of the center light on the turning side, too, the transition range is provided for the vehicular velocity of V(i)=15 to 30 (Km/h), so that the deflection drive can be natural without insufficient feeling given to vehicular driver.

The variation in maximum panning angle $M\theta_{PO}$ on the un-turning side of the surrounding light is set, as illustrated in FIG. 49A, to 0 in the middle, low and extremely low velocity ranges in which the vehicular velocity is V(i)=40 (Km/h) or lower. $M\theta_{PO}$ gradually increases linearly in the range of vehicular velocity of V(i)=40 to 60 (Km/h) and is set to $M\theta_{PO}$=15 (deg) in the high velocity range over vehicular velocity of V(i)=60 (Km/h).

The variation in maximum panning angle $M\theta_{PC}$ on the un-turning side of the center light is set, as illustrated in FIG. 49B, to 0 in the middle, low, and extremely low velocity ranges in which the vehicular velocity is V(i)=40 (Km/h) or lower. $M\theta_{PC}$ gradually increases linearly in the rage of vehicular velocity of V(i)=40 to 60 (Km/h) and is set to $M\theta_{PC}$=15 (degrees) in the high velocity range over vehicular velocity of V(i)=60 (Km/h).

In these maximum panning angles of the surrounding light and the center light on the un-turning side, too, the transition range is provided for the vehicular velocity of V(i)=40 to 60 (Km/h), so that the deflection drive can naturally be achieved without insufficient feeling given to vehicular driver.

By these controls, second reflector 11202 on the turning side can be so driven in the extremely low, low-and-middle velocity ranges where the vehicular velocity is V(i)=40 (Km/h) or lower as to vary the surrounding light panning angle in the turn direction in accordance with steering angle $\delta_H(i)$ in the range of maximum panning angle $M\theta_{PO}$. In the transition range of the vehicular velocity of V(i)=40 to 60 (Km/h), the ratio of the deflection drive variable can be reduced according to the rise in the vehicular velocity. In the high velocity range of the vehicular velocity of V(i)=60 (Km/h) or higher, second reflector 11202 can be driven by reducing the range of maximum panning angle $M\theta_{PO}$.

On the other hand, first reflector 11201 on the turning side is fixed at the forward area of vehicle C in the extremely low velocity range where the vehicular velocity is below V(i)=15 (Km/h). In the transition range of the vehicular velocity of V(i)=from 15 to 30 (Km/h), the deflection drive variable is gradually reduced according to the rise in the vehicular velocity. In the middle and high velocity ranges where the vehicular velocity exceeds V(i)=30 (Km/h), the deflection drive can be performed to vary the center light panning angle within the range of maximum panning angle $M\theta_{PC}$ in accordance with the steering angle $\delta_H(i)$.

Furthermore, second reflector 11202 on the un-turning side can be fixed on the forward area of vehicle C, in the extremely low, low, and middle velocity ranges where the vehicular velocity is below V(i)=40 (Km/h), and can be deflectively driven in the transition range of the vehicular velocity of V(i)=40 to 60 (Km/h) as to increase the center light panning angle according to the increase in steering angle $\delta_H(i)$. In the high velocity range where the vehicular velocity is over V(i)=60 (Km/h), second reflector 11202 on the un-turning side can deflectively be driven to vary the center light panning angle according to steering angle $\delta_H(i)$ within the range of maximum panning angle $M\theta_{PC}$=15 (degrees).

On the other hand, first reflector 11201 on the un-turning side can be fixed on the forward area of the vehicle in the extremely low, low, and middle velocity ranges where the vehicular velocity is below V(i)=40 (Km/h), and can deflectively be driven in the transition range of the vehicular velocity of V(i)=40 to 60 (Km/h) so as to increase the center light panning angle according to the increase in steering angle $\delta_H(i)$. In the high velocity range where the vehicular velocity is over V(i)=60 (Km/h), first reflector 11201 on the un-turning side can deflectively be driven to vary the center light panning angle according to steering angle $\delta_H(i)$ within the range of maximum panning angle MPC=15 (deg).

Thus, in the second embodiment, the same advantages as described in the first embodiment can be attained.

Since even in the mode where first reflector 11201 is supported by base 11205 supported movably on base 11206 fixed on the vehicle body and where second reflector 11202 is supported on base 11206 fixed on the vehicle body, first reflector 11201 and second reflector 11202 can appropriately be controlled.

The visibilities of the front area and on the un-turning side of vehicle can be kept while the visibility in the turn direction is improved. At the same time, a natural deflection drive control having no insufficient feeling given to the vehicular driver can be achieved by the natural control operation according to the vehicular velocity and the wheel steering angle.

In both of the foregoing embodiments, rightward and leftward second reflectors 11202 are deflectively driven on the turning side and forward on the un-turning side in the middle velocity range and are fixed on the forward area of vehicle C on both the turn and un-turning sides in the high velocity range. These reflectors can deflectively be driven in an appropriate manner.

The divisions of the vehicular velocity ranges are not be limited to the four regions of the extremely low, low, middle, and high vehicular velocities. The vehicular velocity ranges for deflection drive control may alternatively be divided into three regions of low, middle, and high velocities or two regions of low and high velocities.

The entire contents of a Japanese Patent Application No. 2000-151969 (filed in Japan on May 23, 2000) are herein incorporated by reference. Although the present invention has been described by reference to certain embodiments of the present invention, the present invention is not limited to the embodiments described above.

Modifications and variations of the embodiments described above will occur to those skilled in the art in the light of the above teachings.

The scope of the present invention is defined with reference to the following claims.

What is claimed is:

1. A vehicular lamp system, comprising:
   a first reflector, disposed on a head of a vehicle, equipped with a light source, and enabled to be driven to deflect a reflection direction of a light beam from the light source toward a vehicular turn direction together with the light source;
   a second reflector enabled to be driven to deflect the reflection direction thereof toward the vehicular turn direction independently of the first reflector;
   a driving section that operatively performs a deflection drive for the first and second reflectors;
   a vehicular velocity detector to detect a vehicular velocity of the vehicle;
   a steering angle detector to detect a vehicular steering angle of the vehicle; and
   a controller to determine whether the detected vehicular velocity falls in a predetermined middle velocity range and to control the driving section on the basis of the detected vehicular velocity and steering angle in such a manner that the second reflector is deflected toward the vehicular turn direction according to the detected steering angle when determining that the detected vehicular velocity is lower by a predetermined low velocity range than the predetermined middle velocity range and that the first reflector is deflected toward the vehicular turn direction according to the steering angle when determining that the detected vehicular velocity is higher than the predetermined middle vehicular velocity range.

2. A vehicular lamp system as claimed in claim 1, wherein a pair of the first and second reflectors are equipped on predetermined lateral ends of the head of the vehicle.

3. A vehicular lamp system as claimed in claim 2, wherein the controller controls the driving section in such a manner that only one of the second reflectors equipped on the predetermined lateral ends of the head of the vehicle which is placed at an inside of the vehicular turn direction with respect to a center of a circle of turn is deflected toward the vehicular turn direction according to the detected steering angle when determining that the detected vehicular velocity is lower than the predetermined middle vehicular velocity range.

4. A vehicular lamp system as claimed in claim 2, wherein the controller controls the driving section in such a manner that at least the first reflectors equipped on the predetermined lateral ends of the head of the vehicle are deflected toward the vehicular turn direction according to the detected steering angle when determining that the detected vehicular velocity is higher than the predetermined middle vehicular velocity range.

5. A vehicular lamp system as claimed in claim 2, wherein the vehicular controller controls the driving section in such a manner that one of the first reflectors equipped on the predetermined lateral ends of the head of the vehicle which is placed at an inside of the vehicular turn direction with respect to a center of a circle of turn is deflected toward the vehicular turn direction according to the detected steering direction when determining that the detected vehicular velocity falls in the predetermined middle vehicular velocity range.

6. A vehicular lamp system as claimed in claim 5, wherein the controller controls the driving section in such a manner that one of the first reflectors equipped on the predetermined lateral ends of the head of the vehicle which is placed at an outside of the vehicular turn direction with respect to the center of the circle of turn is deflected toward the vehicular turn direction according to the detected steering angle through a deflection drive variable smaller than that of the other of the first reflectors which is placed at the inside of the vehicular turn direction when determining that the detected vehicular velocity falls in the predetermined middle vehicular velocity range.

7. A vehicular lamp system as claimed in claim 6, wherein the controller controls the driving section in such a manner that one of the first reflectors equipped on the predetermined lateral ends of the head of the vehicle which is placed at the outside of the vehicular turn direction is deflected after the other of the first reflectors which is placed at the inside of the vehicular turn direction has been deflected.

8. A vehicular lamp system as claimed in claim 2, wherein the controller determines whether the detected vehicular velocity is lower than a constant vehicular velocity and controls the driving section in such a manner that one of the pair of the first and second reflectors equipped on the predetermined lateral ends of the head of the vehicle which is placed at an outside of the vehicular turn direction with respect to a center of a circle of turn is inhibited from being deflected when determining that the detected vehicular velocity is lower than the constant vehicular velocity.

9. A vehicular lamp system as claimed in claim 8, wherein the controller comprises a setting section that sets the constant vehicular velocity to the predetermined low velocity range lower than the predetermined middle velocity range.

10. A vehicular lamp system as claimed in claim 1, wherein the controller comprises a preset section that presets a maximum value of a deflection drive variable for at least one of the first and second reflectors according to predetermined velocity ranges including the predetermined low and middle velocity ranges, a transition range gradually modifying the maximum value of the deflection drive variable being provided between the respective velocity ranges.

11. A vehicular lamp system as claimed in claim 5, wherein the controller controls the driving section in such a manner that only one of the pair of the first and second reflectors equipped on the predetermined lateral ends of the head of the vehicle which is placed at the inside of the vehicular turn direction is deflected toward the vehicular turn direction according to the detected steering angle when determining that the detected vehicular velocity is lower than the predetermined middle velocity range and the controller controls the driving section in such a manner that one of the first reflectors equipped on the predetermined lateral ends of the head of the vehicle which is placed at the inside of the vehicular turn direction is deflected toward the vehicular turn direction according to the detected steering angle and in such a manner that the other of the first reflectors equipped on the predetermined lateral ends of the head of the vehicle which is placed at an outside of the vehicular turn direction with respect to a center of a circle of turn is deflected toward the vehicular turn direction according to the detected steering angle through a deflection drive variable smaller than that of the other of the first reflectors which is placed at the inside of the vehicular turn direction when determining that the detected vehicular velocity falls in the predetermined middle velocity range.

12. A vehicular lamp system as claimed in claim 11, wherein the controller comprises a preset section that presets a maximum value of the deflection drive variable according to vehicular velocity ranges including the predetermined middle vehicular velocity range, a transition range gradually modifying the maximum value of the deflection drive variable being provided between the respective vehicular velocity ranges.

13. A vehicular lamp system as claimed in claim 1, wherein the controller comprises a deciding section that decides whether the detected steering angle is furthermore increased and a gain setting section that sets such a gain of a deflection drive variable through which one of the first and second reflectors is deflected according to the detected steering angle when the deciding section decides that the detected steering angle is furthermore increased as to be in excess of that of the deflection drive variable according to the detected steering angle when the deciding section decides that the detected steering angle is decreased.

14. A vehicular lamp system as claimed in claim 1, wherein the controller comprises a gain setting section that sets such a gain of a deflection drive variable through which the first reflector is deflected according to the detected steering angle as to be in excess of that of the deflection drive variable through which the second reflector is deflected according to the detected steering angle.

15. A vehicular lamp system as claimed in claim 1, further comprising a spin state detector to detect a vehicular spin state and wherein the controller controls the driving section in such a manner that a deflection drive variable for at least the first reflector is zeroed upon a detection of the vehicular spin state by the spin state detector.

16. A vehicular lamp system as claimed in claim 15, wherein the spin state detector detects the vehicular spin state from a steering direction of the vehicle and a yawing rate of the vehicle.

17. A vehicular lamp system as claimed in claim 1, wherein the first reflector sets an optical axis of the light source.

18. A vehicular lamp system as claimed in claim 17, wherein the second reflector sets an radiation of a light beam to a surrounding area to the optical axis.

19. A vehicular lamp system as claimed in claim 18, wherein a reflected light beam by the first reflector is set to be brighter than that by the second reflector.

20. A vehicular lamp system, comprising:
at least a pair of rightward and leftward first reflectors, each of the first reflectors being disposed on a head of a vehicle, being equipped with a light source, and being enabled to be driven to deflect a reflection direction of a light beam from the light source toward a vehicular turn direction together with the light source;
at least a pair of rightward and leftward second reflectors, each of the second reflectors being enabled to be driven to deflect the reflection direction thereof toward the vehicular turn direction independently of the pair of the rightward and leftward first reflectors;
a driving section that operatively performs a deflection drive for the pairs of the rightward and leftward first reflectors and second reflectors;
a vehicular velocity detector to detect a vehicular velocity of the vehicle;
a steering angle detector to detect a vehicular steering angle of the vehicle; and
a controller to determine whether the detected vehicular velocity falls in a predetermined middle velocity range and to control the driving section on the basis of the detected vehicular velocity and steering angle in such a manner that one of the pair of the rightward and leftward first reflectors which is placed on an inside of a vehicular turn direction with respect to a center of a circle of turn is deflected toward the vehicular turn direction according to the detected steering angle when determining that the detected vehicular velocity falls in the predetermined middle velocity range.

21. A vehicular light system, comprising:
first reflecting means, disposed on a head of a vehicle, equipped with a light source, and enabled to be driven to deflect a reflection direction of a light beam from the light source toward a vehicular turn direction together with the light source;
second reflecting means enabled to be driven to deflect the reflection direction thereof toward the vehicular turn direction independently of the first reflecting means;
driving means for operatively performing a deflection drive for the first and second reflecting means;
vehicular velocity detecting means for detecting a vehicular velocity of the vehicle;
steering angle detecting means for detecting a vehicular steering angle of the vehicle; and
controlling means for determining whether the detected vehicular velocity falls in a predetermined middle velocity range and for controlling the driving means on the basis of the detected vehicular velocity and steering angle in such a manner that the second reflector is deflected toward the vehicular turn direction according to the detected steering angle when determining that the detected vehicular velocity is lower than the predetermined middle velocity range and in such a manner that the first reflector is deflected toward the vehicular turn direction according to the steering angle when determining that the detected vehicular velocity is higher than the predetermined middle velocity range.

22. A vehicular lamp system, comprising:
a first reflector disposed on a head of a vehicle and enabled to be driven to deflect a reflection direction of a light beam from a light source toward a vehicular turn direction together with the light source;
a second reflector enabled to be driven to deflect the reflection direction thereof toward the vehicular turn direction independently of the first reflector, the light source being installed only on the first reflector but being uninstalled on the second reflector;
a driving section that operatively performs a deflection drive for the first and second reflectors;
a vehicular velocity detector to detect a vehicular velocity of the vehicle, the vehicular velocity being divided into at least three velocity ranges of a predetermined extremely low velocity range, a predetermined high velocity range, and a predetermined other velocity range other than the predetermined extremely low velocity range and the predetermined high velocity range;

a steering angle detector to detect a vehicular steering angle of the vehicle; and a controller to control the driving section according to the vehicular velocity detected by the vehicular velocity detector and the steering angle detected by the steering angel detector, to determine whether the detected vehicular velocity falls in the predetermined extremely low velocity range, to control the driving section to drive only the second reflector having no light source when determining that the detected vehicular velocity falls in the predetermined extremely low velocity range, to determine whether the detected vehicular velocity falls in the predetermined high velocity range, and to control the driving section to drive at least the first reflector having the light source when determining that the detected vehicular velocity reaches to the predetermined high velocity range.

23. A vehicular lamp system, comprising:

a first reflector, disposed on a head of a vehicle, equipped with a light source, and enabled to be driven to deflect a reflection direction of a light beam from the light source toward a vehicular turn direction together with the light source;

a second reflector enabled to be driven to deflect the reflection direction thereof toward the vehicular turn direction independently of the first reflector;

a driving section that operatively performs a deflection drive for the first and second reflectors;

a vehicular velocity detector to detect a vehicular velocity of the vehicle; and a controller to determine whether the detected vehicular velocity falls in a predetermined middle velocity range and to control the driving section on the basis of the detected vehicular velocity and steering angle in such a manner that only the second reflector is deflected toward the vehicular turn direction according to the detected steering angle when determining that the detected vehicular velocity is an ultra low velocity range by a predetermined low velocity range than the predetermined middle velocity range and that the first reflector is deflected toward the vehicular turn direction according to the steering angle when determining that the detected vehicular velocity is higher than the predetermined middle vehicular velocity range.

24. A vehicular lamp system, comprising:

a first reflector, disposed on a head of a vehicle, equipped with a light source, and enabled to be driven to deflect a reflection direction of a light beam from the light source toward a vehicular turn direction together with the light source;

a second reflector enabled to be driven to deflect the reflection direction thereof toward the vehicular turn direction independently of the first reflector;

a driving section that operatively performs a deflection drive for the first and second reflectors;

a vehicular velocity detector to detect a vehicular velocity of the vehicle; and a controller to determine whether the detected vehicular velocity falls in a predetermined middle velocity range and to control the driving section on the basis of the detected vehicular velocity and steering angle in such a manner that only the second reflector is deflected toward the vehicular turn direction according to the detected steering angle when determining that the detected vehicular velocity is an ultra low velocity range by a predetermined low velocity range than the predetermined middle velocity range and that the first reflector is deflected toward the vehicular turn direction according to the steering angle when determining that the detected vehicular velocity is higher than the predetermined middle vehicular velocity range and wherein the controller comprises a preset section that presets a maximum value of the deflection drive variable according to vehicular velocity ranges including the predetermined middle vehicular velocity range, a transition range gradually modifying the maximum value of the deflection drive variable being provided between the respective vehicular velocity ranges.

25. A vehicular lamp system, comprising:

a first reflector, disposed on a head of a vehicle, equipped with a light source, and enabled to be driven to deflect a reflection direction of a light beam from the light source toward a vehicular turn direction together with the light source;

a second reflector enabled to be driven to deflect the reflection direction thereof toward the vehicular turn direction independently of the first reflector;

a driving section that operatively performs a deflection drive for the first and second reflectors;

a vehicular velocity detector to detect a vehicular velocity of the vehicle; and a controller to determine whether the detected vehicular velocity falls in a predetermined middle velocity range and to control the driving section on the basis of the detected vehicular velocity and steering angle in such a manner that only the second reflector is deflected toward the vehicular turn direction according to the detected steering angle when determining that the detected vehicular velocity is an ultra low velocity range by a predetermined low velocity range than the predetermined middle velocity range and that the first reflector is deflected toward the vehicular turn direction according to the steering angle when determining that the detected vehicular velocity is higher than the predetermined middle vehicular velocity range and wherein the controller further comprises a deciding section that decides whether the detected steering angle is furthermore increased and a gain setting section that sets such a gain of a deflection drive variable through which one of the first and second reflectors is deflected according to the detected steering angle when the deciding section decides that the detected steering angle is furthermore increased as to be in excess of that of the deflection drive variable according to the detected steering angle when the deciding section decides that the detected steering angle is decreased.

26. A vehicular lamp system, comprising:

a first reflector, disposed on a head of a vehicle, equipped with a light source, and enabled to be driven to deflect a reflection direction of a light beam from the light source toward a vehicular turn direction together with the light source;

a second reflector enabled to be driven to deflect the reflection direction thereof toward the vehicular turn direction independently of the first reflector;

a driving section that operatively performs a deflection drive for the first and second reflectors;

a vehicular velocity detector to detect a vehicular velocity of the vehicle; and a controller to determine whether the detected vehicular velocity falls in a predetermined middle velocity range and to control the driving section on the basis of the detected vehicular velocity and steering angle in such a manner that only the second reflector is deflected toward the vehicular turn direction according to the detected steering angle when determining that the detected vehicular velocity is an ultra low velocity range by a predetermined low velocity range than the predetermined middle velocity range and that the first reflector is deflected toward the vehicular turn direction according to the steering angle when determining that the detected vehicular velocity is higher than the predetermined middle vehicular velocity range and wherein the controller comprises a gain setting section that sets such a gain of a deflection drive variable through which the first reflector is deflected according to the detected steering angle as to be in excess of that of the deflection drive variable through which the second reflector is deflected according to the detected steering angle.

27. A vehicular lamp system, comprising:

a first reflector disposed on a head of a vehicle and enabled to be driven to deflect a reflection of a light beam from a light source toward a vehicular turn direction together with the light source;

a second reflector enabled to be driven to deflect the reflection direction thereof toward the vehicular turn direction independently of the first reflector, the light source being installed only on the first reflector but being uninstalled on the second reflector;

a driving section that operatively performs a deflection drive for the first and second reflectors;

a vehicular velocity detector to detect a vehicular velocity of the vehicle, the vehicular velocity being divided into five velocity ranges of a predetermined extremely low velocity range, a predetermined low vehicular velocity range higher than the predetermined extremely low velocity range, a predetermined middle velocity range higher than the predetermined low velocity range, a predetermined high velocity range, and a predetermined middle velocity transition range between the predetermined middle velocity range and the predetermined high velocity range;

a steering angle detector to detect a vehicular steering angle of the vehicle; and a controller to control the driving section according to the vehicular velocity detected by the vehicular velocity detector and the steering angle detected by the steering angle detector, to determine whether the detected vehicular velocity falls in the predetermined extremely low velocity range, to control the driving section to drive only the second reflector having no light source with its panning angle of the second reflector set constant without the drive of the first reflector with its panning angle of the first reflector zeroed when determining that the detected vehicular velocity falls in the predetermined extremely low velocity range, to determine whether the detected vehicular velocity is increased from the predetermined extremely low velocity range toward the predetermined middle velocity range, to increase a panning angle of the first reflector in the predetermined low velocity range when determining that the detected vehicular velocity is increased from the predetermined extremely low velocity range toward the predetermined middle velocity range, to determine whether the detected vehicular velocity is decreased from the predetermined high velocity range toward the predetermined middle velocity range, and to decrease the panning angle of the second reflector in the predetermined middle velocity transition range when determining that the detected vehicular velocity is decreased from the predetermined high velocity range toward the predetermined middle velocity range.

28. A vehicular lamp system, comprising:

a first reflector disposed on a head of a vehicle and enabled to be driven to deflect a reflection of a light beam from a light source toward a vehicular turn direction together with the light source;

a second reflector enabled to be driven to deflect the reflection direction thereof toward the vehicular turn direction independently of the first reflector, the light source being installed only on the first reflector but being uninstalled on the second reflector;

a driving section that operatively performs a deflection drive for the first and second reflectors;

a vehicular velocity detector to detect a vehicular velocity of the vehicle, the vehicular velocity being divided into five velocity ranges of a predetermined extremely low velocity range, a predetermined low vehicular velocity range higher than the predetermined extremely low velocity range, a predetermined middle velocity range higher than the predetermined low velocity range, a predetermined high velocity range, and a predetermined middle velocity transition range between the predetermined middle velocity range and the predetermined high velocity range;

a steering angle detector to detect a vehicular steering angle of the vehicle; and a controller to control the driving section according to the vehicular velocity detected by the vehicular velocity detector and the steering angle detected by the steering angle detector, to determine whether the detected vehicular velocity falls in the predetermined extremely low velocity range, to control the driving section to drive only the second reflector having no light source with a gain of the second reflector set constant without the drive of the first reflector with the gain of the first reflector zeroed when determining that the detected vehicular velocity falls in the predetermined extremely low velocity range, to determine whether the detected vehicular velocity is increased from the predetermined low velocity range toward the predetermined high velocity range, to decrease a gain of the first reflector when determining that the detected vehicular velocity is increased from the predetermined low velocity range toward the predetermined high velocity range, to determine whether the detected vehicular velocity is increased from the predetermined middle velocity range toward the predetermined high range, and to decrease a gain of the second reflector in the predetermined middle velocity range when determining that the detected vehicular velocity is increased from the predetermined middle velocity range toward the predetermined high velocity range.

29. A vehicular lamp system, comprising:

a first reflector disposed on a head of a vehicle and enabled to be driven to deflect a reflection of a light beam from a light source toward a vehicular turn direction together with the light source;

a second reflector enabled to be driven to deflect the reflection direction thereof toward the vehicular turn direction independently of the first reflector, the light source being installed only on the first reflector but being uninstalled on the second reflector;

a driving section that operatively performs a deflection drive for the first and second reflectors;

a vehicular velocity detector to detect a vehicular velocity of the vehicle, the vehicular velocity being divided into five velocity ranges of a predetermined extremely low velocity range, a predetermined low vehicular velocity range higher than the predetermined extremely low velocity range, a predetermined middle velocity range higher than the predetermined low velocity range, a predetermined high velocity range, and a predetermined middle velocity transition range between the predetermined middle velocity range and the predetermined high velocity range;

a steering angle detector to detect a vehicular steering angle of the vehicle; and a controller to control the driving section according to the vehicular velocity detected by the vehicular velocity detector and the steering angle detected by the steering angle detector, to determine whether the detected vehicular velocity falls in the predetermined extremely low velocity range, to control the driving section to drive only the second reflector having no light source with a gain of the second reflector zeroed without the drive of the first reflector with the gain of the first reflector zeroed when determining that the detected vehicular velocity falls in the predetermined extremely low velocity range, to determine whether the detected vehicular velocity is increased from the predetermined middle velocity transition range toward the predetermined high velocity range, to decrease a gain of the first reflector in the predetermined high velocity range when determining that the detected vehicular velocity is increased from the predetermined middle velocity transition range toward the predetermined high velocity range, and to zero the gain of the second reflector for all of the vehicular velocity ranges.

* * * * *